(12) United States Patent
Quijano et al.

(10) Patent No.: US 12,441,814 B2
(45) Date of Patent: *Oct. 14, 2025

(54) COMPOSITIONS AND METHODS FOR ENHANCING DONOR OLIGONUCLEOTIDE-BASED GENE EDITING

(71) Applicant: Yale University, New Haven, CT (US)

(72) Inventors: Elias Quijano, Durham, CT (US); Audrey Turchick, Chelmsford, MA (US); Peter Glazer, Guilford, CT (US)

(73) Assignee: YALE UNIVERSITY, New Haven, CT (US)

( * ) Notice: Subject to any disclaimer, the term of this patent is extended or adjusted under 35 U.S.C. 154(b) by 1242 days.

This patent is subject to a terminal disclaimer.

(21) Appl. No.: 17/272,136

(22) PCT Filed: Aug. 30, 2019

(86) PCT No.: PCT/US2019/048953
§ 371 (c)(1),
(2) Date: Feb. 26, 2021

(87) PCT Pub. No.: WO2020/047344
PCT Pub. Date: Mar. 5, 2020

(65) Prior Publication Data
US 2021/0340280 A1    Nov. 4, 2021

Related U.S. Application Data

(60) Provisional application No. 62/725,920, filed on Aug. 31, 2018.

(51) Int. Cl.
| | | |
|---|---|---|
| C07K 16/44 | (2006.01) | |
| A61K 31/7088 | (2006.01) | |
| A61K 35/14 | (2015.01) | |
| A61K 39/00 | (2006.01) | |
| A61K 47/69 | (2017.01) | |
| A61K 48/00 | (2006.01) | |
| A61P 43/00 | (2006.01) | |
| C07K 16/40 | (2006.01) | |
| C12N 15/10 | (2006.01) | |
| C12N 15/11 | (2006.01) | |

(52) U.S. Cl.
CPC .......... *C07K 16/44* (2013.01); *A61K 31/7088* (2013.01); *A61K 35/14* (2013.01); *A61K 47/6937* (2017.08); *A61K 48/0008* (2013.01); *A61P 43/00* (2018.01); *C12N 15/102* (2013.01); *C12N 15/11* (2013.01); *A61K 2039/505* (2013.01); *C07K 16/40* (2013.01); *C07K 2317/622* (2013.01); *C07K 2317/626* (2013.01); *C07K 2317/77* (2013.01)

(58) Field of Classification Search
CPC .. C07K 16/44; C07K 16/40; C07K 2317/622; C07K 2317/626; C07K 2317/77; A61K 31/7088; A61K 35/14; A61K 47/6937; A61K 48/0008; A61K 2039/505; A61P 43/00; C12N 15/102; C12N 15/11
See application file for complete search history.

(56) References Cited

U.S. PATENT DOCUMENTS

| | | |
|---|---|---|
| 4,714,680 A | 12/1987 | Civin |
| 4,812,397 A | 3/1989 | Weisbart |
| 4,965,204 A | 10/1990 | Civin |
| 5,034,506 A | 7/1991 | Summerton et al. |
| 5,061,620 A | 10/1991 | Tsukamoto et al. |
| 5,075,109 A | 12/1991 | Tice et al. |
| 5,356,802 A | 10/1994 | Chandrasegaran |
| 5,422,251 A | 6/1995 | Fresco |
| 5,436,150 A | 7/1995 | Chandrasegaran |
| 5,487,994 A | 1/1996 | Chandrasegaran |
| 5,527,675 A | 6/1996 | Coull et al. |
| 5,539,082 A | 7/1996 | Nielsen et al. |
| 5,623,049 A | 4/1997 | Löbberding et al. |
| 5,643,741 A | 7/1997 | Tsukamoto et al. |

(Continued)

FOREIGN PATENT DOCUMENTS

| | | |
|---|---|---|
| JP | 2010527618 A | 8/2010 |
| JP | 2017509328 A | 4/2017 |

(Continued)

OTHER PUBLICATIONS

Makadia and Siegel. (2011) "Poly Lactic-co-Glycolic Acid (PLGA) as Biodegradable Controlled Drug Delivery Carrier." Polymers (Basel) 3(3): 1377-1397. (Year: 2011).*

(Continued)

*Primary Examiner* — Julie Wu
*Assistant Examiner* — Elizabeth A Shupe
(74) *Attorney, Agent, or Firm* — STERNE, KESSLER, GOLDSTEIN & FOX P.L.L.C.; Shoshana Marvin

(57) ABSTRACT

Compositions for enhanced gene editing and methods of use thereof are. The composition contains a cell-penetrating antibody and a donor oligonucleotide containing a sequence that can correct a mutation in a cell's genome. Preferably, the composition does not contain a nuclease, PNA, or nanoparticle. The compositions are used to modify the genome of a cell by contacting the cell with an effective amount of the composition. Genomic modification occurs at a higher frequency both ex vivo and in vivo, when cells are contacted with the cell-penetrating antibody and donor oligonucleotide as compared to the absence of the cell-penetrating antibody.

19 Claims, 4 Drawing Sheets
Specification includes a Sequence Listing.

(56) References Cited

U.S. PATENT DOCUMENTS

| | | | |
|---|---|---|---|
| 5,677,136 | A | 10/1997 | Simmons et al. |
| 5,714,331 | A | 2/1998 | Buchardt et al. |
| 5,716,827 | A | 2/1998 | Tsukamoto et al. |
| 5,736,336 | A | 4/1998 | Buchardt et al. |
| 5,750,397 | A | 5/1998 | Tsukamoto et al. |
| 5,759,793 | A | 6/1998 | Schwartz et al. |
| 5,773,571 | A | 6/1998 | Nielsen et al. |
| 5,786,571 | A | 7/1998 | Bethel et al. |
| 5,945,337 | A | 8/1999 | Brown |
| 5,962,426 | A | 10/1999 | Glazer |
| 6,140,081 | A | 10/2000 | Barbas |
| 6,261,841 | B1 | 7/2001 | Cohen et al. |
| 6,303,376 | B1 | 10/2001 | Glazer |
| 6,326,479 | B1 | 12/2001 | Gildea et al. |
| 6,441,130 | B1 | 8/2002 | Egholm et al. |
| 6,453,242 | B1 | 9/2002 | Eisenberg et al. |
| 6,534,261 | B1 | 3/2003 | Cox, III et al. |
| 6,610,512 | B1 | 8/2003 | Barbas |
| 6,746,838 | B1 | 6/2004 | Choo et al. |
| 6,866,997 | B1 | 3/2005 | Choo et al. |
| 6,919,208 | B2 | 7/2005 | Levy et al. |
| 7,067,617 | B2 | 6/2006 | Barbas, III et al. |
| 7,078,389 | B2 | 7/2006 | Glazer et al. |
| 7,189,396 | B1 | 3/2007 | Weisbart |
| 7,279,463 | B2 | 10/2007 | Glazer |
| 8,309,356 | B2 | 11/2012 | Glazer |
| 8,658,608 | B2 | 2/2014 | Glazer et al. |
| 9,193,758 | B2 | 11/2015 | Ly et al. |
| RE46,211 | E | 11/2016 | Weisbart |
| 11,136,597 | B2 * | 10/2021 | Saltzman ............ A61K 9/1647 |
| 11,590,242 | B2 | 2/2023 | Zhou et al. |
| 11,850,284 | B2 | 12/2023 | Quijano et al. |
| 11,872,286 | B2 | 1/2024 | Quijano et al. |
| 2002/0165356 | A1 | 11/2002 | Barbas, III et al. |
| 2003/0148352 | A1 | 8/2003 | Glazer |
| 2004/0197892 | A1 | 10/2004 | Moore et al. |
| 2007/0154989 | A1 | 7/2007 | Barbas, III |
| 2007/0213269 | A1 | 9/2007 | Barbas, III et al. |
| 2010/0172882 | A1 | 7/2010 | Glazer et al. |
| 2011/0145940 | A1 | 6/2011 | Voytas et al. |
| 2011/0262406 | A1 | 10/2011 | Del Campo et al. |
| 2011/0268810 | A1 | 11/2011 | Saltzman et al. |
| 2011/0293585 | A1 | 12/2011 | Del Campo et al. |
| 2014/0342003 | A1 | 11/2014 | Saltzman et al. |
| 2015/0290244 | A1 | 10/2015 | June et al. |
| 2015/0376279 | A1 | 12/2015 | Hansen et al. |
| 2016/0237165 | A1 | 8/2016 | Weisbart et al. |
| 2017/0281795 | A1 | 10/2017 | Geall et al. |
| 2017/0283830 | A1 | 10/2017 | Saltzman et al. |
| 2018/0127509 | A1 | 5/2018 | Armstrong |
| 2021/0338815 | A1 | 11/2021 | Quijano et al. |
| 2023/0032060 | A1 | 2/2023 | Quijano et al. |
| 2023/0085308 | A1 | 3/2023 | Quijano et al. |
| 2023/0093460 | A1 | 3/2023 | Quijano et al. |
| 2023/0093888 | A1 | 3/2023 | Quijano et al. |
| 2023/0227583 | A1 | 7/2023 | Quijano et al. |
| 2023/0272115 | A1 | 8/2023 | Quijano et al. |
| 2023/0277658 | A1 | 9/2023 | Quijano et al. |
| 2024/0285774 | A1 | 8/2024 | Quijano et al. |
| 2024/0285775 | A1 | 8/2024 | Quijano et al. |

FOREIGN PATENT DOCUMENTS

| | | |
|---|---|---|
| WO | WO-9501364 A1 | 1/1995 |
| WO | WO-9639195 A2 | 12/1996 |
| WO | WO-9640271 A1 | 12/1996 |
| WO | WO-9640898 A1 | 12/1996 |
| WO | WO-1997032602 A1 | 9/1997 |
| WO | WO-9853059 A1 | 11/1998 |
| WO | WO-03016496 A2 | 2/2003 |
| WO | WO-03052071 A2 | 6/2003 |
| WO | WO-2008086529 A2 | 7/2008 |
| WO | WO-2008091911 A2 | 7/2008 |
| WO | WO-2008148063 A1 | 12/2008 |
| WO | WO-2010123983 A1 | 10/2010 |
| WO | WO-2011053989 A2 | 5/2011 |
| WO | WO-2011072246 A2 | 6/2011 |
| WO | WO-2011133802 A1 | 10/2011 |
| WO | WO-2011133803 A1 | 10/2011 |
| WO | WO-2012135831 A1 | 10/2012 |
| WO | WO-2013082529 A1 | 6/2013 |
| WO | WO-2013138662 A1 | 9/2013 |
| WO | WO-2013176772 A1 | 11/2013 |
| WO | WO-2014018423 A2 | 1/2014 |
| WO | WO-2015106290 A1 | 7/2015 |
| WO | WO-2015134607 A1 | 9/2015 |
| WO | WO-2015143177 A1 | 9/2015 |
| WO | WO-2016033321 A1 | 3/2016 |
| WO | WO-2016033324 A1 | 3/2016 |
| WO | WO-2016081621 A1 | 5/2016 |
| WO | WO-2017015101 A1 | 1/2017 |
| WO | WO-2017109177 A1 | 6/2017 |
| WO | WO-2017143042 A2 | 8/2017 |
| WO | WO-2017143061 A1 | 8/2017 |
| WO | WO-2017218825 A1 | 12/2017 |
| WO | WO-2018187493 A1 | 10/2018 |
| WO | WO-2019018428 A1 | 1/2019 |
| WO | WO-2019152806 A1 | 8/2019 |
| WO | WO-2020047344 A1 | 3/2020 |
| WO | WO-2020047353 A1 | 3/2020 |
| WO | WO-2021042060 A1 | 3/2021 |

OTHER PUBLICATIONS

Quijano et al. U.S. Appl No. 17/272,151. Compositions and Methods for Enhancing Triplex and Nuclease-Based Gene Editing (Year: 2021).*

Quijano et al. U.S. Appl. No. 18/054,080. Compositions and Methods for Enhancing Donor Oligonucleotide-Based Gene Editing. (Year: 2022).*

Quijano et al. U.S. Appl No. 18/054,101. Compositions and Methods for Enhancing Triplex and Nuclease-Based Gene Editing. (Year: 2022).*

U.S. Appl No. 17/272,151. Compositions and Methods for Enhancing Triplex and Nuclease-Based Gene Editing. Published 2021 in US 20210338815 A1. (Year: 2021).*

Weisbart (Scientific Reports (2015) 5: 12002) (Year: 2015).*

Attwood, T.K., "Genomics. The Babel of Bioinformatics," Science 290(5491):471-473, American Association for the Advancement of Science, United States (Oct. 2000).

Non-Final Office Action mailed Oct. 12, 2023, in U.S. Appl. No. 18/054,080, Quijano, E., et al., filed Nov. 9, 2022, 11 pages.

Final Office Action mailed Mar. 27, 2024, in U.S. Appl. No. 18/054,080, Quijano, E., et al., filed Nov. 9, 2022, 13 pages.

Non-Final Office Action mailed Sep. 13, 2023, in U.S. Appl. No. 18/054,101, Quijano, E., et al., filed Nov. 9, 2022, 17 pages.

Final Office Action mailed Mar. 18, 2024, in U.S. Appl. No. 18/054,101, Quijano, E., et al., filed Nov. 9, 2022, 13 pages.

Piche-Nicholas, N. M., et al., "Changes in Complementarity-determining Regions Significantly Alter IgG Binding to the Neonatal Fc Receptor (FcRn) and Pharmacokinetics," MABS 10(1):81-94, Taylor & Francis, United States (Jan. 2018).

Skolnick, J, and Fetrow, U.S., "From Genes to Protein Structure and Function: Novel Applications of Computational Approaches in the Genomic era," Trends in Biotechnology 18:34-39, Elsevier Science Publishers, United Kingdom (Jan. 2000).

Aguado, M. T., and Lambert, P. H., "Controlled-release vaccines—biodegradable polylactide/polyglycolide (PL/PG) microspheres as antigen vehicles," Immunobiology 184(2-3):113-125, Elsevier, Netherlands (Feb. 1992).

Aiuti, A., et al., "Gene therapy for immunodeficiency due to adenosine deaminase deficiency," N Engl J Med 360(5):447-458, Massachusetts Medical Society, United States (Jan. 2009).

Akinc, A., et al., "Synthesis of poly(beta-amino ester)s optimized for highly effective gene delivery," Bioconjug Chem 14(5):979-988, American Chemical Society, United States (Sep.-Oct. 2003).

Alton, E. W. F. W., et al., "Repeated nebulisation of non-viral CFTR gene therapy in patients with cystic fibrosis: a randomised, double-

(56) References Cited

OTHER PUBLICATIONS blind, placebo-controlled, phase 2b trial," Lancet Respir Med 3(9):684-691, Elsevier, Netherlands (Sep. 2015).

Alton, E. W. F. W., et al., "A randomised, double-blind, placebo-controlled phase IIB clinical trial of repeated application of gene therapy in patients with cystic fibrosis," Thorax 68(11):1075-1077, BioMed Central Ltd., United Kingdom (Nov. 2013).

Armstrong, D. K., et al., "Gene therapy in cystic fibrosis," Arch Dis Child 99(5):465-468, BioMed Central Ltd., United Kingdom (May 2014).

Bahal, R., et al., "In vivo correction of anaemia in β-thalassemic mice by γPNA-mediated gene editing with nanoparticle delivery," Nat Commun 7:13304, Nature Publishing Group, United Kingdom (Oct. 2016).

Bentin, T., et al., "Combined triplex/duplex invasion of double-stranded DNA by "tail-clamp" peptide nucleic acid," Biochemistry 42(47):13987-13995, American Chemical Society, United States (Dec. 2003).

Bentin, T., et al., "Structural diversity of target-specific homopyrimidine peptide nucleic acid-dsDNA complexes," Nucleic Acids Res 34(20):5790-5799, Oxford University Press, United Kingdom (Oct. 2006).

Beutler, E., and Grabowski, G. A., "Gaucher Disease," in *The Metabolic and Molecular Basis of Inherited Disease*, 8th Edition, pp. 3635-3668, Scriver, C. R., et al., eds., McGraw-Hill, United States (2001).

Braasch, D. A., and Corey, D. R., "Locked nucleic acid (LNA): fine-tuning the recognition of DNA and RNA," Chem Biol 8(1):1-7, Cell Press, United States (Jan. 2001).

Bramwell, V. W., et al., "Particulate delivery systems for biodefense subunit vaccines," Adv Drug Deliv Rev 57(9):1247-1265, Elsevier, Netherlands (Jun. 2005).

Cartier, N., et al., "Hematopoietic stem cell gene therapy with a lentiviral vector in X-linked adrenoleukodystrophy," Science 326(5954):818-823, American Association for the Advancement of Science, United States (Nov. 2009).

Cejka, P., et al., "DNA end resection by Dna2-Sgs1-RPA and its stimulation by Top3-Rmil and Mre11-Rad50-Xrs2," Nature 467(7311):112-116, Nature Publishing Group, United Kingdom (Sep. 2010).

Cermak, T., et al., "Efficient design and assembly of custom TALEN and other TAL effector-based constructs for DNA targeting," Nucleic Acids Res 39(12):e82, 11 pages, Oxford University Press, United Kingdom (Jul. 2011).

Chin, J. Y., et al., "Correction of a splice-site mutation in the beta-globin gene stimulated by triplex-forming peptide nucleic acids," Proc Natl Acad Sci USA 105(36):13514-13519, National Academy of Sciences, United States (Sep. 2008).

Chothia, C., and Lesk, A. M., "Canonical structures for the hypervariable regions of immunoglobulins," J Mol Biol 196(4):901-917, Elsevier Science, United States (Aug. 1987).

Chu, V. T., et al., "Increasing the efficiency of homology-directed repair for CRISPR-Cas9-induced precise gene editing in mammalian cells, " Nat Biotechnol 33(5):543-548, Nature Publishing Group, United Kingdom (Mar. 2015).

Cong, L., "Multiplex genome engineering using CRISPR/Cas systems," Science 339(6121):819-823, American Association for the Advancement of Science, United States (Feb. 2013).

Cradick, T. J., et al., "CRISPR/Cas9 systems targeting β-globin and CCR5 genes have substantial off-target activity," Nucleic Acids Res 41(20):9584-9592, Oxford University Press, United Kingdom (Nov. 2013).

Cruz, L. J., et al., "Targeted PLGA nano- but not microparticles specifically deliver antigen to human dendritic cells via DC-SIGN in vitro," J Control Release 144(2):118-126, Elsevier, Netherlands (Jun. 2010).

Cu, Y., et al., "In vivo distribution of surface-modified PLGA nanoparticles following intravaginal delivery," J Control Release 156(2):258-264, Elsevier, Netherlands (Dec. 2011).

Davis, P. B., "Cystic fibrosis since 1938," Am J Respir Crit Care Med 173(5):475-482, American Thoracic Society, United States (Mar. 2006).

Davis, P. B., "Cystic fibrosis," Pediatr Rev 22(8):257-264, American Academy of Pediatrics, United States (Aug. 2001).

Desai, M. P., et al., "The mechanism of uptake of biodegradable microparticles in Caco-2 cells is size dependent," Pharm Res 14(11):1568-1573, Springer Science+Business Media, Germany (Nov. 1997).

El Dib, R. P., and Pastores, G. M., "Laronidase for treating mucopolysaccharidosis type I," Genet Mol Res 6(3):667-674, FUNEPC-RP, Brazil (Sep. 2007).

Doudna, J. A., and Charpentier, E., "The new frontier of genome engineering with CRISPR-Cas9," Science 346(6213):1258096, American Association for the Advancement of Science, United States (Nov. 2014).

Endoh, T., and Ohtsuki, T., "Cellular siRNA delivery using cell-penetrating peptides modified for endosomal escape," Adv Drug Deliv Rev 61(9):704-709, Elsevier, Netherlands (Jul. 2009).

Fields, R. J., et al., "Modified poly(lactic-co-glycolic acid) nanoparticles for enhanced cellular uptake and gene editing in the lung," Adv Healthc Mater 4(3):361-366, John Wiley and Sons Ltd., United Kingdom (Feb. 2015).

Genbank, "immunoglobulin heavy chain, partial [Mus musculus]," ncbi.nlm.nih.gov, Accession No. AAA65679.1, accessed at URL:[https://www.ncbi.nlm.nih.gov/protein/AAA65679] on Jan. 14, 2022, 1 page.

Genbank, "immunoglobulin light chain, partial [Mus musculus]," ncbi.nlm.nih.gov, Accession No. AAA65681.1, accessed at URL:[https://www.ncbi.nlm.nih.gov/protein/AAA65681] on Jan. 14, 2022, 1 page.

Genbank, "*Homo sapiens* cystic fibrosis transmembrane conductance regulator (CFTR) gene, complete cds," ncbi.nlm.nih.gov, Accession No. AH006034.1, accessed at URL:[https://www.ncbi.nlm.nih.gov/nuccore/AH006034] on Jan. 14, 2022, 10 pages.

Genbank, "Mouse Ig rearranged L-chain gene, partial cds," ncbi.nlm.nih.gov, Accession No. L16981.1, accessed at URL:[https://www.ncbi.nlm.nih.gov/nuccore/L16981] on Jan. 14, 2022, 1 page.

Genbank, "Mouse Ig rearranged H-chain gene, partial cds," ncbi.nlm.nih.gov, Accession No. L16982.1, accessed at URL:[https://www.ncbi.nlm.nih.gov/nuccore/L16982] on Jan. 14, 2022, 1 page.

Genbank, "Mouse Ig rearranged kappa-chain mRNA V-region," ncbi.nlm.nih.gov, Accession No. L34051.1, accessed at URL:[https://www.ncbi.nlm.nih.gov/nuccore/L34051] on Jan. 14, 2022, 1 page.

Genbank, "*Homo sapiens* galactosidase alpha (GLA), RefSeqGene (LRG_672) on chromosome X," ncbi.nlm.nih.gov, Accession No. NG_007119.1, accessed at URL:[https://www.ncbi.nlm.nih.gov/nuccore/NG_007119] on Jan. 14, 2022, 10 pages.

Genbank, "*Homo sapiens* glucosylceramidase beta (GBA), RefSeqGene on chromosome 1," ncbi.nlm.nih.gov, Accession No. NG_009783.1, accessed at URL:[https://www.ncbi.nlm.nih.gov/nuccore/NG_009783] on Jan. 14, 2022, 9 pages.

Genbank, "Human beta globin region on chromosome 11," ncbi.nlm.nih.gov, Accession No. U01317.1, accessed at URL:[https://www.ncbi.nlm.nih.gov/nuccore/U01317] on Jan. 14, 2022, 35 pages.

Goncz, K. K., et al., "Small fragment homologous replacement-mediated modification of genomic beta-globin sequences in human hematopoietic stem/progenitor cells," Oligonucleotides 16(3):213-224, Mary Ann Liebert Inc., United States (Fall 2006).

Händel, E-M., and Cathomen, T., "Zinc-finger nuclease based genome surgery: it's all about specificity," Curr Gene Therapy 11(1):28-37, Bentham Science Publishers, United Arab Emirates (Feb. 2011).

Hanna, J., et al., "Treatment of sickle cell anemia mouse model with iPS cells generated from autologous skin," Science 318(5858):1920-1923, American Association for the Advancement of Science, United States (Dec. 2007).

Hansen, M. E., et al., "High-affinity triplex targeting of double stranded DNA using chemically modified peptide nucleic acid oligomers," Nucleic Acids Res 37(13):4498-4507, Oxford University Press, United Kingdom (Jul. 2009).

(56) References Cited

OTHER PUBLICATIONS

He, W., et al., "The structure of a gamma-modified peptide nucleic acid duplex," Mol BioSyst 6(9):1619-1629, Royal Society of Chemistry, United Kingdom (Sep. 2010).
Helleday, T., et al., "DNA double-strand break repair: from mechanistic understanding to cancer treatment," DNA Repair (Amst) 6(7):923-935, Elsevier, Netherlands (Jul. 2007).
Herrmann, A., et al., "An effective cell-penetrating antibody delivery platform," JCI Insight 4(14):e127474, American Society for Clinical Investigation, United States (Jul. 2019).
Holt, N., et al., "Human hematopoietic stem/progenitor cells modified by zinc-finger nucleases targeted to CCR5 control HIV-1 in vivo," Nat Biotechnol 28(8):839-847, Nature Publishing Group, United Kingdom (Aug. 2010).
Huang, H., et al., "Preparation and determination of optical purity of γ-lysine modified peptide nucleic acid analogues," Arch Pharm Res 35(3):517-522, Springer Science+Business Media, Germany (Mar. 2012).
Huang, A., et al., "Functional silencing of hepatic microsomal glucose-6-phosphatase gene expression in vivo by adenovirus-mediated delivery of short hairpin Rna," FEBS Lett 558(1-3):69-73, Wiley on behalf of FEBS, United States (Jan. 2004).
Huang, L. C., et al., "Sensitivity and selectivity of the DNA damage sensor responsible for activating p53-dependent G1 arrest," Proc Natl Acad Sci USA 93(10):4827-4832, National Academy of Sciences, United States (May 1996).
International Search Report and Written Opinion for International Application No. PCT/US2019/048953, European Patent Office, Netherlands, mailed on Nov. 19, 2019, 11 pages.
International Search Report and Written Opinion for International Application No. PCT/US2019/048962, European Patent Office, Netherlands, mailed on Nov. 20, 2019, 11 pages.
International Search Report and Written Opinion for International Application No. PCT/US2020/048823, European Patent Office, Netherlands, mailed on Oct. 19, 2020, 14 pages.
Jain, D. R., et al., "Influence of pendant chiral C(γ)-(alkylideneamino/guanidino) cationic side- chains of PNA backbone on hybridization with complementary DNA/RNA and cell permeability," J Org Chem 79(20):9567-9577, American Chemical Society, United States (Oct. 2014).
Jekimovs, C., et al., "Chemotherapeutic compounds targeting the DNA double-strand break repair pathways: the good, the bad, and the promising," Front Oncol 4:86, Frontiers Media S.A., Switzerland (Apr. 2014).
Jiang, W., et al., "Biodegradable poly(lactic-co-glycolic acid) microparticles for injectable delivery of vaccine antigens," Adv Drug Deliv Rev 57(3):391-410, Elsevier, Netherlands (Jan. 2005).
Jinek, M., et al., "A programmable dual-RNA-guided DNA endonuclease in adaptive bacterial immunity," Science 337(6096):816-821, American Association for the Advancement of Science, United States (Aug. 2012).
Kabat, E.A. et al., "Sequences of proteins of immunological interest," U.S. Dept. of Health and Human Services, United States (1991).
Kaihatsu, K., et al., "Extending recognition by peptide nucleic acids (PNAs): binding to duplex DNA and inhibition of transcription by tail-clamp PNA-peptide conjugates," Biochemistry 42(47):13996-14003, American Chemical Society, United States (Dec. 2003).
Karen, J. K., et al., "Angiokeratoma corporis diffusum (Fabry disease)," Dermatol Online J 11(4):8, University of California, Davis, United States (Dec. 2005).
Kim, Y-G., et al., "Insertion and deletion mutants of FokI restriction endonuclease," J Biol Chem 269(50):31978-31982, Elsevier, Netherlands (Dec. 1994).
Kim, Y-G., and Chandrasegaran, S., "Chimeric restriction endonuclease," Proc Natl Acad Sci USA 91(3):883-887, National Academy of Sciences, United States (Feb. 1994).
Konstan, M. W., et al., "Compacted DNA nanoparticles administered to the nasal mucosa of cystic fibrosis subjects are safe and demonstrate partial to complete cystic fibrosis transmembrane regulator reconstitution," Hum Gene Ther 15(12):1255-1269, Mary Ann Liebert, Inc., United States (Dec. 2004).
Koppelhus, U., and Nielsen, P. E., "Cellular delivery of peptide nucleic acid (PNA)," Adv Drug Deliv Rev 55(2):267-280, Elsevier, Netherlands (Feb. 2003).
Kowalczykowski, S. C., "Snapshots of DNA repair," Nature 453(7194):463-466, Nature Publishing Group, United Kingdom (May 2008).
Krogh, B. O., and Symington, L. S., "Recombination proteins in yeast," Annu Rev Genet 38:233-271, Annual Reviews, United States (Dec. 2004).
Kuhn, H., et al., "Sequence specificity at targeting double-stranded DNA with a γ-PNA oligomer modified with guanidinium G-clamp nucleobases," Artif DNA PNA XNA 1(1):45-53, Taylor & Francis, United States (Jul. 2010).
Li, L., et al., "Functional domains in Fok I restriction endonuclease," Proc Natl Acad Sci USA 89(10):4275-4279, National Academy of Sciences, United States (May 1992).
Li, L., and Chandrasegaran, S., "Alteration of the cleavage distance of Fok I restriction endonuclease by insertion mutagenesis," Proc Natl Acad Sci USA 90(7):2764-2768, National Academy of Sciences, United States (Apr. 1993).
Lorenz, C., et al., "Steroid and lipid conjugates of siRNAs to enhance cellular uptake and gene silencing in liver cells," Bioorg Med Chem Lett 14(19):4975-4977, Elsevier, Netherlands (Oct. 2004).
Luens, K. M., et al., "Thrombopoietin, kit ligand, and flk2/flt3 ligand together induce increased numbers of primitive hematopoietic progenitors from human CD34+Thy-1+Lin-cells with preserved ability to engraft SCID-hu bone," Blood 91(4):1206-1215, Elsevier, Netherlands (Feb. 1998).
Ma, M. Y., et al., "Nuclease-resistant external guide sequence-induced cleavage of target RNA by human ribonuclease P," Antisense Nucleic Acid Drug Dev 8(5):415-426, Mary Ann Liebert, Inc., United States (Oct. 1998).
Maeder, M. L., and Gersbach, C. A., "Genome-editing Technologies for Gene and Cell Therapy," Mol Ther 24(3):430-446, Cell Press, United States (Mar. 2016).
Magzoub, M., et al., "N-terminal peptides from unprocessed prion proteins enter cells by micropinocytosis," Biochem Biophys Res Commun 348(2):379-385, Elsevier, Netherlands (Sep. 2006).
Majumdar, A., et al., "Targeted gene knockout mediated by triple helix forming oligonucleotides," Nat Genet 20(2):212-214, Nature Publishing Group, United Kingdom (Oct. 1998).
Maruyama, T., et al., "Increasing the efficiency of precise genome editing with CRISPR-Cas9 by inhibition of nonhomologous end joining," Nat Biotechnol 33(5):538-42, Nature Publishing Group, United Kingdom (May 2015).
McNeer, N. A., et al., "Nanoparticles that deliver triplex-forming peptide nucleic acid molecules correct F508del CFTR in airway epithelium," Nat Commun 6:6952, 11 pages, Nature Publishing Group, United Kingdom (Apr. 2015).
McNeer, N. A., et al., "Polymer delivery systems for site-specific genome editing," J Control Release 155(2):312-316, Elsevier, Netherlands (May 2011).
Miller, J. C., et al., "A TALE nuclease architecture for efficient genome editing," Nat Biotechnol 29(2):143-148, Nature Publishing Group, United Kingdom (Feb. 2011).
Mimitou, E. P., and Symington, L. S., "DNA end resection: many nucleases make light work," DNA Repair (Amst) 8(9):983-995, Elsevier, Netherlands (Sep. 2009).
Morozov, V., and Wawrousek, E. F., "Single-strand DNA-mediated targeted mutagenesis of genomic DNA in early mouse embryos is stimulated by Rad51/54 and by Ku70/86 inhibition," Gene Ther 15(6):468-472, Nature Publishing Group, United Kingdom (Mar. 2008).
Nie, H., et al., "Lysine-based peptide-functionalized PLGA foams for controlled DNA delivery," J Control Release 138(1):64-70, Elsevier, Netherlands (Aug. 2009).
Noble, P. W., et al., "Optimizing a lupus autoantibody for targeted cancer therapy," Cancer Res 75(11):2285-2291, American Association for Cancer Research, United States (Jun. 2015).

(56) References Cited

OTHER PUBLICATIONS

Nyce, J. W., and Metzger, W. J., "Dna antisense therapy for asthma in an animal model," Nature 385(6618):721-725, Nature Publishing Group, United Kingdom (Feb. 1997).
Pâques, F., and Haber, J. E., "Multiple pathways of recombination induced by double-strand breaks in *Saccharomyces cerevisiae*," Microbiol Mol Biol Rev 63(2):349-404, American Society for Microbiology, United States (1999).
Quijano, E., et al., "Therapeutic Peptide Nucleic Acids: Principles, Limitations, and Opportunities," Yale J Biol Med 90(4):583-598, PubMed Central, United States (Dec. 2017).
Rapireddy, S., et al., "Strand invasion of mixed-sequence, double-helical B-DNA by γ-peptide nucleic acids containing G-clamp nucleobases under physiological conditions," Biochemistry 50(19):3913-3918, American Chemical Society, United States (May 2011).
Rattray, Z., et al., "Re-engineering and evaluation of anti-DNA autoantibody 3E10 for therapeutic applications," Biochem Biophys Res Commun 496(3):858-864, Elsevier, Netherlands (Jan. 2018).
Ricciardi, A. S., et al., "In utero nanoparticle delivery for site-specific genome editing," Nat Commun 9(1):2481, Nature Publishing Group, United Kingdom (Jun. 2018).
Richardson, C. D., et al., "Enhancing homology-directed genome editing by catalytically active and inactive CRISPR-Cas9 using asymmetric donor DNA," Nat Biotechnol 34(3):339-344, Nature Publishing Group, United Kingdom (Mar. 2016).
Richardson, C. D., et al., "CRISPR-Cas9 genome editing in human cells occurs via the Fanconi anemia pathway," Nat Genet 50(8):1132-1139, Nature Publishing Group, United Kingdom (Jul. 2018).
Riesenberg, S., and Maricic, T., "Targeting repair pathways with small molecules increases precise genome editing in pluripotent stem cells," Nat Commun 9(1):2164, Nature Publishing Group, United Kingdom (Jun. 2018).
Rogers, F. A., et al., "Site-directed recombination via bifunctional PNA-DNA conjugates," Proc Natl Acad Sci USA 99(26):16695-16700, National Academy of Sciences, United States (Dec. 2002).
Rump, E. T., et al., "Modification of the plasma clearance and liver uptake of steroid ester-conjugated oligodeoxynucleotides by association with (lactosylated) low-density lipoprotein," Biochem Pharmacol 59(11):1407-1416, Elsevier, Netherlands (Jun. 2000).
Ryan, T. M., et al., "Knockout-transgenic mouse model of sickle cell disease," Science 278(5339):873-876, American Association for the Advancement of Science, United States (Oct. 1997).
Sahu, B., et al., "Synthesis and characterization of conformationally preorganized, (R)-diethylene glycol-containing γ-peptide nucleic acids with superior hybridization properties and water solubility," J Org Chem 76(14):5614-5627, American Chemical Society, United States (Jul. 2011).
Sazani, P., et al., "Systemically delivered antisense oligomers upregulate gene expression in mouse tissues," Nat Biotechnol 20(12):1228-1233, Nature Publishing Group, United Kingdom (Dec. 2002).
Schleifman, E. B., et al., "Targeted disruption of the CCR5 gene in human hematopoietic stem cells stimulated by peptide nucleic acids," Chem Biol 18(9):1189-1198, Cell Press, United States (Sep. 2011).
Schwank, G., et al., "Functional repair of CFTR by CRISPR/Cas9 in intestinal stem cell organoids of cystic fibrosis patients," Cell Stem Cell 13(6):653-658, Cell Press, United States (Dec. 2013).
Scott, H. S., et al., "Molecular genetics of mucopolysaccharidosis type I: diagnostic, clinical, and biological implications," Hum Mutat 6(4):288-302, John Wiley & Sons, Inc., United States (1995).
Song, E., et al., "Antibody mediated in vivo delivery of small interfering RNAs via cell-surface receptors," Nat Biotechnol 23(6):709-717, Nature Publishing Group, United Kingdom (May 2005).
Soutschek, J., et al., "Therapeutic silencing of an endogenous gene by systemic administration of modified siRNAs," Nature 432(7014):173-178, Nature Publishing Group, United Kingdom (Nov. 2004).
Staretz-Chacham, O., et al., "Lysosomal storage disorders in the newborn," Pediatrics 123(4):1191-1207, American Academy of Pediatrics, United States (Apr. 2009).
Stirchak, E. P., et al., "Uncharged stereoregular nucleic acid analogs. 1. Synthesis of a cytosine-containing oligomer with carbamate internucleoside linkages," J Org Chem 52(19):4202, American Chemical Society, United States (Sep. 1987).
Sugiyama, T., and Kittaka, A., "Chiral peptide nucleic acids with a substituent in the N-(2-aminoethy)glycine backbone," Molecules 18(1):287-310, Multidisciplinary Digital Publishing Institute (MDPI), Switzerland (Dec. 2012).
Thompson, L. H., and Schild, D., "Homologous recombinational repair of DNA ensures mammalian chromosome stability," Mutat Res 477(1-2):131-153, Elsevier, Netherlands (Jun. 2001).
Turchick, A., et al., "A cell-penetrating antibody inhibits human RAD51 via direct binding," Nucleic Acids Res 45(20):11782-11799, Oxford University Press, United Kingdom (Nov. 2017).
Vasquez, K. M., et al., "Specific mutations induced by triplex-forming oligonucleotides in mice," Science 290(5491):530-533, American Association for the Advancement of Science, United States (Oct. 2000).
Walkley, S. U., "Pathogenic cascades in lysosomal disease—Why so complex?," J Inherit Metab Dis 32(2):181-189, John Wiley & Sons, Inc., United States (Apr. 2009).
Weisbart, R. H., et al., "Antibody-mediated transduction of p53 selectively kills cancer cells," Int J Oncol 25(6):1867-1873, Spandidos Publications, Greece (Dec. 2004).
Weisbart, R. H., et al., "An autoantibody is modified for use as a delivery system to target the cell nucleus: therapeutic implications," J Autoimmun 11(5):539-546, Elsevier, Netherlands (Oct. 1998).
Weisbart, R. H., et al., "DNA-dependent targeting of cell nuclei by a lupus autoantibody," Sci Rep 5:12022, Nature Publishing Group, United Kingdom (Jul. 2015).
Yamano, S., et al., "Modified Tat peptide with cationic lipids enhances gene transfection efficiency via temperature-dependent and caveolae-mediated endocytosis," J Control Release 152(2):278-285, Elsevier, Netherlands (Jun. 2011).
Yin, H., et al., "Genome editing with Cas9 in adult mice corrects a disease mutation and phenotype," Nat Biotechnol 32(6):551-553, Nature Publishing Group, United Kingdom (Jun. 2014).
Yu, C., et al., "Novel aptamer-nanoparticle bioconjugates enhances delivery of anticancer drug to MUC1-positive cancer cells in vitro," PLoS One 6(9):e24077, Public Library of Science, United States (Sep. 2011).
Zack, D. J., et al., "Novel structural features of autoantibodies in murine lupus: a possible superantigen binding site?," Immunol Cell Biol 72(6):513-520, John Wiley & Sons, Inc., United States (Dec. 1994).
Zack, D. J., et al., "DNA mimics a self-protein that may be a target for some anti-DNA antibodies in systemic lupus erythematosus," J Immunol 154(4):1987-1994, American Association of Immunologists, United States (Feb. 1995).
Zack, D. J., et al., "Mechanisms of cellular penetration and nuclear localization of an anti-double strand DNA autoantibody," J Immunol 157(5):2082-2088, American Association of Immunologists, United States (Sep. 1996).
Zhou, J., et al., "Biodegradable poly(amine-co-ester) terpolymers for targeted gene delivery," Nat Mater 11(1):82-90, Nature Publishing Group, United Kingdom (Dec. 2011).
Zielke, H. R., and Littlefield, J. W., "Repetitive synchronization of human lymphoblast cultures with excess thymidine," Methods Cell Biol 8(0):107-121, Elsevier, Netherlands (1974).
Chen, Z., et al., "A lupus anti-DNA autoantibody mediates autocatalytic, targeted delivery of nanoparticles to tumors," Oncotarget. 7(37):59965-59975, Impact Journals, United States (2016).
Hansen, J.E., et al., "Antibody-mediated Hsp70 protein therapy," Brain. Res. 1088:187-196, Elsevier, Netherlands (2006).
Hansen, J.E., et al., "Antibody-Mediated p53 Protein Therapy Prevents Liver Metastasis In vivo," Cancer Res. 67(4):1769-1774, American Association for Cancer Research, United States (2007).
Hansen, J.E., et al., "Intranuclear protein transduction through a nucleoside salvage pathway," J. Biol. Chem. 282(29):20790-20793, American Society for Biochemistry and Molecular Biology, United States (2007).

(56) References Cited

OTHER PUBLICATIONS

Hansen, J.E., et al., "Targeting cancer with a lupus autoantibody," Sci. Transl. Med. 4(157):157, American Association for the Advancement of Science, United States (2012).

Pinder, J., et al., "Nuclear domain 'knock-in' screen for the evaluation and identification of small molecule enhancers of CRISPR-based genome editing," Nucleic Acids Res. 43(19):9379-9392, Oxford University Press, United Kingdom (2015).

Spertini, F., et al., "Idiotypic vaccination with a murine anti-dsDNA antibody: phase I study in patients with nonactive systemic lupus erythematosus with nephritis," J. Rheumatol. 26(12):2602-2608, Journal of Rheumatology Publishing Company, Canada (1999).

Turchick, A., et al., "Synthetic lethality of a cell-penetrating anti-RAD51 antibody in PTEN-deficient melanoma and glioma cells," Oncotarget. 10(13):1272-1283, Impact Journals, United Kingdom (2019).

Weisbart, R.H., et al., "A conserved anti-DNA antibody idiotype associated with nephritis in murine and human systemic lupus erythematosus," J. Immunol. 144(7):2653-2658, American Association of Immunologists, United States (1990).

Weisbart, R.H., et al., "Beneficial Effects of Oral Immunoglobulin in Rheumatoid Arthritis," J. Clin. Rheumatol. 1(2):135, Lippincott Williams &Wilkins, United States (1995).

Weisbart, R.H., et al., "Novel Protein Transfection of Primary Rat Cortical Neurons Using an Antibody That Penetrates Living Cells," J, Immunol. 164(11):6020-6026, American Association of Immunologists, United States (2000).

Weisbart, R.H., et al., "Cell type specific targeted intracellular delivery into muscle of a monoclonal antibody that minds myosin lib," Mol. Immunol. 39(13):783-789, Pergamon Press, United Kingdom (2003).

Weisbart, R.H., et al., "Nuclear delivery of p53 C-terminal peptides into cancer cells using scFv fragments of a monoclonal antibody that penetrates living cells," Cancer Lett. 195(2):211-219, Elsevier, Netherlands (2003).

Weisbart, R.H., et al., "Construction and expression of a bispecific single-chain antibody that penetrates mutant p53 colon cancer cells and binds p53," Int. J. Oncol. 25(4):1113-1118, Spandidos Publications, Greece (2004).

Weisbart, R.H., et al., "An intracellular delivery vehicle for protein transduction of micro-dystrophin," J. Drug. Target. 13(2):81-87, Informa, United Kingdom (2005).

Weisbart, R.H., et al., "A cell-penetrating bispecific antibody for therapeutic regulation of intracellular targets," Mol. Cancer. Ther. 11(10):2169-2173, American Association for Cancer Research Inc., United States (2012).

Zhan, X., et al., "Recombinant Fv-Hsp70 protein mediates neuroprotection after focal cerebral ischemia in rats," Stroke. 41(3):538-543, Lippincot Williams & Wilkins, United States (2010).

U.S. Appl. No. 18/054,101, Quijano, E. et al., filed Nov. 9, 2022 (Not Published) (pending).

U.S. Appl. No. 17/638,642, Quijano, E. et al., filed Feb. 25, 2022 (Not Published) (pending).

U.S. Appl. No. 17/823,496, Quijano, E. et al., filed Aug. 30, 2022 (Not Published) (pending).

U.S. Appl. No. 17/823,488, Quijano, E. et al., filed Aug. 30, 2022 (Not Published) (pending).

U.S. Appl. No. 17/823,494, Quijano, E. et al., filed Aug. 30, 2022 (Not Published) (pending).

U.S. Appl. No. 17/823,492, Quijano, E. et al., filed Aug. 30, 2022 (Not Published) (pending).

U.S. Appl. No. 18/054,080, Quijano, E. et al., filed Nov. 9, 2022 (Not Published) (pending).

Non-Final Office Action mailed Mar. 3, 2023 in U.S. Appl. No. 17/823,494, Quijano, E., et al., filed Aug. 30, 2022, 21 pages.

Zhumei , H., "9.3 Site-directed Mutagenesis of DNA in Vitro," in Modern Genetics Course, 1st Ed., pp. 349-350, Sun Yat-Sen University Press, Guangzhou, China (Mar. 2002).

Non-Final Office Action mailed Aug. 29, 2024 in U.S. Appl. No. 17/272,151, Quijano, E., et al., § 371(c) Date: Feb. 26, 2021, 27 pages.

Bedell, V.M., et al., "In Vivo Genome Editing Using a High-efficiency TALEN System," Nature 491(7422):114-118, Nature Publishing Group, United Kingdom (Nov. 2012).

Interview Summary mailed on Dec. 29, 2022, in U.S. Appl. No. 17/823,492, Quijano, E., et al., filed Aug. 30, 2022, 10 pages.

Liu, J., et al., "Cell-penetrating Peptide-mediated Delivery of TALEN Proteins via Bioconjugation for Genome Engineering," PLoS One 9(1):e85755, Public Library of Science, United States (Jan. 2014).

McCaffrey, J., et al., "CRISPR-CAS9 D10A Nickase Target-specific Fluorescent Labeling of Double Strand DNA for Whole Genome Mapping and Structural Variation Analysis," Nucleic Acids Research 44(2):e11, Oxford University Press, United Kingdom (Jan. 2016).

Trevino, A.E., and Zhang, F., "Genome Editing Using Cas9 Nickases," Methods in Enzymology 546:161-174, Academic Press, United States (2014).

* cited by examiner

COMPOSITIONS AND METHODS FOR ENHANCING DONOR OLIGONUCLEOTIDE-BASED GENE EDITING

CROSS-REFERENCE TO RELATED APPLICATION

This application is a National Phase application under 35 U.S.C. § 371 of International Application No. PCT/US2019/048953, filed on Aug. 30, 2019, which claims the benefit of and priority to U.S. Ser. No. 62/725,920, filed Aug. 31, 2018, which are specifically incorporated by reference herein in their entireties.

STATEMENT REGARDING FEDERALLY SPONSORED RESEARCH

This invention was made with government support under CA168733 and CA197574 awarded by National Institutes of Health. The Government has certain rights in the invention.

REFERENCE TO THE SEQUENCE LISTING

The Sequence Listing submitted as a text file named "YU_7503_PCT" created on Aug. 28, 2019, and having a size of 61,341 bytes is hereby incorporated by reference pursuant to 37 C.F.R. § 1.52(e)(5).

FIELD OF THE INVENTION

The invention is generally related to the field of gene editing technology, and more particularly to compositions and uses of potentiating agents such as cell-penetrating anti-DNA antibodies, and donor oligonucleotides in methods of ex vivo and in vivo gene editing.

BACKGROUND OF THE INVENTION

Gene editing provides an attractive strategy for treatment of inherited genetic disorders such as sickle cell anemia and β-thalassemia. Genes can be selectively edited by several methods, including targeted nucleases such as zinc finger nucleases (ZFNs) (Haendel, et al., *Gene Ther.,* 11:28-37 (2011)) and CRISPRs (Yin, et al., *Nat. Biotechnol.,* 32:551-553 (2014)), short fragment homologous recombination (SFHR) (Goncz, et al., *Oligonucleotides,* 16:213-224 (2006)), or triplex-forming oligonucleotides (TFOs) (Vasquez, et al., *Science,* 290:530-533 (2000)). It is generally thought that a DNA break in a target gene is needed for high efficiency gene editing with a donor DNA. Hence, there has been widespread focus on targeted nucleases such as CRISPR/Cas9 technology because of its ease of use and facile reagent design (Doudna, et al., *Science,* 346:1258096 (2014)). However, like ZFNs, the CRISPR approach introduces an active nuclease into cells, which can lead to off-target cleavage in the genome (Cradick, et al., *Nucleic Acids Res.,* 41:9584-9592 (2013)), a problem that so far has not been eliminated.

In addition, the efficiency of gene modification could be low, especially in the context of CRISPR/Cas-mediated editing in primary stem cells. For example, in an attempt to correct the CFTR locus in cystic fibrosis patient derived stem cells, approximately 0.3% of treated organoids (3 to 6/1400) had the desired modification (Schwank, et al., *Cell Stem Cell.,* 13:653-658 (2013)).

Accordingly, there remains a need for compositions and methods for improved gene editing.

It is therefore an object of the invention to provide compositions and methods for achieving on-target modification with reduced or low off-target modification.

It is another object of the invention to provide compositions and methods for achieving an increased frequency of gene modification.

It is a further object of the invention to provide compositions and methods for gene modification that improve one or more symptoms of a disease or disorder in a subject.

SUMMARY OF THE INVENTION

It has been discovered that treatment of cells with a cell-penetrating, anti-DNA, lupus enhances targeted gene editing by donor DNAs alone, in the absence of a nuclease or a PNA. As described in the Examples, it has been discovered that eMab 3E10 boosts gene editing with nanoparticles containing donor DNA alone. It was also discovered that 3E10 promotes gene editing by naked donor DNAs alone in cells in culture and in mice in vivo, without any associated nuclease or PNA and without encapsulation in a nanoparticle for delivery.

Thus, compositions for enhancing targeted gene editing and methods of use thereof are disclosed. In some embodiments, the composition contains a potentiating agent such as a cell-penetrating antibody, and a donor oligonucleotide containing a sequence that can correct a mutation in a cell's genome. Preferably, the composition does not contain a nuclease (e.g., transcription activator-like effector nuclease (TALEN), ZFN, Cas9), peptide nucleic acid (PNA), or nanoparticle. Typically, the donor oligonucleotide is not covalently linked to the cell-penetrating antibody. The oligonucleotide (e.g., DNA) may be single stranded or double stranded. Preferably, the oligonucleotide is single stranded DNA.

In some embodiments, the oligonucleotide sequence corresponds to the wild type sequence of a mutated gene underlying a disease or disorder (e.g., hemophilia, muscular dystrophy, globinopathies, cystic fibrosis, xeroderma pigmentosum, lysosomal storage diseases, immune deficiency syndromes such as X-linked severe combined immunodeficiency and ADA deficiency, tyrosinemia, Fanconi anemia, the red cell disorder spherocytosis, alpha-1-anti-trypsin deficiency, Wilson's disease, Leber's hereditary optic neuropathy, or chronic granulomatous disorder). Exemplary genes include genes encoding coagulation factor VIII, coagulation factor IX, dystrophin, beta-globin, CFTR, XPC, XPD, DNA polymerase eta, Fanconi anemia genes A through L, SPTA1 and other spectrin genes, ANK1 gene, SERPINA1 gene, ATP7B gene, interleukin 2 receptor gamma (IL2RG) gene, ADA gene, FAH gene, and genes linked to chronic granulomatous disease including the CYBA, CYBB, NCF1, NCF2, or NCF4 genes, etc.

The potentiating agent typically increases gene editing by the donor oligonucleotide. In preferred embodiments, the potentiating agent is a cell-penetrating antibody. In some embodiments, the potentiating agent is an anti-RAD51 factor. The cell-penetrating antibody may be an anti-DNA antibody which is transported into the cytoplasm and/or nucleus of the cell without the aid of a carrier or conjugate.

In some embodiments, the cell-penetrating anti-DNA antibody is isolated or derived from a subject with systemic lupus erythematous or an animal model thereof (e.g., such as a mouse or rabbit). In a preferred embodiment, the cell-penetrating anti-DNA antibody is the monoclonal anti-DNA antibody 3E10, or a variant, fragment, or humanized form thereof that binds the same epitope(s) as 3E10. A particularly preferred variant is a 3E10 variant incorporating a D31N substitution in the heavy chain. The cell-penetrating anti-DNA antibody may have the same or different epitope specificity as monoclonal antibody 3E10 produced by ATCC No. PTA 2439 hybridoma.

In some embodiments, the antibody has
(i) the CDRs of any one of SEQ ID NO:1-6, 12, or 13 in combination with the CDRs of any one of SEQ ID NO:7-11, or 15;
(ii) first, second, and third heavy chain CDRs selected from SEQ ID NOS:15-23 in combination with first, second and third light chain CDRs selected from SEQ ID NOS:24-30;
(iii) humanized forms of (i) or (ii);
(iv) a heavy chain comprising an amino acid sequence comprising at least 85% sequence identity to any one of SEQ ID NO:1 or 2 in combination with a light chain comprising an amino acid sequence comprising at least 85% sequence identity to SEQ ID NO:7 or 8;
(v) a humanized form or (iv); or
(vi) a heavy chain comprising an amino acid sequence comprising at least 85% sequence identity to any one of SEQ ID NO:3-6 in combination with a light chain comprising an amino acid sequence comprising at least 85% sequence identity to SEQ ID NO:9-11.

Preferably, the antibody can bind directly to RAD51. In some embodiments, the anti-DNA antibody has the paratope of monoclonal antibody 3E10. The anti-DNA antibody may be a single chain variable fragment of an anti-DNA antibody, or conservative variant thereof. For example, the anti-DNA antibody can be a monovalent, divalent, or multivalent single chain variable fragment of 3E10 (3E10 Fv), or a variant, for example a conservative variant, thereof. In some embodiments, the anti-DNA antibody is a monovalent, divalent, or multivalent single chain variable fragment of 3E10 (3E10 Fv) incorporating a D31N substitution in the heavy chain.

Also provided is a pharmaceutical composition containing a potentiating agent, such as a cell-penetrating antibody, and donor oligonucleotides in a pharmaceutically acceptable excipient. The compositions may be used to modify the genome of a cell by contacting the cell with an effective amount of the composition.

Also provided is a method of modifying the genome of a cell by contacting the cell with an effective amount of (i) a potentiating agent such as a cell-penetrating antibody, and (ii) a donor oligonucleotide containing a sequence that can correct a mutation in a cell's genome. Genomic modification may occur at a higher frequency when cells are contacted with both (i) and (ii), than when contacted with (ii) in the absence of (i). Preferably, the method does not involve contacting the cell with a nuclease (e.g., ZFN, Cas9) or peptide nucleic acid (PNA).

The donor oligonucleotide(s) may be separately encapsulated in nanoparticles. The nanoparticles may be formed from polyhydroxy acids (e.g., poly(lactic-co-glycolic acid) (PLGA)). The nanoparticles may be prepared by double emulsion. In some embodiments, a targeting moiety, a cell penetrating peptide, or a combination thereof is associated with, linked, conjugated, or otherwise attached directly or indirectly to the nanoparticle.

In some embodiments, the cells (e.g., hematopoietic stem cells) are contacted ex vivo and the cells may further be administered to a subject in need thereof. The cells may be administered to the subject in an effective amount to treat one or more symptoms of a disease or disorder. In other embodiments, the cells are contacted in vivo following administration of the cell-penetrating antibody and donor oligonucleotide to a subject.

The subject may have a disease or disorder such as hemophilia, muscular dystrophy, globinopathies, cystic fibrosis, xeroderma pigmentosum, lysosomal storage diseases, immune deficiency syndromes such as X-linked severe combined immunodeficiency and ADA deficiency, tyrosinemia, Fanconi anemia, the red cell disorder spherocytosis, alpha-1-anti-trypsin deficiency, Wilson's disease, Leber's hereditary optic neuropathy, or chronic granulomatous disorder. In such embodiments, gene modification may occur in an effective amount to reduce one or more symptoms of the disease or disorder in the subject.

DETAILED DESCRIPTION OF THE INVENTION

I. Definitions

Figure 1:
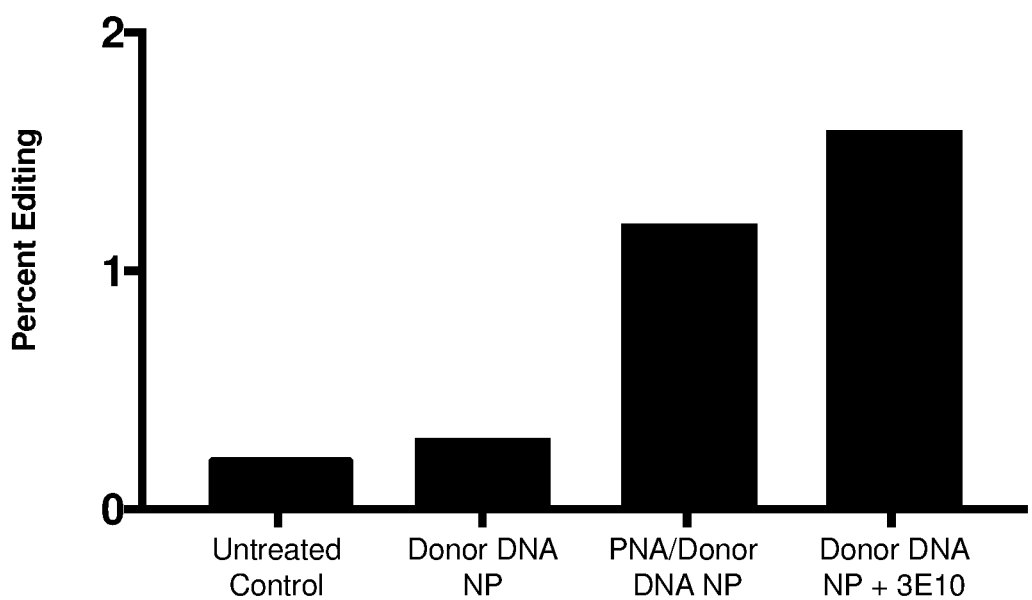
FIG. 1 is a bar graph showing gene correction of the IVS2-654 (C→T) mutation within the β-globin/GFP fusion gene in MEFs treated with 1) NPs containing donor DNA alone, 2) NPs containing donor DNA and PNA, and 3) NPs containing donor DNA alone and 3E10. Percent gene editing was determined by the fraction of GFP$^+$ MEFs assessed by flow cytometry.

As used herein, the term "single chain Fv" or "scFv" as used herein means a single chain variable fragment that includes a light chain variable region (VL) and a heavy chain variable region (VH) in a single polypeptide chain joined by a linker which enables the scFv to form the desired structure for antigen binding (i.e., for the VH and VL of the single polypeptide chain to associate with one another to form a Fv). The VL and VH regions may be derived from the parent antibody or may be chemically or recombinantly synthesized.

As used herein, the term "variable region" is intended to distinguish such domain of the immunoglobulin from domains that are broadly shared by antibodies (such as an antibody Fc domain). The variable region includes a "hypervariable region" whose residues are responsible for antigen binding. The hypervariable region includes amino acid residues from a "Complementarity Determining Region" or "CDR" (i.e., typically at approximately residues 24-34 (L1), 50-56 (L2) and 89-97 (L3) in the light chain variable domain and at approximately residues 27-35 (H1), 50-65 (H2) and 95-102 (H3) in the heavy chain variable domain; Kabat et al., Sequences of Proteins of Immunological Interest, 5th Ed. Public Health Service, National Institutes of Health, Bethesda, MD (1991)) and/or those residues from a "hypervariable loop" (i.e., residues 26-32 (L1), 50-52 (L2) and 91-96 (L3) in the light chain variable domain and 26-32 (H1), 53-55 (H2) and 96-101 (H3) in the heavy chain variable domain; Chothia and Lesk, 1987, J. Mol. Biol. 196:901-917).

As used herein, the term "Framework Region" or "FR" residues are those variable domain residues other than the hypervariable region residues as herein defined.

As used herein, the term "antibody" refers to natural or synthetic antibodies that bind a target antigen. The term includes polyclonal and monoclonal antibodies. In addition to intact immunoglobulin molecules, also included in the term "antibodies" are binding proteins, fragments, and polymers of those immunoglobulin molecules, and human or humanized versions of immunoglobulin molecules that bind the target antigen.

As used herein, the term "cell-penetrating antibody" refers to an immunoglobulin protein, fragment, variant thereof, or fusion protein based thereon that is transported into the cytoplasm and/or nucleus of living mammalian cells. The "cell-penetrating anti-DNA antibody" specifically binds DNA (e.g., single-stranded and/or double-stranded DNA). In some embodiments, the antibody is transported into the cytoplasm of the cells without the aid of a carrier or conjugate. In other embodiments, the antibody is conjugated to a cell-penetrating moiety, such as a cell penetrating peptide. In some embodiments, the cell-penetrating antibody is transported in the nucleus with or without a carrier or conjugate.

In addition to intact immunoglobulin molecules, also included in the term "antibodies" are fragments, binding proteins, and polymers of immunoglobulin molecules, chimeric antibodies containing sequences from more than one species, class, or subclass of immunoglobulin, such as human or humanized antibodies, and recombinant proteins containing a least the idiotype of an immunoglobulin that specifically binds DNA. The antibodies can be tested for their desired activity using the in vitro assays described herein, or by analogous methods, after which their in vivo therapeutic activities are tested according to known clinical testing methods.

As used herein, the term "variant" refers to a polypeptide or polynucleotide that differs from a reference polypeptide or polynucleotide, but retains essential properties. A typical variant of a polypeptide differs in amino acid sequence from another, reference polypeptide. Generally, differences are limited so that the sequences of the reference polypeptide and the variant are closely similar overall and, in many regions, identical. A variant and reference polypeptide may differ in amino acid sequence by one or more modifications (e.g., substitutions, additions, and/or deletions). A substituted or inserted amino acid residue may or may not be one encoded by the genetic code. A variant of a polypeptide may be naturally occurring such as an allelic variant, or it may be a variant that is not known to occur naturally.

Modifications and changes can be made in the structure of the polypeptides of in disclosure and still obtain a molecule having similar characteristics as the polypeptide (e.g., a conservative amino acid substitution). For example, certain amino acids can be substituted for other amino acids in a sequence without appreciable loss of activity. Because it is the interactive capacity and nature of a polypeptide that defines that polypeptide's biological functional activity, certain amino acid sequence substitutions can be made in a polypeptide sequence and nevertheless obtain a polypeptide with like properties.

In making such changes, the hydropathic index of amino acids can be considered. The importance of the hydropathic amino acid index in conferring interactive biologic function on a polypeptide is generally understood in the art. It is known that certain amino acids can be substituted for other amino acids having a similar hydropathic index or score and still result in a polypeptide with similar biological activity. Each amino acid has been assigned a hydropathic index on the basis of its hydrophobicity and charge characteristics. Those indices are: isoleucine (+4.5); valine (+4.2); leucine (+3.8); phenylalanine (+2.8); cysteine/cystine (+2.5); methionine (+1.9); alanine (+1.8); glycine (−0.4); threonine (−0.7); serine (−0.8); tryptophan (−0.9); tyrosine (−1.3); proline (−1.6); histidine (−3.2); glutamate (−3.5); glutamine (−3.5); aspartate (−3.5); asparagine (−3.5); lysine (−3.9); and arginine (−4.5).

It is believed that the relative hydropathic character of the amino acid determines the secondary structure of the resultant polypeptide, which in turn defines the interaction of the polypeptide with other molecules, such as enzymes, substrates, receptors, antibodies, antigens, and cofactors. It is known in the art that an amino acid can be substituted by another amino acid having a similar hydropathic index and still obtain a functionally equivalent polypeptide. In such changes, the substitution of amino acids whose hydropathic indices are within ±2 is preferred, those within ±1 are particularly preferred, and those within ±0.5 are even more particularly preferred.

Substitution of like amino acids can also be made on the basis of hydrophilicity, particularly where the biological functional equivalent polypeptide or peptide thereby created is intended for use in immunological embodiments. The following hydrophilicity values have been assigned to amino acid residues: arginine (+3.0); lysine (+3.0); aspartate (+3.0±1); glutamate (+3.0±1); serine (+0.3); asparagine (+0.2); glutamnine (+0.2); glycine (0); proline (−0.5±1); threonine (−0.4); alanine (−0.5); histidine (−0.5); cysteine (−1.0); methionine (−1.3); valine (−1.5); leucine (−1.8); isoleucine (−1.8); tyrosine (−2.3); phenylalanine (−2.5); tryptophan (−3.4). It is understood that an amino acid can be substituted for another having a similar hydrophilicity value and still obtain a biologically equivalent, and in particular, an immunologically equivalent polypeptide. In such changes, the substitution of amino acids whose hydrophilicity values are within ±2 is preferred, those within ±1 are particularly preferred, and those within ±0.5 are even more particularly preferred.

As outlined above, amino acid substitutions are generally based on the relative similarity of the amino acid side-chain substituents, for example, their hydrophobicity, hydrophilicity, charge, size, and the like. Exemplary substitutions that take various of the foregoing characteristics into consideration are well known to those of skill in the art and include (original residue: exemplary substitution): (Ala: Gly, Ser), (Arg: Lys), (Asn: Gln, His), (Asp: Glu, Cys, Ser), (Gln: Asn), (Glu: Asp), (Gly: Ala), (His: Asn, Gln), (Ile: Leu, Val), (Leu: Ile, Val), (Lys: Arg), (Met: Leu, Tyr), (Ser: Thr), (Thr: Ser), (Tip: Tyr), (Tyr: Trp, Phe), and (Val: Ile, Leu). Embodiments of this disclosure thus contemplate functional or biological equivalents of a polypeptide as set forth above. In particular, embodiments of the polypeptides can include variants having about 50%, 60%, 70%, 80%, 90%, 95%, 96%, 97%, 98%, 99%, or more sequence identity to the polypeptide of interest.

As used herein, the term "percent (%) sequence identity" is defined as the percentage of nucleotides or amino acids in a candidate sequence that are identical with the nucleotides or amino acids in a reference nucleic acid sequence, after aligning the sequences and introducing gaps, if necessary, to achieve the maximum percent sequence identity. Alignment for purposes of determining percent sequence identity can be achieved in various ways that are within the skill in the art, for instance, using publicly available computer software such as BLAST, BLAST-2, ALIGN, ALIGN-2 or Megalign (DNASTAR) software. Appropriate parameters for measuring alignment, including any algorithms needed to achieve maximal alignment over the full-length of the sequences being compared can be determined by known methods.

For purposes herein, the % sequence identity of a given nucleotides or amino acids sequence C to, with, or against a given nucleic acid sequence D (which can alternatively be phrased as a given sequence C that has or includes a certain % sequence identity to, with, or against a given sequence D) is calculated as follows:

$$100 \text{ times the fraction } W/Z,$$

where W is the number of nucleotides or amino acids scored as identical matches by the sequence alignment program in that program's alignment of C and D, and where Z is the total number of nucleotides or amino acids in D. It will be appreciated that where the length of sequence C is not equal to the length of sequence D, the % sequence identity of C to D will not equal the % sequence identity of D to C.

As used herein, the term "specifically binds" refers to the binding of an antibody to its cognate antigen (for example, DNA) while not significantly binding to other antigens. Specific binding of an antibody to a target under such conditions requires the antibody be selected for its specificity to the target. A variety of immunoassay formats may be used to select antibodies specifically immunoreactive with a particular protein. For example, solid-phase ELISA immunoassays are routinely used to select monoclonal antibodies specifically immunoreactive with a protein. See, e.g., Harlow and Lane (1988) Antibodies, A Laboratory Manual, Cold Spring Harbor Publications, New York, for a description of immunoassay formats and conditions that can be used to determine specific immunoreactivity. Preferably, an antibody "specifically binds" to an antigen with an affinity constant (Ka) greater than about $10^5$ mol$^{-1}$ (e.g., $10^6$ mol$^{-1}$, $10^7$ mol$^{-1}$, $10^8$ mol$^{-1}$, $10^9$ mol$^{-1}$, $10^{10}$ mol$^{-1}$, $10^{11}$ mol$^{-1}$, and $10^{12}$ mol$^{-1}$ or more) with that second molecule.

As used herein, the term "monoclonal antibody" or "MAb" refers to an antibody obtained from a substantially homogeneous population of antibodies, i.e., the individual antibodies within the population are identical except for possible naturally occurring mutations that may be present in a small subset of the antibody molecules.

As used herein a "gene editing potentiating factor" or "gene editing potentiating agent" or "potentiating factor or potentiating agent" refers to a compound that increases the efficacy of editing (e.g., mutation, including insertion, deletion, substitution, etc.) of a gene, genome, or other nucleic acid by a donor oligonucleotide relative to use of the donor oligonucleotide in the absence of the compound.

As used herein, the term "subject" means any individual who is the target of administration. The subject can be a vertebrate, for example, a mammal. Thus, the subject can be a human. The term does not denote a particular age or sex.

As used herein, the term "effective amount" means that the amount of the composition used is of sufficient quantity to ameliorate one or more causes or symptoms of a disease or disorder. Such amelioration only requires a reduction or alteration, not necessarily elimination. The precise dosage will vary according to a variety of factors such as subject-dependent variables (e.g., age, immune system health, etc.), the disease or disorder being treated, as well as the route of administration and the pharmacokinetics of the agent being administered.

As used herein, the term "pharmaceutically acceptable" refers to a material that is not biologically or otherwise undesirable, i.e., the material may be administered to a subject without causing any undesirable biological effects or interacting in a deleterious manner with any of the other components of the pharmaceutical composition in which it is contained.

As used herein, the term "carrier" or "excipient" refers to an organic or inorganic ingredient, natural or synthetic inactive ingredient in a formulation, with which one or more active ingredients are combined. The carrier or excipient would naturally be selected to minimize any degradation of the active ingredient and to minimize any adverse side effects in the subject, as would be well known to one of skill in the art.

As used herein, the term "treat" refers to the medical management of a patient with the intent to cure, ameliorate, stabilize, or prevent a disease, pathological condition, or disorder. This term includes active treatment, that is, treatment directed specifically toward the improvement of a disease, pathological condition, or disorder, and also includes causal treatment, that is, treatment directed toward removal of the cause of the associated disease, pathological condition, or disorder. In addition, this term includes palliative treatment, that is, treatment designed for the relief of symptoms rather than the curing of the disease, pathological condition, or disorder; preventative treatment, that is, treatment directed to minimizing or partially or completely inhibiting the development of the associated disease, pathological condition, or disorder; and supportive treatment, that is, treatment employed to supplement another specific therapy directed toward the improvement of the associated disease, pathological condition, or disorder.

As used herein, "targeting moiety" is a substance which can direct a particle or molecule to a receptor site on a selected cell or tissue type, can serve as an attachment molecule, or serve to couple or attach another molecule. As used herein, "direct" refers to causing a molecule to preferentially attach to a selected cell or tissue type. This can be used to direct cellular materials, molecules, or drugs, as discussed below.

As used herein, the term "inhibit" or "reduce" means to decrease an activity, response, condition, disease, or other biological parameter. This can include, but is not limited to, the complete ablation of the activity, response, condition, or disease. This may also include, for example, a 10% reduction in the activity, response, condition, or disease as compared to the native or control level. Thus, the reduction can be a 10, 20, 30, 40, 50, 60, 70, 80, 90, 100%, or any amount of reduction in between as compared to native or control levels.

As used herein, a "fusion protein" refers to a polypeptide formed by the joining of two or more polypeptides through a peptide bond formed between the amino terminus of one polypeptide and the carboxyl terminus of another polypeptide. The fusion protein can be formed by the chemical coupling of the constituent polypeptides or it can be expressed as a single polypeptide from a nucleic acid sequence encoding the single contiguous fusion protein. A single chain fusion protein is a fusion protein having a single contiguous polypeptide backbone. Fusion proteins can be prepared using conventional techniques in molecular biology to join the two genes in frame into a single nucleic acid sequence, and then expressing the nucleic acid in an appropriate host cell under conditions in which the fusion protein is produced.

Recitation of ranges of values herein are merely intended to serve as a shorthand method of referring individually to each separate value falling within the range, unless otherwise indicated herein, and each separate value is incorporated into the specification as if it were individually recited herein.

Use of the term "about" is intended to describe values either above or below the stated value in a range of approx. +/−10%; in other embodiments the values may range in value either above or below the stated value in a range of approx. +/−5%; in other embodiments the values may range in value either above or below the stated value in a range of approx. +/−2%; in other embodiments the values may range in value either above or below the stated value in a range of approx. +/−1%. The preceding ranges are intended to be made clear by context, and no further limitation is implied.

All methods described herein can be performed in any suitable order unless otherwise indicated or otherwise clearly contradicted by context. The use of any and all examples, or exemplary language (e.g., "such as") provided herein, is intended merely to better illuminate the embodiments and does not pose a limitation on the scope of the embodiments unless otherwise claimed. No language in the specification should be construed as indicating any non-claimed element as essential to the practice of the invention.

II. Compositions

Compositions for enhancing targeted gene editing and methods of use thereof are disclosed. The disclosed methods typically include contacting cells with both a potentiating agent and a donor oligonucleotide. Exemplary potentiating agents and donor oligonucleotides are provides. The potentiating agent and donor oligonucleotide can be part of the same or different compositions.

In some embodiments, potentiating agents can engage one or more endogenous high fidelity DNA repair pathways or inhibit/modulate error prone (i.e. low fidelity) DNA repair pathways. Potentiating agents include, for example, modulators of DNA damage and/or DNA repair factors, modulators of homologous recombination factors, cell adhesion modulators, cell cycle modulators, cell proliferation modulators, and stem cell mobilizers. The potentiating factor may modulate (e.g., alter, inhibit, promote, compete with) one or more endogenous high fidelity DNA repair pathways or inhibit/modulate error prone (i.e. low fidelity) DNA repair pathways. In preferred embodiments, the potentiating factor may be an inhibitor of a DNA damage, DNA repair, or homologous recombination factor. In more preferred embodiments, the potentiating factor may be an inhibitor of RAD51.

For example, an inhibitor of a DNA damage and/or DNA repair factor may be used as a potentiating agent. An inhibitor of a homologous recombination factor may be used as a potentiating agent.

Cells repair DNA breaks mainly through endogenous non-homologous end joining (NHEJ) DNA-repair, the predominant but error-prone pathway that can introduce or delete nucleotides at the DNA-break region. NHEJ is therefore amenable to permanent silencing of target genes. Alternatively, cells can also repair double-strand breaks by homology-directed repair (HDR), a more accurate mechanism involving homologous recombination in the presence of a template DNA strand. Typically, targeted genome editing is directed to correction of a mutated sequence in a genome by replacing the mutated sequence with a corrective sequence provided by a template/donor DNA. As such, there is ongoing effort in the field to identify and utilize mechanisms that favor homologous recombination of a template/donor DNA to enhance efficiency of targeted genome editing. Modulating the expression and/or activity of factors involved in DNA repair is a promising approach to enhance precision genome engineering.

The term "DNA repair" refers to a collection of processes by which a cell identifies and corrects damage to DNA molecules. Single-strand defects are repaired by base excision repair (BER), nucleotide excision repair (NER), or mismatch repair (MMR). Double-strand breaks are repaired by non-homologous end joining (NHEJ), microhomology-mediated end joining (MMEJ), or homologous recombination. After DNA damage, cell cycle checkpoints are activated, which pause the cell cycle to give the cell time to repair the damage before continuing to divide. Checkpoint mediator proteins include BRCA1, MDC1, 53BP1, p53, ATM, ATR, CHK1, CHK2, and p21. Accordingly, a factor involved in any of the above-mentioned processes, including BER, NER, MMR, NHEJ, MMEJ, homologous recombination, or DNA synthesis and the like, may be described as a DNA damage and/or DNA repair factor.

Non-limiting examples of DNA damage, DNA repair, DNA synthesis, or homologous recombination factors include XRCC1, ADPRT (PARP-1), ADPRTL2, (PARP-2), POLYMERASE BETA, CTPS, MLH1, MSH2, FANCD2, PMS2, p53, p21, PTEN, RPA, RPA1, RPA2, RPA3, XPD, ERCC1, XPF, MMS19, RAD51, RAD51B, RAD51C, RAD51D, DMC1, XRCCR, XRCC3, BRCA1, BRCA2, PALB2, RAD52, RAD54, RAD50, MREU, NB51, WRN, BLM, KU70, KU80, ATM, ATR CPIK1, CHK2, FANCA, FANCB, FANCC, FANCD1, FANCD2, FANCE, FANCF, FANCG, FANCC, FANCD1, FANCD2, FANCE, FANCF, FANCG, RAD1, and RAD9. In a preferred embodiment, the DNA damage factor or DNA repair factor is RAD51.

RAD51 recombinase, an ortholog of *E. coli* RecA, is a key protein in homologous recombination in mammalian cells. RAD51 promotes the repair of double-strand breaks, the most harmful type of DNA lesion. Double-strand breaks can be induced by various chemical agents and ionizing radiation, and are also formed during the repair of interstrand crosslinks. Once double-strand breaks are formed, they are processed first by exonucleases to generate extensive 3' single-stranded DNA (ssDNA) tails (Cejka et al., *Nature.*, 467(7311):112-16 (2010); Mimitou & Symington, *DNA Repair.*, 8(9):983-95 (2009)). These tracks of ssDNA rapidly become coated by single strand DNA-binding protein, RPA, which is ultimately displaced from the ssDNA by RAD51. RAD51 has ATP-dependent DNA binding activity, and so binds the ssDNA tails, and multimerizes to form helical nucleoprotein filaments that promote search for homologous dsDNA sequences (Kowalczykowski, *Nature.*, 453(7194):463-6 (2008)). The ability of RAD51 to displace RPA on ssDNA in cells requires several mediator proteins, which include BRCA2, RAD52, the RAD51 paralog complexes, and other proteins (Thompson & Schild, *Mutat Res.*, 477:131-53 (2001)). Once homologous dsDNA sequences are found, RAD51 promotes DNA strand exchange between the ssDNA that resides within the filament and homologous dsDNA, i.e., an invasion of ssDNA into homologous DNA duplex that results in the displacement of the identical ssDNA from the duplex and formation of a joint molecule. Joint molecules, key intermediates of DSB repair, provide both the template and the primer for DNA repair synthesis that is required for double-strand break repair (Paques & Haber, *Microbiol. Mol. Biol. Rev.*, 63(2):349-404 (1999)).

By promoting DNA strand exchange, RAD51 plays a key role in homologous recombination. The protein is evolutionarily conserved from bacteriophages to mammals. In all organisms, RAD51 orthologs play an important role in DNA repair and homologous recombination (Krough & Symington, *Annu. Rev. Genet.*, 38:233-71 (2004); Helleday et al., *DNA Repair*, 6(7):923-35 (2007); Huang et al., *Proc. Natl. Acad. Sci. USA.*, 93(10):4827-32 (1996)).

In preferred embodiments, the potentiating agent is one that antagonizes or reduces expression and/or activity of RAD51, XRCC4, or a combination thereof. For example, in some embodiments, the potentiating agent is a RAD51 and/or XRCC4 inhibitor. Non-limiting examples of potentiating agents include, ribozymes, triplex forming molecules, siRNAs, shRNAs, miRNAs, aptamers, antisense oligonucleotides, small molecules, and antibodies.

Methods for designing and producing any of the foregoing factors are well-known in the art and can be used. For example, predesigned anti-RAD51 siRNAs are commercially available through Dharmacon (as described in the Examples) and may be used as potentiating agents. Likewise, anti-XRCC4 siRNAs, shRNAs and miRNAs are known in the art and are readily available. Further, small molecule inhibitors of XRCC4 and RAD51 are known in the art (e.g., Jekimovs, et al., *Front. Oncol.*, 4:86 (2014)) and can be used as potentiating agents in accordance with the disclosed methods.

A. Cell-Penetrating Antibodies

In some embodiments, the potentiating agent is a cell-penetrating antibody. Although the cell-penetrating molecules are generally referred to herein as "cell-penetrating antibodies," it will be appreciated that fragments and binding proteins, including antigen-binding fragments, variants, and fusion proteins such as scFv, di-scFv, tr-scFv, and other single chain variable fragments, and other cell-penetrating molecules disclosed herein are encompassed by the phrase also expressly provided for use in compositions and methods disclosed herein.

Cell-penetrating antibodies for use in the compositions and methods may be anti-DNA antibodies. The cell-penetrating antibody may bind single stranded DNA and/or double stranded DNA. The cell-penetrating antibody may be an anti-RNA antibody (e.g., the antibody specifically binds RNA).

Autoantibodies to double-stranded deoxyribonucleic acid (dsDNA) are frequently identified in the serum of patients with systemic lupus erythematosus (SLE) and are often implicated in disease pathogenesis. Therefore, in some embodiments, cell-penetrating antibodies (e.g., cell-penetrating anti-DNA antibodies) can be derived or isolated from patients with SLE or animal models of SLE.

In preferred embodiments, the anti-DNA antibodies are monoclonal antibodies, or antigen binding fragments or variants thereof. In some embodiments, the anti-DNA antibodies are conjugated to a cell-penetrating moiety, such as a cell penetrating peptide to facilitate entry into the cell and transport to the cytoplasm and/or nucleus. Examples of cell penetrating peptides include, but are not limited to, Polyarginine (e.g., R9), Antennapedia sequences, TAT, HIV-Tat, Penetratin, Antp-3A (Antp mutant), Buforin II, Transportan, MAP (model amphipathic peptide), K-FGF, Ku70, Prion, pVEC, Pep-1, SynB1, Pep-7, HN-1, BGSC (Bis-Guanidinium-Spermidine-Cholesterol, and BGTC (Bis-Guanidinium-Tren-Cholesterol). In other embodiments, the antibody is modified using TransMabs™ technology (InNexus Biotech., Inc., Vancouver, BC).

In preferred embodiments, the anti-DNA antibody is transported into the cytoplasm and/or nucleus of the cells without the aid of a carrier or conjugate. For example, the monoclonal antibody 3E10 and active fragments thereof that are transported in vivo to the nucleus of mammalian cells without cytotoxic effect are disclosed in U.S. Pat. Nos. 4,812,397 and 7,189,396 to Richard Weisbart. Briefly, the antibodies may be prepared by fusing spleen cells from a host having elevated serum levels of anti-DNA antibodies (e.g., MRL/1pr mice) with myeloma cells in accordance with known techniques or by transforming the spleen cells with an appropriate transforming vector to immortalize the cells. The cells may be cultured in a selective medium and screened to select antibodies that bind DNA.

In some embodiments, the cell-penetrating antibody may bind and/or inhibit Rad51. See for example, the cell-penetrating antibody described in Turchick, et al., *Nucleic Acids Res.*, 45(20): 11782-11799 (2017).

Antibodies that can be used in the compositions and methods include whole immunoglobulin (i.e., an intact antibody) of any class, fragments thereof, and synthetic proteins containing at least the antigen binding variable domain of an antibody. The variable domains differ in sequence among antibodies and are used in the binding and specificity of each particular antibody for its particular antigen. However, the variability is not usually evenly distributed through the variable domains of antibodies. It is typically concentrated in three segments called complementarity determining regions (CDRs) or hypervariable regions both in the light chain and the heavy chain variable domains. The more highly conserved portions of the variable domains are called the framework (FR). The variable domains of native heavy and light chains each comprise four FR regions, largely adopting a beta-sheet configuration, connected by three CDRs, which form loops connecting, and in some cases forming part of, the beta-sheet structure. The CDRs in each chain are held together in close proximity by the FR regions and, with the CDRs from the other chain, contribute to the formation of the antigen binding site of antibodies. Therefore, the antibodies typically contain at least the CDRs necessary to maintain DNA binding and/or interfere with DNA repair.

1. 3E10 Sequences

In some embodiments, the cell-penetrating anti-DNA antibody is the monoclonal anti-DNA antibody 3E10, or a variant, derivative, fragment, or humanized form thereof that binds the same or different epitope(s) as 3E10. Thus, the cell-penetrating anti-DNA antibody may have the same or different epitope specificity as monoclonal antibody 3E10 produced by ATCC No. PTA 2439 hybridoma. The anti-DNA antibody can have the paratope of monoclonal antibody 3E10. The anti-DNA antibody can be a single chain variable fragment of an anti-DNA antibody, or conservative variant thereof. For example, the anti-DNA antibody can be a single chain variable fragment of 3E10 (3E10 Fv), or a variant thereof.

Amino acid sequences of monoclonal antibody 3E10 are known in the art. For example, sequences of the 3E10 heavy and light chains are provided below, where single underlining indicates the CDR regions identified according to the Kabat system, and in SEQ ID NOS:12-14 italics indicates the variable regions and double underlining indicates the signal peptide. CDRs according to the IMGT system are also provided.

a. 3E10 Heavy Chain

In some embodiments, a heavy chain variable region of 3E10 is:

EVQLVESGGGLVKPGGSRKLSCAASGFTFS<u>DYGMH</u>WVRQAPEKGLEWVA<u>Y
ISSGSSTIYYADTVKG</u>RFTISRDNAKNTLFLQMTSLRSEDTAMYYCAR<u>RG
LLLDY</u>WGQGTTLTVSS (SEQ ID NO: 1; Zack, et al.,
Immunology and Cell Biology, 72: 513-520 (1994);
GenBank: L16981.1 - Mouse Ig rearranged L-chain
gene, partial cds; and GenBank: AAA65679.1 -
immunoglobulin heavy chain, partial [Mus
musculus]).

In some embodiments, a 3E10 heavy chain is expressed as

<u>MGWSCIILFLVATATGVHS</u>*EVQLVESGGGLVKPGGSRKLSCAASGFTFS
DYGMH*WVRQAPEKGLEWVA*YISSGSSTIYYADTVKG*RFTISRDNAKNTL
*FLQMTSLRSEDTAMYYCARRGLLLDYWGQGTTLTVS*AASTKGPSVFPLA
PSSKSTSGGTAALGCLVKDYFPEPVTVSWNSGALTSGVHTFPAVLQSSG
LYSLSSVVTVPSSSLGTQTYICNVNHKPSNTKVDKKVEPKSCDKTHTCP
PCPAPELLGGPSVFLFPPKPKDTLMISRTPEVTCVVVDVSHEDPEVKFN
WYVDGVEVHNAKTKPREEQYNSTYRVVSVLTVLHQDWLNGKEYKCKVSN
KALPAPIEKTISKAKGQPREPQVYTLPPSRDELTKNQVSLTCLVKGFYP
SDIAVEWESNGQPENNYKTTPPVLDSDGSFFLYSKLTVDKSRWQQGNVF
SCSVMHEALHNHYTQKSLSLSPGK (3E10 WT Heavy Chain;
SEQ ID NO: 12).

Variants of the 3E10 antibody which incorporate mutations into the wild type sequence are also known in the art, as disclosed for example, in Zack, et al., *J. Immunol.*, 157(5):2082-8 (1996). For example, amino acid position 31 of the heavy chain variable region of 3E10 has been determined to be influential in the ability of the antibody and fragments thereof to penetrate nuclei and bind to DNA (bolded in SEQ ID NOS:1, 2 and 13). A D31N mutation (bolded in SEQ ID NOS:2 and 13) in CDR1 penetrates nuclei and binds DNA with much greater efficiency than the original antibody (Zack, et al., *Immunology and Cell Biology*, 72:513-520 (1994), Weisbart, et al., *J. Autoimmun.*, 11, 539-546 (1998); Weisbart, *Int. J. Oncol.*, 25, 1867-1873 (2004)).

In some embodiments, an amino acid sequence for a preferred variant of a heavy chain variable region of 3E10 is:

(SEQ ID NO: 2)
EVQLVESGGGLVKPGGSRKLSCAASGFTF<u>SNYGMH</u>WVRQAPEKGLEWVA
<u>YISSGSSTIYYADTVKG</u>RFTISRDNAKNTL<u>FLQMTSLRSEDTAMYYCAR
RGLLLDY</u>WGQGTTLTVSS.

In some embodiments, a 3E10 heavy chain is expressed as

<u>MGWSCIILFLVATATGVHS</u>*EVQLVESGGGLVKPGGSRKLSCAASGFTFSN
YGMH*WVRQAPEKGLEWVA*YISSGSSTIYYADTVKG*RFTISRDNAKNTLFL
*QMTSLRSEDTAMYYCARRGLLLDYWGQGTTLTVS*AASTKGPSVFPLAPSS
KSTSGGTAALGCLVKDYFPEPVTVSWNSGALTSGVHTFPAVLQSSGLYSL
SSVVTVPSSSLGTQTYICNVNHKPSNTKVDKKVEPKSCDKTHTCPPCPAP
ELLGGPSVFLFPPKPKDTLMISRTPEVTCVVVDVSHEDPEVKFNWYVDGV
EVHNAKTKPREEQYNSTYRVVSVLTVLHQDWLNGKEYKCKVSNKALPAPI
EKTISKAKGQPREPQVYTLPPSRDELTKNQVSLTCLVKGFYPSDIAVEWE
SNGQPENNYKTTPPVLDSDGSFFLYSKLTVDKSRWQQGNVFSCSVMHEAL
HNHYTQKSLSLSPGK (3E10 D31N Variant Heavy Chain;
SEQ ID NO: 13).

In some embodiments, the C-terminal serine of SEQ ID NOS:1 or 2 is absent or substituted, with, for example, an alanine, in 3E10 heavy chain variable region.

The complementarity determining regions (CDRs) as identified by Kabat are shown with underlining above and include CDR H1.1 (original sequence): DYGMH (SEQ ID NO:15); CDR H1.2 (with D31N mutation): NYGMH (SEQ ID NO:16); CDR H2.1: YISSGSSTIYYADTVKG (SEQ ID NO:17); CDR H3.1: RGLLLDY (SEQ ID NO:18).

A variant of Kabat CDR H2.1 is YISSGSSTIYY-ADSVKG (SEQ ID NO:19).

Additionally, or alternatively, the heavy chain complementarity determining regions (CDRs) can be defined according to the IMGT system. The complementarity determining regions (CDRs) as identified by the IMGT system include CDR H1.3 (original sequence): GFTFSDYG (SEQ ID NO:20); CDR H1.4 (with D31N mutation): GFTFSNYG (SEQ ID NO:21); CDR H2.2: ISSGSSTI (SEQ ID NO:22); CDR H3.2: ARRGLLLDY (SEQ ID NO:23).

b. 3E10 Light Chain

In some embodiments, a light chain variable region of 3E10 is:

(SEQ ID NO: 7)
DIVLTQSPASLAVSLGQRATISC<u>RASKSVSTSSYSYMH</u>WYQQKPGQPPKL
LIK<u>YASYLES</u>GVPARFSGSGSGTDFTLNIHPVEEEDAATYYC<u>QHSREFPW
T</u>FGGGTKLEIK.

An amino acid sequence for the light chain variable region of 3E10 can also be:

(SEQ ID NO: 8)
DIVLTQSPASLAVSLGQRATISC<u>RASKSVSTSSYSYMH</u>WYQQKPGQPPKL
LIK<u>YASYLES</u>GVPARFSGSGSGTDFHLNIHPVEEEDAATYYC<u>QHSREFPW
T</u>FGGGTKLELK.

In some embodiments, a 3E10 light chain is expressed as

<u>MGWSCIILFLVATATGVHS</u>*DIVLTQSPASLAVSLGQRATISCRASKSVST
SSYSYMH*WYQQKPGQPPKLLIK*YASYLES*GVPARFSGSGSGTDFTLNIHP
VEEEDAATYYC*QHSREFPWT*FGGGTKLEIKRTVAAPSVFIFPPSDEQLKS

-continued

GTASVVCLLNNFYPREAKVQWKVDNALQSGNSQESVTEQDSKDSTYSLSS

TLTLSKADYEKHKVYACEVTHQGLSSPVTKSFNRGEC (3E10 WT

Light Chain; SEQ ID NO: 14)

Other 3E10 light chain sequences are known in the art. See, for example, Zack, et al., *J. Immunol.*, 15; 154(4):1987-94 (1995); GenBank: L16981.1—*Mouse Ig rearranged L-chain gene, partial cds*; GenBank: AAA65681.1—*immunoglobulin light chain, partial* [*Mus musculus*]).

The complementarity determining regions (CDRs) as identified by Kabat are shown with underlining, including

CDR L1.1:
(SEQ ID NO: 24)
RASKSVSTSSYSYMH;

CDR L2.1:
(SEQ ID NO: 25)
YASYLES;

CDR L3.1:
(SEQ ID NO: 26)
QHSREFPWT.

A variant of Kabat CDR L1.1 is RASKSVSTSSYSYLA (SEQ ID NO:27).

A variant of Kabat CDR L2.1 is YASYLQS (SEQ ID NO:28).

Additionally, or alternatively, the heavy chain complementarity determining regions (CDRs) can be defined according to the IMGT system. The complementarity determining regions (CDRs) as identified by the IMGT system include CDR L1.2 KSVSTSSYSY (SEQ ID NO:29); CDR L2.2: YAS (SEQ ID NO:30); CDR L3.2: QHSREFPWT (SEQ ID NO:26).

In some embodiments, the C-terminal end of sequence of SEQ ID NOS:7 or 8 further includes an arginine in the 3E10 light chain variable region.

2. Humanized 3E10

In some embodiments, the antibody is a humanized antibody. Methods for humanizing non-human antibodies are well known in the art. Generally, a humanized antibody has one or more amino acid residues introduced into it from a source that is non-human. These non-human amino acid residues are often referred to as "import" residues, which are typically taken from an "import" variable domain. Antibody humanization techniques generally involve the use of recombinant DNA technology to manipulate the DNA sequence encoding one or more polypeptide chains of an antibody molecule.

Exemplary 3E10 humanized sequences are discussed in WO 2015/106290 and WO 2016/033324, and provided below.

a. Humanized 3E10 Heavy Chain Variable Regions

In some embodiments, a humanized 3E10 heavy chain variable domain includes

EVQLVQSGGGLIQPGGSLRLSCAASGFTFSNYGMHWVRQAPGKGLEWVSY

ISSGSSTIYYADSVKGRFTISRDNSKNTLYLQMNSLRAEDTAVYYCARRG

LLLDYWGQGTTVTVSS (hVH1, SEQ ID NO: 3),
or

-continued
EVQLVESGGGLIQPGGSLRLSCAASGFTFSNYGMHWVRQAPGKGLEWVSY

ISSGSSTIYYADSVKGRFTISRDNSKNTLYLQMTSLRAEDTAVYYCARRG

LLLDYWGQGTTLTVSS (hVH2, SEQ ID NO: 4),
or

EVQLQESGGGVVQPGGSLRLSCAASGFTFSNYGMHWIRQAPGKGLEWVSY

ISSGSSTIYYADSVKGRFTISRDNSKNTLYLQMNSLRSEDTAVYYCARRG

LLLDYWGQGTLVTVSS (hVH3, SEQ ID NO: 5)

EVQLVESGGGLVQPGGSLRLSCSASGFTFSNYGMHWVRQAPGKGLEYVSY

ISSGSSTIYYADTVKGRFTISRDNSKNTLYLQMSSLRAEDTAVYYCVKRG

LLLDYWGQGTLVTVSS (hVH4, SEQ ID NO: 6)

b. Humanized 3E10 Light Chain Variable Regions

In some embodiments, a humanized 3E10 light chain variable domain includes

DIQMTQSPSSLSASVGDRVTITCRASKSVSTSSYSYLAWYQQKPEKAPKL

LIKYASYLQSGVPSRFSGSGSGTDFTLTISSLQPEDFATYYCQHSREFPW

TFGAGTKLELK (hVL1, SEQ ID NO: 9),
or

DIQMTQSPSSLSASVGDRVTISCRASKSVSTSSYSYMHWYQQKPEKAPKL

LIKYASYLQSGVPSRFSGSGSGTDFTLTISSLQPEDVATYYCQHSREFPW

TFGAGTKLELK (hVL2, SEQ ID NO: 10),
or

DIVLTQSPASLAVSPGQRATITCRASKSVSTSSYSYMHWYQQKPGQPPKL

LTYYASYLESGVPARFSGSGSGTDFTLTINPVEANDTANYYCQHSREFPW

TFGQGTKVEIK (hVL3, SEQ ID NO: 11)

3. Fragments, Variants, and Fusion Proteins

The anti-DNA antibody can be composed of an antibody fragment or fusion protein including an amino acid sequence of a variable heavy chain and/or variable light chain that is at least 45%, at least 50%, at least 55%, at least 60%, at least 65%, at least 70%, at least 75%, at least 80%, at least 85%, at least 90%, at least 95%, at least 99%, or 100% identical to the amino acid sequence of the variable heavy chain and/or light chain of 3E10 or a humanized form thereof (e.g., any of SEQ ID NOS:1-11, or the heavy and/or light chains of any of SEQ ID NOS:12-14).

The anti-DNA antibody can be composed of an antibody fragment or fusion protein that includes one or more CDR(s) that is at least 45%, at least 50%, at least 55%, at least 60%, at least 65%, at least 70%, at least 75%, at least 80%, at least 85%, at least 90%, at least 95%, at least 99%, or 100% identical to the amino acid sequence of the CDR(s) of 3E10, or a variant or humanized form thereof (e.g., CDR(s) of any of SEQ ID NOS:1-11, or SEQ ID NOS:12-14, or SEQ ID NOS:15-30). The determination of percent identity of two amino acid sequences can be determined by BLAST protein comparison. In some embodiments, the antibody includes one, two, three, four, five, or all six of the CDRs of the above-described preferred variable domains.

Preferably, the antibody include one of each of a heavy chain CDR1, CDR2, and CDR3 in combination with one of each of a light chain CDR1, CDR2, and CDR3.

Predicted complementarity determining regions (CDRs) of the light chain variable sequence for 3E10 are provided above. See also GenBank: AAA65681.1—*immunoglobulin* light chain, partial [*Mus musculus*] and GenBank: L34051.1—*Mouse Ig rearranged kappa-chain mRNA V-region*. Predicted complementarity determining regions (CDRs) of the heavy chain variable sequence for 3E10 are provide above. See also, for example, Zack, et al., *Immunology and Cell Biology*, 72:513-520 (1994), GenBank Accession number AAA65679.1. Zach, et al., *J. Immunol.* 154 (4), 1987-1994 (1995) and GenBank: L16982.1—*Mouse Ig reagrranged H-chain gene, partial cds*.

Thus, in some embodiments, the cell-penetrating antibody contains the CDRs, or the entire heavy and light chain variable regions, of SEQ ID NO:1 or 2, or the heavy chain region of SEQ ID NO:12 or 13; or a humanized form thereof in combination with SEQ ID NO:7 or 8, or the light chain region of SEQ ID NO:14; or a humanized form thereof. In some embodiments, the cell-penetrating antibody contains the CDRs, or the entire heavy and light chain variable regions, of SEQ ID NO:3, 4, 5, or 6 in combination with SEQ ID NO:9, 10, or 11.

Also included are fragments of antibodies which have bioactivity. The fragments, whether attached to other sequences or not, include insertions, deletions, substitutions, or other selected modifications of particular regions or specific amino acids residues, provided the activity of the fragment is not significantly altered or impaired compared to the nonmodified antibody or antibody fragment.

Techniques can also be adapted for the production of single-chain antibodies specific to an antigenic protein of the present disclosure. Methods for the production of single-chain antibodies are well known to those of skill in the art. A single chain antibody can be created by fusing together the variable domains of the heavy and light chains using a short peptide linker, thereby reconstituting an antigen binding site on a single molecule. Single-chain antibody variable fragments (scFvs) in which the C-terminus of one variable domain is tethered to the N-terminus of the other variable domain via a 15 to 25 amino acid peptide or linker have been developed without significantly disrupting antigen binding or specificity of the binding. The linker is chosen to permit the heavy chain and light chain to bind together in their proper conformational orientation.

The anti-DNA antibodies can be modified to improve their therapeutic potential. For example, in some embodiments, the cell-penetrating anti-DNA antibody is conjugated to another antibody specific for a second therapeutic target in the cytoplasm and/or nucleus of a target cell. For example, the cell-penetrating anti-DNA antibody can be a fusion protein containing 3E10 Fv and a single chain variable fragment of a monoclonal antibody that specifically binds the second therapeutic target. In other embodiments, the cell-penetrating anti-DNA antibody is a bispecific antibody having a first heavy chain and a first light chain from 3E10 and a second heavy chain and a second light chain from a monoclonal antibody that specifically binds the second therapeutic target.

Divalent single-chain variable fragments (di-scFvs) can be engineered by linking two scFvs. This can be done by producing a single peptide chain with two VH and two VL regions, yielding tandem scFvs. ScFvs can also be designed with linker peptides that are too short for the two variable regions to fold together (about five amino acids), forcing scFvs to dimerize. This type is known as diabodies. Diabodies have been shown to have dissociation constants up to 40-fold lower than corresponding scFvs, meaning that they have a much higher affinity to their target. Still shorter linkers (one or two amino acids) lead to the formation of trimers (triabodies or triabodies). Tetrabodies have also been produced. They exhibit an even higher affinity to their targets than diabodies. In some embodiments, the anti-DNA antibody may contain two or more linked single chain variable fragments of 3E10 (e.g., 3E10 di-scFv, 3E10 tri-scFv), or conservative variants thereof. In some embodiments, the anti-DNA antibody is a diabody or triabody (e.g., 3E10 diabody, 3E10 triabody). Sequences for single and two or more linked single chain variable fragments of 3E10 are provided in WO 2017/218825 and WO 2016/033321.

The function of the antibody may be enhanced by coupling the antibody or a fragment thereof with a therapeutic agent. Such coupling of the antibody or fragment with the therapeutic agent can be achieved by making an immunoconjugate or by making a fusion protein, or by linking the antibody or fragment to a nucleic acid such as DNA or RNA (e.g., siRNA), comprising the antibody or antibody fragment and the therapeutic agent.

A recombinant fusion protein is a protein created through genetic engineering of a fusion gene. This typically involves removing the stop codon from a cDNA sequence coding for the first protein, then appending the cDNA sequence of the second protein in frame through ligation or overlap extension PCR. The DNA sequence will then be expressed by a cell as a single protein. The protein can be engineered to include the full sequence of both original proteins, or only a portion of either. If the two entities are proteins, often linker (or "spacer") peptides are also added which make it more likely that the proteins fold independently and behave as expected.

In some embodiments, the cell-penetrating antibody is modified to alter its half-life. In some embodiments, it is desirable to increase the half-life of the antibody so that it is present in the circulation or at the site of treatment for longer periods of time. For example, it may be desirable to maintain titers of the antibody in the circulation or in the location to be treated for extended periods of time. In other embodiments, the half-life of the anti-DNA antibody is decreased to reduce potential side effects. Antibody fragments, such as 3E10Fv may have a shorter half-life than full size antibodies. Other methods of altering half-life are known and can be used in the described methods. For example, antibodies can be engineered with Fc variants that extend half-life, e.g., using Xtend™ antibody half-life prolongation technology (Xencor, Monrovia, CA).

a. Linkers

The term "linker" as used herein includes, without limitation, peptide linkers. The peptide linker can be any size provided it does not interfere with the binding of the epitope by the variable regions. In some embodiments, the linker includes one or more glycine and/or serine amino acid residues. Monovalent single-chain antibody variable fragments (scFvs) in which the C-terminus of one variable domain are typically tethered to the N-terminus of the other variable domain via a 15 to 25 amino acid peptide or linker. The linker is chosen to permit the heavy chain and light chain to bind together in their proper conformational orientation. Linkers in diabodies, triabodies, etc., typically include a shorter linker than that of a monovalent scFv as discussed above. Di-, tri-, and other multivalent scFvs typically include three or more linkers. The linkers can be the same, or different, in length and/or amino acid composition. Therefore, the number of linkers, composition of the linker(s), and length of the linker(s) can be determined based on the desired valency of the scFv as is known in the art. The linker(s) can allow for or drive formation of a di-, tri-, and other multivalent scFv.

For example, a linker can include 4-8 amino acids. In a particular embodiment, a linker includes the amino acid sequence GQSSRSS (SEQ ID NO:31). In another embodiment, a linker includes 15-20 amino acids, for example, 18 amino acids. In a particular embodiment, the linker includes the amino acid sequence GQSSRSSSGGGSSGGGS (SEQ ID NO:32). Other flexible linkers include, but are not limited to, the amino acid sequences Gly-Ser, Gly-Ser-Gly-Ser (SEQ ID NO:33), Ala-Ser, Gly-Gly-Gly-Ser (SEQ ID NO:34), (Gly₄-Ser)₂ (SEQ ID NO:35) and (Gly₄-Ser)₄ (SEQ ID NO:36), and (Gly-Gly-Gly-Gly-Ser)₃ (SEQ ID NO:37).

b. Exemplary Anti-DNA scFv Sequences

Exemplary murine 3E10 scFv sequences, including mono-, di-, and tri-scFv are disclosed in WO 2016/033321 and WO 2017/218825 and provided below. Cell-penetrating antibodies for use in the disclosed compositions and methods include exemplary scFv, and fragments and variants thereof.

The amino acid sequence for scFv 3E10 (D31N) is:

```
                                         (SEQ ID NO: 38)
AGIHDIVLTQSPASLAVSLGQRATISCRASKSVSTSSYSYMHWYQQKPGQ

PPKLLIKYASYLESGVPARFSGSGSGTDFTLNIHPVEEEDAATYYCQHSR

EFPWTFGGGTKLEIKRADAAPGGGGSGGGGSGGGGSEVQLVESGGGLVKP

GGSRKLSCAASGFTFSNYGMHWVRQAPEKGLEWVAYISSGSSTIYYADTV

KGRFTISRDNAKNTLFLQMTSLRSEDTAMYYCARRGLLLDYWGQGTTLTV

SSLEQKLISEEDLNSAVDHHHHHH.
```

Annotation of scFv Protein Domains with Reference to SEQ ID NO:38
- AGIH sequence increases solubility (amino acids 1-4 of SEQ ID NO:38)
- Vk variable region (amino acids 5-115 of SEQ ID NO:38)
- Initial (6 aa) of light chain CH1 (amino acids 116-121 of SEQ ID NO:38)
- (GGGGS)₃ (SEQ ID NO:37) linker (amino acids 122-136 of SEQ ID NO:38)
- VH variable region (amino acids 137-252 of SEQ ID NO:38)
- Myc tag (amino acids 253-268 SEQ ID NO:38)
- His 6 tag (amino acids 269-274 of SEQ ID NO:38)

Amino Acid Sequence of 3E10 Di-scFv (D31N)

Di-scFv 3E10 (D31N) is a di-single chain variable fragment including 2× the heavy chain and light chain variable regions of 3E10 and wherein the aspartic acid at position 31 of the heavy chain is mutated to an asparagine. The amino acid sequence for di-scFv 3E10 (D31N) is:

```
                                         (SEQ ID NO: 39)
AGIHDIVLTQSPASLAVSLGQRATISCRASKSVSTSSYSYMHWYQQKPGQ

PPKLLIKYASYLESGVPARFSGSGSGTDFTLNIHPVEEEDAATYYCQHSR

EFPWTFGGGTKLEIKRADAAPGGGGSGGGGSGGGGSEVQLVESGGGLVKP

GGSRKLSCAASGFTFSNYGMHWVRQAPEKGLEWVAYISSGSSTIYYADTV

KGRFTISRDNAKNTLFLQMTSLRSEDTAMYYCARRGLLLDYWGQGTTLTV

SSASTKGPSVFPLAPLESSGSDIVLTQSPASLAVSLGQRATISCRASKSV

STSSYSYMHWYQQKPGQPPKLLIKYASYLESGVPARFSGSGSGTDFTLNI

HPVEEEDAATYYCQHSREFPWTFGGGTKLEIKRADAAPGGGGSGGGGSGG

GGSEVQLVESGGGLVKPGGSRKLSCAASGFTFSNYGMHWVRQAPEKGLEW

VAYISSGSSTIYYADTVKGRFTISRDNAKNTLFLQMTSLRSEDTAMYYCA

RRGLLLDYWGQGTTLTVSSLEQKLISEEDLNSAVDHHHHHH.
```

Annotation of Di-scFv Protein Domains with Reference to SEQ ID NO:39
- AGIH sequence increases solubility (amino acids 1-4 of SEQ ID NO:39)
- Vk variable region (amino acids 5-115 of SEQ ID NO:39)
- Initial (6 aa) of light chain CH1 (amino acids 116-121 of SEQ ID NO:39)
- (GGGGS)₃ (SEQ ID NO:37) linker (amino acids 122-136 of SEQ ID NO:39)
- VH variable region (amino acids 137-252 of SEQ ID NO:39)
- Linker between Fv fragments consisting of human IgG CH1 initial 13 amino acids (amino acids 253-265 of SEQ ID NO:39)
- Swivel sequence (amino acids 266-271 of SEQ ID NO:39)
- Vk variable region (amino acids 272-382 of SEQ ID NO:39)
- Initial (6 aa) of light chain CH1 (amino acids 383-388 of SEQ ID NO:39)
- (GGGGS)₃ (SEQ ID NO:37) linker (amino acids 389-403 of SEQ ID NO:39)
- VH variable region (amino acids 404-519 of SEQ ID NO:39)
- Myc tag (amino acids 520-535 of SEQ ID NO:39)
- His 6 tag (amino acids 536-541 of SEQ ID NO:39)

Amino Acid Sequence for Tri-scFv

Tri-scFv 3E10 (D31N) is a tri-single chain variable fragment including 3× the heavy chain and light chain variable regions of 310E and wherein the aspartic acid at position 31 of the heavy chain is mutated to an asparagine. The amino acid sequence for tri-scFv 3E10 (D31N) is:

```
                                         (SEQ ID NO: 40)
AGIHDIVLTQSPASLAVSLGQRATISCRASKSVSTSSYSYMHWYQQKPGQ

PPKLLIKYASYLESGVPARFSGSGSGTDFTLNIHPVEEEDAATYYCQHSR

EFPWTFGGGTKLEIKRADAAPGGGGSGGGGSGGGGSEVQLVESGGGLVKP

GGSRKLSCAASGFTFSNYGMHWVRQAPEKGLEWVAYISSGSSTIYYADTV

KGRFTISRDNAKNTLFLQMTSLRSEDTAMYYCARRGLLLDYWGQGTTLTV

SSASTKGPSVFPLAPLESSGSDIVLTQSPASLA

VSLGQRATISCRASKSVSTSSYSYMHWYQQKPGQPPKLLIKYASYLESGV

PARFSGSGSGTDFTLNIHPVEEEDAATYYCQHSREFPWTFGGGTKLEIKR

ADAAPGGGGSGGGGSGGGGSEVQLVESGGGLVKPGGSRKLSCAASGFTFS
```

-continued
NYGMHWVRQAPEKGLEWVAYISSGSSTIYYADTVKGRFTISRDNAKNTLF

LQMTSLRSEDTAMYYCARRGLLLDYWGQGTTLTVSSLEQKLISEEDLNSA

VDHHHHHH.

Annotation of Tri-scFv Protein Domains with Reference to SEQ ID NO:40
  AGIH sequence increases solubility (amino acids 1-4 of SEQ ID NO:40)
  Vk variable region (amino acids 5-115 of SEQ ID NO:40)
  Initial (6 aa) of light chain CH1 (amino acids 116-121 of SEQ ID NO:40)
  (GGGGS)$_3$ (SEQ ID NO:37) linker (amino acids 122-136 of SEQ ID NO:40)
  VH variable region (amino acids 137-252 of SEQ ID NO:40)
  Linker between Fv fragments consisting of human IgG CH1 initial 13 amino acids (amino acids 253-265 of SEQ ID NO:40)
  Swivel sequence (amino acids 266-271 of SEQ ID NO:40)
  Vk variable region (amino acids 272-382 of SEQ ID NO:40)
  Initial (6 aa) of light chain CH1 (amino acids 383-388 of SEQ ID NO:40)
  (GGGGS)$_3$ (SEQ ID NO:37) linker (amino acids 389-403 of SEQ ID NO:40)
  VH variable region (amino acids 404-519 of SEQ ID NO:40)
  Linker between Fv fragments consisting of human IgG C$_H$1 initial 13 amino acids (amino acids 520-532 of SEQ ID NO:40)
  Swivel sequence (amino acids 533-538 of SEQ ID NO:40)
  Vk variable region (amino acids 539-649 of SEQ ID NO:40)
  Initial (6 aa) of light chain CH1 (amino acids 650-655 of SEQ ID NO:40)
  (GGGGS)$_3$ (SEQ ID NO:37) linker (amino acids 656-670 of SEQ ID NO:40)
  VH variable region (amino acids 671-786 of SEQ ID NO:40)
  Myc tag (amino acids 787-802 of SEQ ID NO:40)
  His 6 tag (amino acids 803-808 of SEQ ID NO:40)

WO 2016/033321 and Noble, et al., *Cancer Research*, 75(11):2285-2291 (2015), show that di-scFv and tri-scFv have some improved and additional activities compared to their monovalent counterpart. The subsequences corresponding to the different domains of each of the exemplary fusion proteins are also provided above. One of skill in the art will appreciate that the exemplary fusion proteins, or domains thereof, can be utilized to construct fusion proteins discussed in more detail above. For example, in some embodiments, the di-scFv includes a first scFv including a Vk variable region (e.g., amino acids 5-115 of SEQ ID NO:39, or a functional variant or fragment thereof), linked to a VH variable domain (e.g., amino acids 137-252 of SEQ ID NO:39, or a functional variant or fragment thereof), linked to a second scFv including a Vk variable region (e.g., amino acids 272-382 of SEQ ID NO:39, or a functional variant or fragment thereof), linked to a VH variable domain (e.g., amino acids 404-519 of SEQ ID NO:39, or a functional variant or fragment thereof). In some embodiments, a tri-scFv includes a di-scFv linked to a third scFv domain including a Vk variable region (e.g., amino acids 539-649 of SEQ ID NO:40, or a functional variant or fragment thereof), linked to a VH variable domain (e.g., amino acids 671-786 of SEQ ID NO:40, or a functional variant or fragment thereof).

The Vk variable regions can be linked to VH variable domains by, for example, a linker (e.g., (GGGGS)$_3$ (SEQ ID NO:37), alone or in combination with a (6 aa) of light chain CH1 (amino acids 116-121 of SEQ ID NO:39). Other suitable linkers are discussed above and known in the art. scFv can be linked by a linker (e.g., human IgG CH1 initial 13 amino acids (253-265) of SEQ ID NO:39), alone or in combination with a swivel sequence (e.g., amino acids 266-271 of SEQ ID NO:39). Other suitable linkers are discussed above and known in the art.

Therefore, a di-scFv can include amino acids 5-519 of SEQ ID NO:39. A tri-scFv can include amino acids 5-786 of SEQ ID NO:40. In some embodiments, the fusion proteins include additional domains. For example, in some embodiments, the fusion proteins include sequences that enhance solubility (e.g., amino acids 1-4 of SEQ ID NO:39). Therefore, in some embodiments, a di-scFv can include amino acids 1-519 of SEQ ID NO:39. A tri-scFv can include amino acids 1-786 of SEQ ID NO:40. In some embodiments that fusion proteins include one or more domains that enhance purification, isolation, capture, identification, separation, etc., of the fusion protein. Exemplary domains include, for example, Myc tag (e.g., amino acids 520-535 of SEQ ID NO:39) and/or a His tag (e.g., amino acids 536-541 of SEQ ID NO:39). Therefore, in some embodiments, a di-scFv can include the amino acid sequence of SEQ ID NO:39. A tri-scFv can include the amino acid sequence of SEQ ID NO:40. Other substitutable domains and additional domains are discussed in more detail above.

An exemplary 3E10 humanized Fv sequence is discussed in WO 2016/033324:

(SEQ ID NO: 41)
DIVLTQSPASLAVSPGQRATITCRASKSVSTSSYSYMHWYQQKPGQPPKL

LIYYASYLESGVPARFSGSGSGTDFTLTINPVEANDTANYYCQHSREFPW

TFGQGTKVEIKGGGGSGGGGSGGGGSEVQLVESGGGLVQPGGSLRLSCSA

SGFTFSNYGMHWVRQAPGKGLEYVSYISSGSSTIYYADTVKGRFTISRDN

SKNTLYLQMSSLRAEDTAVYYCVKRGLLLDYWGQGTLVTVSS.

B. Donor Oligonucleotides

Donor oligonucleotides are provided for use in the compositions and methods. In some embodiments, the composition includes or is administered in combination with a donor oligonucleotide. The donor oligonucleotide may or may not be not covalently linked to the potentiating agent. For example, the donor oligonucleotide may form a non-covalent complex with the cell-penetrating antibody.

Donor oligonucleotide strategies include, but are not limited to, small fragment homologous replacement (e.g., polynucleotide small DNA fragments (SDFs)) and single-stranded oligodeoxynucleotide-mediated gene modification (e.g., ssODN/SSOs).

Generally, in the case of gene therapy, the donor oligonucleotide includes a sequence that can correct a mutation(s) in the host genome, though in some embodiments, the donor introduces a mutation that can, for example, reduce expression of an oncogene or a receptor that facilitates HIV infection. In addition to containing a sequence designed to introduce the desired correction or mutation, the donor oligonucleotide may also contain synonymous (silent) mutations (e.g., 7 to 10). The additional silent mutations can facilitate detection of the corrected target sequence using allele-specific PCR of genomic DNA isolated from treated cells.

The donor oligonucleotide can exist in single stranded (ss) or double stranded (ds) form (e.g., ssDNA, dsDNA). Thus, the oligonucleotide (e.g., DNA or RNA, or combination thereof) may be single stranded or double stranded. Preferably, the oligonucleotide is single stranded DNA.

The donor oligonucleotide can be of any length. For example, the size of the donor oligonucleotide may be between 1 to 800 nucleotides. In one embodiment, the donor oligonucleotide is between 25 and 200 nucleotides. In some embodiments, the donor oligonucleotide is between 100 and 150 nucleotides. In a further embodiment, the donor nucleotide is about 40 to 80 nucleotides in length. The donor oligonucleotide may be about 60 nucleotides in length. ssDNAs of length 25-200 are active. Most studies have been with ssDNAs of length 60-70. Longer ones as 70-150 also work. The preferred length is 60.

The donor sequence can contain one or more nucleic acid sequence alterations compared to the sequence of the region targeted for recombination, for example, a substitution, a deletion, or an insertion of one or more nucleotides. Successful recombination of the donor sequence results in a change of the sequence of the target region. Donor oligonucleotides are also referred to herein as donor fragments, donor nucleic acids, donor DNA, or donor DNA fragments. It is understood in the art that a greater number of homologous positions within the donor fragment will increase the probability that the donor fragment will be recombined into the target sequence, target region, or target site.

The donor oligonucleotides may contain at least one mutated, inserted or deleted nucleotide relative to the target DNA sequence. Target sequences can be within the coding DNA sequence of the gene or within introns. Target sequences can also be within DNA sequences which regulate expression of the target gene, including promoter or enhancer sequences or sequences that regulate RNA splicing.

The donor oligonucleotides can contain a variety of mutations relative to the target sequence. Representative types of mutations include, but are not limited to, point mutations, deletions and insertions. Deletions and insertions can result in frameshift mutations or deletions. Point mutations can cause missense or nonsense mutations. These mutations may disrupt, reduce, stop, increase, improve, or otherwise alter the expression of the target gene.

The donor oligonucleotide may correspond to the wild type sequence of a gene (or a portion thereof), for example, a mutated gene involved with a disease or disorder (e.g., hemophilia, muscular dystrophy, globinopathies, cystic fibrosis, xeroderma pigmentosum, lysosomal storage diseases). Exemplary genes include genes encoding coagulation factor VIII, coagulation factor IX, dystrophin, beta-globin, CFTR, XPC, XPD, and DNA polymerase eta.

Compositions may include one or more (e.g., 1, 2, 3, 4, 5, 6, 7, 8, 9, 10 or more) different donor oligonucleotide sequences. Use of more than one donor oligonucleotide may be useful, for example, to create a heterozygous target gene where the two alleles contain different modifications.

Donor oligonucleotides are preferably DNA oligonucleotides, composed of the principal naturally-occurring nucleotides (uracil, thymine, cytosine, adenine and guanine) as the heterocyclic bases, deoxyribose as the sugar moiety, and phosphate ester linkages. Donor oligonucleotides may include modifications to nucleobases, sugar moieties, or backbone/linkages, depending on the desired structure of the replacement sequence at the site of recombination or to provide some resistance to degradation by nucleases. For example, the terminal three inter-nucleoside linkages at each end of a ssDNA oligonucleotide (both 5' and 3' ends) may be replaced with phosphorothioate linkages in lieu of the usual phosphodiester linkages, thereby providing increased resistance to exonucleases. Modifications to the donor oligonucleotide should not prevent the donor oligonucleotide from successfully recombining at the recombination target sequence.

1. Donor Oligonucleotide Design

A polynucleotide including a donor sequence to be inserted is provided to the cell to be edited. A "donor sequence", "donor polynucleotide" or "donor oligonucleotide" means a nucleic acid sequence to be inserted at the target site. The donor polynucleotide typically contains sufficient homology to a genomic sequence at the target site, e.g., 70%, 80%, 85%, 90%, 95%, or 100% homology with the nucleotide sequences at the target site, to support homology-directed repair between it and the genomic sequence to which it bears homology.

The donor sequence may or may not be identical to the genomic sequence that it replaces. The donor sequence may correspond to the wild type sequence (or a portion thereof) of the target sequence (e.g., a gene). The donor sequence may contain at least one or more single base changes, insertions, deletions, inversions or rearrangements with respect to the genomic sequence, so long as sufficient homology is present to support homology-directed repair. In some embodiments, the donor sequence includes a non-homologous sequence flanked by two regions of homology, such that homology-directed repair between the target DNA region and the two flanking sequences results in insertion of the non-homologous sequence at the target region.

The donor oligonucleotide is thought to simply recombine with the site in the chromosome to which it has homology. An exogenous nuclease is not used, so endogenous DNA repair and/or replication factors are believed to be involved to support the homology-directed recombination of the donor DNA into its target site. It is believed that 3E10 promotes recombination by shifting the balance of DNA repair and recombination pathways from one that is RAD51 mediated to one that is RAD52 mediated.

When the genome editing compositions include a donor polynucleotide sequence that includes at least a segment with homology to the target DNA sequence, the methods can be used to site specifically add, i.e., insert or replace, nucleic acid material to a target DNA sequence (e.g., to "knock in" a nucleic acid that allows expression of a protein, an siRNA, an miRNA, etc.), to add a tag (e.g., 6×His, a fluorescent protein (e.g., a green fluorescent protein; a yellow fluorescent protein, etc.), hemagglutinin (HA), FLAG, etc.), to add a regulatory sequence to a gene (e.g., promoter, polyadenylation signal, internal ribosome entry sequence (IRES), 2A peptide, start codon, stop codon, splice signal, localization signal, etc.), or to modify a nucleic acid sequence (e.g., introduce a mutation).

2. Oligonucleotide Compositions

Any of the donor oligonucleotides or other nucleic acids can include one or more modifications or substitutions to the nucleobases or linkages. Modifications should not prevent, and preferably enhance, the activity, persistence, or function of gene editing. For example, modifications to oligonucleotides should not prevent, and preferably enhance duplex invasion, and/or strand displacement. Modified bases and base analogues, modified sugars and sugar analogues and/or various suitable linkages known in the art are also suitable for use in the molecules herein.

a. Heterocyclic Bases

The principal naturally-occurring nucleotides include uracil, thymine, cytosine, adenine and guanine as the heterocyclic bases. Gene editing molecules can include chemical modifications to their nucleotide constituents. For example, target sequences with adjacent cytosines can be problematic. Chemical modification of nucleotides may be useful to increase binding affinity and/or stability under physiologic conditions.

Chemical modifications of heterocyclic bases or heterocyclic base analogs may be effective to increase the binding affinity of a nucleotide or its stability in a complex (e.g., duplex or triplex). Chemically-modified heterocyclic bases include, but are not limited to, inosine, 5-(1-propynyl) uracil (pU), 5-(1-propynyl) cytosine (pC), 5-methylcytosine, 8-oxo-adenine, pseudocytosine, pseudoisocytosine, 5 and 2-amino-5-(2'-deoxy-β-D-ribofuranosyl)pyridine (2-aminopyridine), and various pyrrolo- and pyrazolopyrimidine derivatives.

b. Backbone

The nucleotide subunits of the oligonucleotides may contain certain modifications. For example, the phosphate backbone of the oligonucleotide may be replaced in its entirety by repeating N-(2-aminoethyl)-glycine units and/or phosphodiester bonds may be replaced by peptide bonds or phosphorothioate linkages, either partial or complete. The heterocyclic bases may be linked to the backbone by methylene carbonyl bonds, which allow them to form duplexes with DNA via Watson-Crick base pairing with high affinity and sequence-specificity.

Other backbone modifications include peptide and amino acid variations and modifications. The backbone constituents of donor oligonucleotides may be peptide linkages, or alternatively, they may be non-peptide linkages. Examples include acetyl caps, amino spacers such as 8-amino-3,6-dioxaoctanoic acid (referred to herein as O-linkers), amino acids such as lysine are particularly useful if positive charges are desired in the oligonucleotide, and the like.

Backbone modifications of oligonucleotides should not prevent the molecules from binding with high specificity to the DNA target site and mediating information transfer.

c. Modified Nucleic Acids

Oligonucleotides are composed of a chain of nucleotides which are linked to one another. Canonical nucleotides typically include a heterocyclic base (nucleic acid base), a sugar moiety attached to the heterocyclic base, and a phosphate moiety which esterifies a hydroxyl function of the sugar moiety. The principal naturally-occurring nucleotides include uracil, thymine, cytosine, adenine and guanine as the heterocyclic bases, and ribose or deoxyribose sugar linked by phosphodiester bonds. As used herein "modified nucleotide" or "chemically modified nucleotide" defines a nucleotide that has a chemical modification of one or more of the heterocyclic base, sugar moiety or phosphate moiety constituents. The charge of the modified nucleotide may be reduced compared to DNA or RNA oligonucleotides of the same nucleobase sequence. The oligonucleotide may have low negative charge, no charge, or positive charge such that electrostatic repulsion with the nucleotide duplex at the target site is reduced compared to DNA or RNA oligonucleotides with the corresponding nucleobase sequence.

Examples of modified nucleotides with reduced charge include modified internucleotide linkages such as phosphate analogs having achiral and uncharged intersubunit linkages (e.g., Sterchak, E. P. et al., *Organic Chem.*, 52:4202, (1987)), and uncharged morpholino-based polymers having achiral intersubunit linkages (see, e.g., U.S. Pat. No. 5,034,506). Some internucleotide linkage analogs include morpholidate, acetal, and polyamide-linked heterocycles. Locked nucleic acids (LNA) are modified RNA nucleotides (see, for example, Braasch, et al., *Chem. Biol.*, 8(1):1-7 (2001)). LNAs form hybrids with DNA which are more stable than DNA/DNA hybrids. Therefore, LNA can be used. LNA binding efficiency can be increased in some embodiments by adding positive charges to it. Commercial nucleic acid synthesizers and standard phosphoramidite chemistry are used to make LNAs.

Molecules may also include nucleotides with modified heterocyclic bases, sugar moieties or sugar moiety analogs. Modified nucleotides may include modified heterocyclic bases or base analogs as described above. Sugar moiety modifications include, but are not limited to, 2'-O-aminoethoxy, 2'-O-amonioethyl (2'-OAE), 2'-O-methoxy, 2'-O-methyl, 2-guanidoethyl (2'-OGE), 2'-O,4'-C-methylene (LNA), 2'-O-(methoxyethyl) (2'-OME) and 2'-O—(N-(methyl)acetamido) (2'-OMA).

In some embodiments, the donor oligonucleotide includes 1, 2, 3, 4, 5, 6, or more optional phosphorothioate internucleoside linkages. In some embodiments, the donor includes phosphorothioate internucleoside linkages between first 2, 3, 4 or 5 nucleotides, and/or the last 2, 3, 4, or 5 nucleotides in the donor oligonucleotide.

C. Pharmaceutical Compositions

The cell-penetrating anti-DNA antibody and donor oligonucleotide compositions can be used therapeutically in combination with a pharmaceutically acceptable carrier.

The compositions are preferably employed for therapeutic uses in combination with a suitable pharmaceutical carrier. Such compositions include an effective amount of the composition, and a pharmaceutically acceptable carrier or excipient.

It is understood by one of ordinary skill in the art that nucleotides administered in vivo are taken up and distributed to cells and tissues (Huang, et al., *FEBS Lett.*, 558(1-3):69-73 (2004)). For example, Nyce, et al. have shown that antisense oligodeoxynucleotides (ODNs) when inhaled bind to endogenous surfactant (a lipid produced by lung cells) and are taken up by lung cells without a need for additional carrier lipids (Nyce, et al., *Nature*, 385:721-725 (1997)). Small nucleic acids are readily taken up into T24 bladder carcinoma tissue culture cells (Ma, et al., *Antisense Nucleic Acid Drug Dev.*, 8:415-426 (1998)).

The compositions including a potentiating agent, such as a cell-penetrating antibody, and donor oligonucleotides may be in a formulation for administration topically, locally or systemically in a suitable pharmaceutical carrier. Remington's Pharmaceutical Sciences, 15th Edition by E. W. Martin (Mark Publishing Company, 1975), discloses typical carriers and methods of preparation. The compound may also be encapsulated in suitable biocompatible particles formed of biodegradable or non-biodegradable polymers or proteins or liposomes for targeting to cells. Such systems are well known to those skilled in the art and may be optimized for use with the appropriate nucleic acid. In some embodiments, the donor oligonucleotide is encapsulated in nanoparticles.

Various methods for nucleic acid delivery are described, for example, in Sambrook et al., *Molecular Cloning: A Laboratory Manual*, Cold Spring Harbor Laboratory, New York (1989); and Ausubel, et al., *Current Protocols in Molecular Biology*, John Wiley & Sons, New York (1994). Such nucleic acid delivery systems include the desired nucleic acid, by way of example and not by limitation, in either "naked" form as a "naked" nucleic acid, or formulated in a vehicle suitable for delivery, such as in a complex with a cationic molecule or a liposome forming lipid, or as a component of a vector, or a component of a pharmaceutical composition. The nucleic acid delivery system can be provided to the cell either directly, such as by contacting it with the cell, or indirectly, such as through the action of any biological process. The nucleic acid delivery system can be provided to the cell by endocytosis, receptor targeting, coupling with native or synthetic cell membrane fragments, physical means such as electroporation, combining the nucleic acid delivery system with a polymeric carrier such as a controlled release film or nanoparticle or microparticle, using a vector, injecting the nucleic acid delivery system into a tissue or fluid surrounding the cell, simple diffusion of the nucleic acid delivery system across the cell membrane, or by any active or passive transport mechanism across the cell membrane. Additionally, the nucleic acid delivery system can be provided to the cell using techniques such as antibody-related targeting and antibody-mediated immobilization of a viral vector.

Formulations for injection may be presented in unit dosage form, e.g., in ampules or in multi-dose containers, optionally with an added preservative. The compositions may take such forms as sterile aqueous or nonaqueous solutions, suspensions and emulsions, which can be isotonic with the blood of the subject in certain embodiments. Examples of nonaqueous solvents are polypropylene glycol, polyethylene glycol, vegetable oil such as olive oil, sesame oil, coconut oil, *arachis* oil, peanut oil, mineral oil, injectable organic esters such as ethyl oleate, or fixed oils including synthetic mono or di-glycerides. Aqueous carriers include water, alcoholic/aqueous solutions, emulsions or suspensions, including saline and buffered media. Parenteral vehicles include sodium chloride solution, 1,3-butandiol, Ringer's dextrose, dextrose and sodium chloride, lactated Ringer's or fixed oils. Intravenous vehicles include fluid and nutrient replenishers, and electrolyte replenishers (such as those based on Ringer's dextrose). The materials may be in solution, emulsions, or suspension (for example, incorporated into particles, liposomes, or cells). Typically, an appropriate amount of a pharmaceutically-acceptable salt is used in the formulation to render the formulation isotonic. Trehalose, typically in the amount of 1-5%, may be added to the pharmaceutical compositions. The pH of the solution is preferably from about 5 to about 8, and more preferably from about 7 to about 7.5.

Pharmaceutical compositions may include carriers, thickeners, diluents, buffers, preservatives, and surface-active agents. Carrier formulation can be found in Remington's Pharmaceutical Sciences, Mack Publishing Co., Easton, Pa. Those of skill in the art can readily determine the various parameters for preparing and formulating the compositions without resort to undue experimentation.

The compositions (cell-penetrating antibody and donor oligonucleotide) alone or in combination with other suitable components, can also be made into aerosol formulations (i.e., they can be "nebulized") to be administered via inhalation. Aerosol formulations can be placed into pressurized acceptable propellants, such as dichlorodifluoromethane, propane, nitrogen, and air. For administration by inhalation, the compounds are delivered in the form of an aerosol spray presentation from pressurized packs or a nebulizer, with the use of a suitable propellant.

In some embodiments, the compositions (cell-penetrating antibody and donor oligonucleotide) include pharmaceutically acceptable carriers with formulation ingredients such as salts, carriers, buffering agents, emulsifiers, diluents, excipients, chelating agents, preservatives, solubilizers, or stabilizers. The donor oligonucleotides may be conjugated to lipophilic groups like cholesterol and lauric and lithocholic acid derivatives with C32 functionality to improve cellular uptake. For example, cholesterol has been demonstrated to enhance uptake and serum stability of siRNA in vitro (Lorenz, et al., *Bioorg. Med. Chem. Lett.*, 14(19):4975-4977 (2004)) and in vivo (Soutschek, et al., *Nature*, 432 (7014):173-178 (2004)). In addition, it has been shown that binding of steroid conjugated oligonucleotides to different lipoproteins in the bloodstream, such as LDL, protect integrity and facilitate biodistribution (Rump, et al., *Biochem. Pharmacol.*, 59(11):1407-1416 (2000)). Other groups that can be attached or conjugated to the compound described above to increase cellular uptake, include acridine derivatives; cross-linkers such as psoralen derivatives, azidophenacyl, proflavin, and azidoproflavin; artificial endonucleases; metal complexes such as EDTA-Fe(II) and porphyrin-Fe(II); alkylating moieties; nucleases such as alkaline phosphatase; terminal transferases; abzymes; cholesteryl moieties; lipophilic carriers; peptide conjugates; long chain alcohols; phosphate esters; radioactive markers; non-radioactive markers; carbohydrates; and polylysine or other polyamines U.S. Pat. No. 6,919,208 to Levy, et al., also describes methods for enhanced delivery. These pharmaceutical formulations may be manufactured in a manner that is itself known, e.g., by means of conventional mixing, dissolving, granulating, levigating, emulsifying, encapsulating, entrapping or lyophilizing processes.

Further carriers include sustained release preparations such as semi-permeable matrices of solid hydrophobic polymers containing the antibody, which matrices are in the form of shaped particles, e.g., films, liposomes or microparticles. Implantation includes inserting implantable drug delivery systems, e.g., microspheres, hydrogels, polymeric reservoirs, cholesterol matrixes, polymeric systems, e.g., matrix erosion and/or diffusion systems and non-polymeric systems. Inhalation includes administering the composition (cell-penetrating antibody and donor oligonucleotide) with an aerosol in an inhaler, either alone or attached to a carrier that can be absorbed. For systemic administration, it may be preferred that the composition is encapsulated in liposomes.

The compositions may be delivered in a manner which enables tissue-specific uptake of the agent and/or nucleotide delivery system, using invasive devices such as vascular or urinary catheters, and using interventional devices such as stents having drug delivery capability and configured as expansive devices or stent grafts.

The formulations (containing the cell-penetrating antibody and donor oligonucleotide) may be delivered using a bioerodible implant by way of diffusion or by degradation of the polymeric matrix. In certain embodiments, the administration of the formulation may be designed to result in sequential exposures to the composition, over a certain time period, for example, hours, days, weeks, months or years. This may be accomplished, for example, by repeated administrations of a formulation or by a sustained or controlled release delivery system in which the compositions are delivered over a prolonged period without repeated administrations.

Other delivery systems suitable include time-release, delayed release, sustained release, or controlled release delivery systems. Such systems may avoid repeated administrations in many cases, increasing convenience to the subject and the physician. Many types of release delivery systems are available and known to those of ordinary skill in the art. They include, for example, polymer-based systems such as polylactic and/or polyglycolic acids, polyanhydrides, polycaprolactones, copolyoxalates, polyesteramides, polyorthoesters, polyhydroxybutyric acid, and/or combinations of these. Microcapsules of the foregoing polymers containing nucleic acids are described in, for example, U.S. Pat. No. 5,075,109. Other examples include non-polymer systems that are lipid-based including sterols such as cholesterol, cholesterol esters, and fatty acids or neutral fats such as mono-, di- and triglycerides; hydrogel release systems; liposome-based systems; phospholipid based-systems; silastic systems; peptide based systems; wax coatings; compressed tablets using conventional binders and excipients; or partially fused implants. The formulation may be as, for example, microspheres, hydrogels, polymeric reservoirs, cholesterol matrices, or polymeric systems. In some embodiments, the system may allow sustained or controlled release of the composition to occur, for example, through control of the diffusion or erosion/degradation rate of the formulations containing the cell-penetrating antibody and/or donor oligonucleotide.

Active agent(s) (cell-penetrating antibody and donor oligonucleotide) and compositions thereof can be formulated for pulmonary or mucosal administration. The administration can include delivery of the composition to the lungs, nasal, oral (sublingual, buccal), vaginal, or rectal mucosa. The term aerosol as used herein refers to any preparation of a fine mist of particles, which can be in solution or a suspension, whether or not it is produced using a propellant. Aerosols can be produced using standard techniques, such as ultrasonication or high-pressure treatment.

For administration via the upper respiratory tract, the formulation can be formulated into a solution, e.g., water or isotonic saline, buffered or un-buffered, or as a suspension, for intranasal administration as drops or as a spray. Preferably, such solutions or suspensions are isotonic relative to nasal secretions and of about the same pH, ranging e.g., from about pH 4.0 to about pH 7.4 or, from pH 6.0 to pH 7.0. Buffers should be physiologically compatible and include, simply by way of example, phosphate buffers.

The potentiating agent, such as a cell-penetrating antibody, and donor oligonucleotides can be delivered to the target cells using a nanoparticle delivery vehicle. In some embodiments, some of the compositions are packaged in nanoparticles and some are not. For example, in some embodiments, the donor oligonucleotide is incorporated into nanoparticles while the cell-penetrating antibody is not. Nanoparticles generally refers to particles in the range of between 500 nm to less than 0.5 nm, preferably having a diameter that is between 50 and 500 nm, more preferably having a diameter that is between 50 and 300 nm. Cellular internalization of polymeric particles is highly dependent upon their size, with nanoparticulate polymeric particles being internalized by cells with much higher efficiency than microparticulate polymeric particles. For example, Desai, et al. have demonstrated that about 2.5 times more nanoparticles that are 100 nm in diameter are taken up by cultured Caco-2 cells as compared to microparticles having a diameter on 1 µM (Desai, et al., *Pharm. Res.*, 14:1568-73 (1997)). Nanoparticles also have a greater ability to diffuse deeper into tissues in vivo.

Examples of preferred biodegradable polymers include synthetic polymers that degrade by hydrolysis such as poly(hydroxy acids), such as polymers and copolymers of lactic acid and glycolic acid, other degradable polyesters, polyanhydrides, poly(ortho)esters, polyesters, polyurethanes, poly(butic acid), poly(valeric acid), poly(caprolactone), poly(hydroxyalkanoates), poly(lactide-co-caprolactone), and poly(amine-co-ester) polymers, such as those described in Zhou, et al., *Nature Materials*, 11:82-90 (2012) and WO 2013/082529, U.S. Published Application No. 2014/0342003, and PCT/US2015/061375.

The nucleic acids can be complexed to polycations to increase the encapsulation efficiency of the nucleic acids into the nanoparticles. The term "polycation" refers to a compound having a positive charge, preferably at least 2 positive charges, at a selected pH, preferably physiological pH. Polycationic moieties have between about 2 to about 15 positive charges, preferably between about 2 to about 12 positive charges, and more preferably between about 2 to about 8 positive charges at selected pH values.

Many polycations are known in the art. Suitable constituents of polycations include basic amino acids and their derivatives such as arginine, asparagine, glutamine, lysine and histidine; cationic dendrimers; and amino polysaccharides. Suitable polycations can be linear, such as linear tetralysine, branched or dendrimeric in structure.

Exemplary polycations include, but are not limited to, synthetic polycations based on acrylamide and 2-acrylamido-2-methylpropanetrimethylamine, poly(N-ethyl-4-vinylpyridine) or similar quartemized polypyridine, diethylaminoethyl polymers and dextran conjugates, polymyxin B sulfate, lipopolyamines, poly(allylamines) such as the strong polycation poly(dimethyldiallylammonium chloride), polyethyleneimine, polybrene, and polypeptides such as protamine, the histone polypeptides, polylysine, polyarginine and polyornithine. Suitable naturally occurring polyamines include, but are not limited to, spermine, spermidine, cadaverine and putrescine. In some embodiments, the particles themselves are a polycation (e.g., a blend of PLGA and poly(beta amino ester).

Functional molecules can be associated with, linked, conjugated, or otherwise attached directly or indirectly to the carriers utilized for delivery. Targeting moieties can be associated with, linked, conjugated, or otherwise attached directly or indirectly to the donor oligonucleotide, or to a nanoparticle or other delivery vehicle thereof. Targeting molecules can be proteins, peptides, nucleic acid molecules, saccharides or polysaccharides that bind to a receptor or other molecule on the surface of a targeted cell. The degree of specificity and the avidity of binding to the graft can be modulated through the selection of the targeting molecule.

Examples of moieties include, for example, targeting moieties which provide for the delivery of molecules to specific cells, e.g., antibodies to hematopoietic stem cells, $CD34^+$ cells, T cells or any other preferred cell type, as well as receptor and ligands expressed on the preferred cell type. Preferably, the moieties target hematopoeitic stem cells. Examples of molecules targeting extracellular matrix ("ECM") include glycosaminoglycan ("GAG") and collagen. In one embodiment, the external surface of polymer particles may be modified to enhance the ability of the particles to interact with selected cells or tissue. The method described above wherein an adaptor element conjugated to a targeting molecule is inserted into the particle is preferred. However, in another embodiment, the outer surface of a polymer micro- or nanoparticle having a carboxy terminus may be linked to targeting molecules that have a free amine terminus.

Other useful ligands attached to polymeric micro- and nanoparticles include pathogen-associated molecular patterns (PAMPs). PAMPs target Toll-like Receptors (TLRs) on the surface of the cells or tissue, or signal the cells or tissue internally, thereby potentially increasing uptake. PAMPs conjugated to the particle surface or co-encapsulated may include: unmethylated CpG DNA (bacterial), double-stranded RNA (viral), lipopolysacharride (bacterial), peptidoglycan (bacterial), lipoarabinomannin (bacterial), zymosan (yeast), mycoplasmal lipoproteins such as MALP-2 (bacterial), flagellin (bacterial) poly(inosinic-cytidylic) acid (bacterial), lipoteichoic acid (bacterial) or imidazoquinolines (synthetic).

In another embodiment, the outer surface of the particle may be treated using a mannose amine, thereby mannosylating the outer surface of the particle. This treatment may cause the particle to bind to the target cell or tissue at a mannose receptor on the antigen presenting cell surface. Alternatively, surface conjugation with an immunoglobulin molecule containing an Fc portion (targeting Fc receptor), heat shock protein moiety (HSP receptor), phosphatidylserine (scavenger receptors), and lipopolysaccharide (LPS) are additional receptor targets on cells or tissue.

Lectins that can be covalently attached to micro- and nanoparticles to render them target specific to the mucin and mucosal cell layer.

The choice of targeting moiety will depend on the method of administration of the nanoparticle composition and the cells or tissues to be targeted. The targeting molecule may generally increase the binding affinity of the particles for cell or tissues or may target the nanoparticle to a particular tissue in an organ or a particular cell type in a tissue. The covalent attachment of any of the natural components of mucin in either pure or partially purified form to the particles would decrease the surface tension of the bead-gut interface and increase the solubility of the bead in the mucin layer. The attachment of polyamino acids containing extra pendant carboxylic acid side groups, e.g., polyaspartic acid and polyglutamic acid, increases bioadhesiveness. Using polyamino acids in the 15,000 to 50,000 kDa molecular weight range yields chains of 120 to 425 amino acid residues attached to the surface of the particles. The polyamino chains increase bioadhesion by means of chain entanglement in mucin strands as well as by increased carboxylic charge.

III. Methods

Methods of modifying the genome of a cell include contacting the cell with an effective amount of (i) a cell-penetrating antibody, and (ii) a donor oligonucleotide containing a sequence that can correct a mutation in a cell's genome. Genomic modification may occur at a higher frequency when cells are contacted with both (i) and (ii), than when contacted with (ii) in the absence of (i). Preferably, the method does not involve contacting the cell with a nuclease (e.g., ZFN, Cas9) or peptide nucleic acid (PNA). The methods can be used to perform in vitro, ex vivo or in vivo gene editing.

Potentiating agent and donor oligonucleotide can be contacted with the cells together in the same or different admixtures, or potentiating agent and donor oligonucleotide can be contacted with cells separately. For example, cells can be first contacted with potentiating agent, followed by donor oligonucleotide. Alternatively, cells can be first contacted with donor oligonucleotide, followed by potentiating agent. In some embodiments, donor oligonucleotide and potentiating agent are mixed in solution and contacted with cells simultaneously. In a preferred embodiment, donor DNA is mixed with potentiating agent in solution and the combination is added to the cells in culture or injected into an animal to be treated.

The effective amount or therapeutically effective amount of the potentiating agent, and/or donor oligonucleotide can be a dosage sufficient to treat, inhibit, or alleviate one or more symptoms of a disease or disorder, or to otherwise provide a desired pharmacologic and/or physiologic effect, for example, reducing, inhibiting, or reversing one or more of the pathophysiological mechanisms underlying a disease or disorder.

An effective amount may also be an amount effective to increase the rate of recombination of a donor fragment relative to administration of the donor fragment in the absence of the potentiating agent. The formulation of the potentiating agent, and/or donor oligonucleotide is made to suit the mode of administration. Pharmaceutically acceptable carriers are determined in part by the particular composition being administered, as well as by the particular method used to administer the composition. Accordingly, there is a wide variety of suitable formulations of pharmaceutical compositions containing the potentiating agent and/or donor oligonucleotide. The precise dosage will vary according to a variety of factors such as subject-dependent variables (e.g., age, immune system health, clinical symptoms etc.).

The potentiating agent and donor oligonucleotide can be administered or otherwise contacted with target cells once, twice, or three times daily; one, two, three, four, five, six, seven times a week, one, two, three, four, five, six, seven or eight times a month. For example, in some embodiments, the potentiating agent and donor oligonucleotide is administered every two or three days, or on average about 2 to about 4 times about week.

The potentiating agent and donor oligonucleotide may or may not be administered at the same time. In some embodiments, the potentiating agent is contacted with a cell prior to the donor oligonucleotide. The potentiating agent can be administered to the subject, for example, 1, 2, 3, 4, 5, 6, 8, 10, 12, 18, or 24 hours, or 1, 2, 3, 4, 5, 6, or 7 days, or any combination thereof prior to administration of the donor oligonucleotide to the subject.

In preferred embodiments, the potentiating agent and donor oligonucleotide are administered in an amount effective to induce gene modification in at least one target allele to occur at frequency of at least 0.01, 0.02. 0.03, 0.04, 0.05, 0.06, 0.07, 0.08, 0.09, 0.1, 0.2. 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, or 25% of target cells. In some embodiments, particularly ex vivo applications, gene modification occurs in at least one target allele at a frequency of about 0.1-25%, or 0.5-25%, or 1-25% 2-25%, or 3-25%, or 4-25% or 5-25% or 6-25%, or 7-25%, or 8-25%, or 9-25%, or 10-25%, 11-25%, or 12-25%, or 13%-25% or 14%-25% or 15-25%, or 2-20%, or 3-20%, or 4-20% or 5-20% or 6-20%, or 7-20%, or 8-20%, or 9-20%, or 10-20%, 11-20%, or 12-20%, or 13%-20% or 14%-20% or 15-20%, 2-15%, or 3-15%, or 4-15% or 5-15% or 6-15%, or 7-15%, or 8-15%, or 9-15%, or 10-15%, 11-15%, or 12-15%, or 13%-15% or 14%-15%.

In some embodiments, particularly in vivo applications, gene modification occurs in at least one target allele at a frequency of about 0.1% to about 15%, or about 0.2% to about 15%, or about 0.3% to about 15%, or about 0.4% to about 15%, or about 0.5% to about 15%, or about 0.6% to about 15%, or about 0.7% to about 15%, or about 0.8% to about 15%, or about 0.9% to about 15%, or about 1.0% to about 15%, or about 1.1% to about 15%, or about 1.1% to about 15%, 1.2% to about 15%, 1.3% to about 15%, or about 1.4% to about 15%, or about 1.5% to about 15%, or about 1.6% to about 15%, or about 1.7% to about 15%, or about 1.8% to about 15%, or about 1.9% to about 15%, or about 2.0% to about 15%, or about 2.5% to about 15%, or about 3.0% to about 15%, or about 3.5% to about 15%, or about 4.0% to about 15%, or about 4.5% to about 15%, or about 5.0% to about 15%, or about 1% to about 15%, about 1.5% to about 15%, about 2.0% to about 15%, or about 2.5% to about 15%, or about 3.0% to about 15%, or about 3.5% to about 15%, or about 4.0% to about 15%, or about 4.5% to about 15%.

In some embodiments, gene modification occurs with low off-target effects. In some embodiments, off-target modification is undetectable using routine analysis such as, but not limited to, those described in the Examples. In some embodiments, off-target incidents occur at a frequency of 0-1%, or 0-0.1%, or 0-0.01%, or 0-0.001%, or 0-0.0001%, or 0-0000.1%, or 0-0.000001%. In some embodiments, off-target modification occurs at a frequency that is about $10^2$, $10^3$, $10^4$, or $10^5$-fold lower than at the target site.

A. Ex Vivo Gene Therapy

In some embodiments, ex vivo gene therapy of cells is used for the treatment of a genetic disorder in a subject. For ex vivo gene therapy, cells are isolated from a subject and contacted ex vivo with the compositions (potentiating agent and donor oligonucleotide) to produce cells containing altered sequences in or adjacent to genes. In a preferred embodiment, the cells are isolated from the subject to be treated or from a syngeneic host. Target cells are removed from a subject prior to contacting with a potentiating agent and donor oligonucleotide. The cells can be hematopoietic progenitor or stem cells. In a preferred embodiment, the target cells are CD34$^+$ hematopoietic stem cells. Hematopoietic stem cells (HSCs), such as CD34$^+$ cells are multipotent stem cells that give rise to all the blood cell types including erythrocytes. Therefore, CD34$^+$ cells can be isolated from a patient with, for example, thalassemia, sickle cell disease, or a lysosomal storage disease, the mutant gene altered or repaired ex-vivo using the compositions and methods, and the cells reintroduced back into the patient as a treatment or a cure.

Stem cells can be isolated and enriched by one of skill in the art. Methods for such isolation and enrichment of CD34$^+$ and other cells are known in the art and disclosed for example in U.S. Pat. Nos. 4,965,204; 4,714,680; 5,061,620; 5,643,741; 5,677,136; 5,716,827; 5,750,397 and 5,759,793. As used herein in the context of compositions enriched in hematopoietic progenitor and stem cells, "enriched" indicates a proportion of a desirable element (e.g. hematopoietic progenitor and stem cells) which is higher than that found in the natural source of the cells. A composition of cells may be enriched over a natural source of the cells by at least one order of magnitude, preferably two or three orders, and more preferably 10, 100, 200 or 1000 orders of magnitude.

In humans, CD34$^+$ cells can be recovered from cord blood, bone marrow or from blood after cytokine mobilization effected by injecting the donor with hematopoietic growth factors such as granulocyte colony stimulating factor (G-CSF), granulocyte-monocyte colony stimulating factor (GM-CSF), stem cell factor (SCF) subcutaneously or intravenously in amounts sufficient to cause movement of hematopoietic stem cells from the bone marrow space into the peripheral circulation. Initially, bone marrow cells may be obtained from any suitable source of bone marrow, e.g. tibiae, femora, spine, and other bone cavities. For isolation of bone marrow, an appropriate solution may be used to flush the bone, which solution will be a balanced salt solution, conveniently supplemented with fetal calf serum or other naturally occurring factors, in conjunction with an acceptable buffer at low concentration, generally from about 5 to 25 mM. Convenient buffers include Hepes, phosphate buffers, lactate buffers, etc.

Cells can be selected by positive and negative selection techniques. Cells can be selected using commercially available antibodies which bind to hematopoietic progenitor or stem cell surface antigens, e.g. CD34, using methods known to those of skill in the art. For example, the antibodies may be conjugated to magnetic beads and immunogenic procedures utilized to recover the desired cell type. Other techniques involve the use of fluorescence activated cell sorting (FACS). The CD34 antigen, which is found on progenitor cells within the hematopoietic system of non-leukemic individuals, is expressed on a population of cells recognized by the monoclonal antibody My-10 (i.e., express the CD34 antigen) and can be used to isolate stem cell for bone marrow transplantation. My-10 deposited with the American Type Culture Collection (Rockville, Md.) as HB-8483 is commercially available as anti-HPCA 1. Additionally, negative selection of differentiated and "dedicated" cells from human bone marrow can be utilized, to select against substantially any desired cell marker. For example, progenitor or stem cells, most preferably CD34$^+$ cells, can be characterized as being any of CD3$^-$, CD7$^-$, CD8$^-$, CD10$^-$, CD14$^-$, CD15$^-$, CD19$^-$, CD20$^-$, CD33$^-$, Class II HLA$^+$ and Thy-1$^+$.

Once progenitor or stem cells have been isolated, they may be propagated by growing in any suitable medium. For example, progenitor or stem cells can be grown in conditioned medium from stromal cells, such as those that can be obtained from bone marrow or liver associated with the secretion of factors, or in medium including cell surface factors supporting the proliferation of stem cells. Stromal cells may be freed of hematopoietic cells employing appropriate monoclonal antibodies for removal of the undesired cells.

The isolated cells are contacted ex vivo with a combination of a potentiating agent, such as a cell-penetrating antibody or anti-RAD51 factor, and donor oligonucleotides in amounts effective to cause the desired alterations in or adjacent to genes in need of repair or alteration, for example the human beta-globin or α-L-iduronidase gene. These cells are referred to herein as modified cells. A solution of the cell-penetrating antibody and donor oligonucleotide may simply be added to the cells in culture. Alternatively, transfection techniques may be used. Methods for transfection of cells with oligonucleotides are well known in the art (Koppelhus, et al., *Adv. Drug Deliv. Rev.*, 55(2): 267-280 (2003)). It may be desirable to synchronize the cells in S-phase to further increase the frequency of gene correction. Methods for synchronizing cultured cells, for example, by double thymidine block, are known in the art (Zielke, et al., *Methods Cell Biol.*, 8:107-121 (1974)).

The modified cells can be maintained or expanded in culture prior to administration to a subject. Culture conditions are generally known in the art depending on the cell type. Conditions for the maintenance of CD34$^+$ in particular have been well studied, and several suitable methods are available. A common approach to ex vivo multi-potential hematopoietic cell expansion is to culture purified progenitor or stem cells in the presence of early-acting cytokines such as interleukin-3. It has also been shown that inclusion, in a nutritive medium for maintaining hematopoietic progenitor cells ex vivo, of a combination of thrombopoietin (TPO), stem cell factor (SCF), and flt3 ligand (Flt-3L; i.e., the ligand of the flt3 gene product) was useful for expanding primitive (i.e., relatively non-differentiated) human hematopoietic progenitor cells in vitro, and that those cells were capable of engraftment in SCID-hu mice (Luens et al., 1998, Blood 91:1206-1215). In other known methods, cells can be maintained ex vivo in a nutritive medium (e.g., for minutes, hours, or 3, 6, 9, 13, or more days) including murine prolactin-like protein E (mPLP-E) or murine prolactin-like protein F (mPIP-F; collectively mPLP-E/IF) (U.S. Pat. No. 6,261,841). It will be appreciated that other suitable cell culture and expansion methods can be used as well. Cells can also be grown in serum-free medium, as described in U.S. Pat. No. 5,945,337.

In another embodiment, the modified hematopoietic stem cells are differentiated ex vivo into $CD4^+$ cells culture using specific combinations of interleukins and growth factors prior to administration to a subject using methods well known in the art. The cells may be expanded ex vivo in large numbers, preferably at least a 5-fold, more preferably at least a 10-fold and even more preferably at least a 20-fold expansion of cells compared to the original population of isolated hematopoietic stem cells.

In another embodiment cells, for ex vivo gene therapy can be dedifferentiated somatic cells. Somatic cells can be reprogrammed to become pluripotent stem-like cells that can be induced to become hematopoietic progenitor cells. The hematopoietic progenitor cells can then be treated with a potentiating agent, such as a cell-penetrating antibody, and donor oligonucleotides as described above with respect to $CD34^+$ cells to produce recombinant cells having one or more modified genes. Representative somatic cells that can be reprogrammed include, but are not limited to fibroblasts, adipocytes, and muscles cells. Hematopoietic progenitor cells from induced stem-like cells have been successfully developed in the mouse (Hanna, J. et al. *Science*, 318:1920-1923 (2007)).

To produce hematopoietic progenitor cells from induced stem-like cells, somatic cells are harvested from a host. In a preferred embodiment, the somatic cells are autologous fibroblasts. The cells are cultured and transduced with vectors encoding Oct4, Sox2, Klf4, and c-Myc transcription factors. The transduced cells are cultured and screened for embryonic stem cell (ES) morphology and ES cell markers including, but not limited to AP, SSEA1, and Nanog. The transduced ES cells are cultured and induced to produce induced stem-like cells. Cells are then screened for CD41 and c-kit markers (early hematopoietic progenitor markers) as well as markers for myeloid and erythroid differentiation.

The modified hematopoietic stem cells or modified induced hematopoietic progenitor cells are then introduced into a subject. Delivery of the cells may be affected using various methods and includes most preferably intravenous administration by infusion as well as direct depot injection into periosteal, bone marrow and/or subcutaneous sites.

The subject receiving the modified cells may be treated for bone marrow conditioning to enhance engraftment of the cells. The recipient may be treated to enhance engraftment, using a radiation or chemotherapeutic treatment prior to the administration of the cells. Upon administration, the cells will generally require a period of time to engraft. Achieving significant engraftment of hematopoietic stem or progenitor cells typically takes weeks to months.

A high percentage of engraftment of modified hematopoietic stem cells is not envisioned to be necessary to achieve significant prophylactic or therapeutic effect. It is believed that the engrafted cells will expand over time following engraftment to increase the percentage of modified cells. For example, in some embodiments, the modified cells have a corrected α-L-iduronidase gene. Therefore, in a subject with Hurler syndrome, the modified cells can improve or cure the condition. It is believed that engraftment of only a small number or small percentage of modified hematopoietic stem cells will be required to provide a prophylactic or therapeutic effect.

In preferred embodiments, the cells to be administered to a subject will be autologous, e.g. derived from the subject, or syngenic.

In some embodiments, the compositions and methods can be used to edit embryonic genomes in vitro. The methods typically include contacting an embryo in vitro with an effective amount of potentiating agent and donor oligonucleotide to induce at least one alteration in the genome of the embryo. Most preferably the embryo is a single cell zygote, however, treatment of male and female gametes prior to and during fertilization, and embryos having 2, 4, 8, or 16 cells and including not only zygotes, but also morulas and blastocytes, are also provided. Typically, the embryo is contacted with the compositions on culture days 0-6 during or following in vitro fertilization.

The contacting can be adding the compositions to liquid media bathing the embryo. For example, the compositions can be pipetted directly into the embryo culture media, whereupon they are taken up by the embryo.

B. In Vivo Gene Therapy

In some embodiments, in vivo gene therapy of cells is used for the treatment of a genetic disorder in a subject. The compositions (cell-penetrating antibody and donor oligonucleotide) can be administered directly to a subject for in vivo gene therapy.

In general, methods of administering compounds, including antibodies, oligonucleotides and related molecules, are well known in the art. In particular, the routes of administration already in use for nucleic acid therapeutics, along with formulations in current use, provide preferred routes of administration and formulation for the donor oligonucleotides described above. Preferably the compositions (potentiating agent and donor oligonucleotide) are injected or infused into the organism undergoing genetic manipulation, such as an animal requiring gene therapy.

The compositions (e.g., potentiating agent such as a cell-penetrating antibody and donor oligonucleotide) can be administered by a number of routes including, but not limited to, intravenous, intraperitoneal, intraamniotic, intramuscular, subcutaneous, or topical (sublingual, rectal, intranasal, pulmonary, rectal mucosa, and vaginal), and oral (sublingual, buccal).

In some embodiments, the compounds are formulated for pulmonary delivery, such as intranasal administration or oral inhalation.

Administration of the formulations may be accomplished by any acceptable method that allows the potentiating agent and donor oligonucleotide to reach their targets. The administration may be localized (i.e., to a particular region, physiological system, tissue, organ, or cell type) or systemic, depending on the condition being treated. Compositions and methods for in vivo delivery are also discussed in WO 2017/143042.

The methods can also include administering an effective amount of potentiating agent and donor oligonucleotide to an embryo or fetus, or the pregnant mother thereof, in vivo. In some methods, compositions are delivered in utero by injecting and/or infusing the compositions into a vein or artery, such as the vitelline vein or the umbilical vein, or into the amniotic sac of an embryo or fetus. See, e.g., Ricciardi, et al., *Nat Commun.* 2018 Jun. 26; 9(1):2481. doi: 10.1038/s41467-018-04894-2, and WO 2018/187493.

C. Diseases to be Treated

Gene therapy is apparent when studied in the context of human genetic diseases, for example, cystic fibrosis, hemophilia, globinopathies such as sickle cell anemia and beta-thalassemia, xeroderma pigmentosum, and lysosomal storage diseases, though the strategies are also useful for treating non-genetic disease such as HIV, in the context of ex vivo-based cell modification and also for in vivo cell modification. The methods using a potentiating agent, such as a cell-penetrating antibody, and donor oligonucleotides, are especially useful to treat genetic deficiencies, disorders and diseases caused by mutations in single genes, for example, to correct genetic deficiencies, disorders and diseases caused by point mutations. If the target gene contains a mutation that is the cause of a genetic disorder, then the methods can be used for mutagenic repair that may restore the DNA sequence of the target gene to normal. The target sequence can be within the coding DNA sequence of the gene or within an intron. The target sequence can also be within DNA sequences that regulate expression of the target gene, including promoter or enhancer sequences.

In the methods herein, cells that have been contacted with the potentiating agent and donor oligonucleotide may be administered to a subject. The subject may have a disease or disorder such as hemophilia, muscular dystrophy, globinopathies, cystic fibrosis, xeroderma pigmentosum, or lysosomal storage diseases. In such embodiments, gene modification may occur in an effective amount to reduce one or more symptoms of the disease or disorder in the subject. Exemplary sequences for donor oligonucleotides designed to correct mutations in globinopathies, cystic fibrosis, HIV, and lysosomal storage diseases are known in the art and disclosed in, for example, published international applications WO 2017/143042, WO 2017/143061, WO 2018/187493, and published U.S. Application No. 2017/0283830, each of which is specifically incorporated by reference in its entirety.

Donor oligonucleotides can be either single stranded or double stranded, and can target one or both strands of the genomic sequence at a target locus. Exemplary donor oligonucleotides are provided below. The donors are typically presented as single stranded DNA sequences targeting one strand of the target genomic locus. However, even where not expressly provided below, the reverse complement of each donor, and double stranded DNA sequences, are also disclosed based on the provided sequences. In some embodiments, the donor oligonucleotide is a functional fragment of the disclosed sequence, or the reverse complement, or double stranded DNA thereof.

1. Globinopathies

Worldwide, globinopathies account for significant morbidity and mortality. Over 1,200 different known genetic mutations affect the DNA sequence of the human alpha-like (HBZ, HBA2, HBA1, and HBQ1) and beta-like (HBE1, HBG1, HBD, and HBB) globin genes. Two of the more prevalent and well-studied globinopathies are sickle cell anemia and β-thalassemia. Substitution of valine for glutamic acid at position 6 of the β-globin chain in patients with sickle cell anemia predisposes to hemoglobin polymerization, leading to sickle cell rigidity and vasoocclusion with resulting tissue and organ damage. In patients with β-thalassemia, a variety of mutational mechanisms results in reduced synthesis of β-globin leading to accumulation of aggregates of unpaired, insoluble α-chains that cause ineffective erythropoiesis, accelerated red cell destruction, and severe anemia.

Together, globinopathies represent the most common single-gene disorders in man. Donor oligonucleotides herein are effective at binding to the human β-globin both in vitro and in living cells, both ex vivo and in vivo in animals. Experimental results also demonstrate correction of a thalassemia-associated mutation in vivo in a transgenic mouse carrying a human beta globin gene with the IVS2-654 thalassemia mutation (in place of the endogenous mouse beta globin).

β-thalassemia is an unstable hemoglobinopathy leading to the precipitation of α-hemoglobin within RBCs resulting in a severe hemolytic anemia. Patients experience jaundice and splenomegaly, with substantially decreased blood hemoglobin concentrations necessitating repeated transfusions, typically resulting in severe iron overload with time. Cardiac failure due to myocardial siderosis is a major cause of death from β-thalassemia by the end of the third decade. Reduction of repeated blood transfusions in these patients is therefore of primary importance to improve patient outcomes.

Exemplary β-Globin Gene Mutations

A portion of the GenBank sequence of the chromosome-11 human-native hemoglobin-gene cluster (GenBank: U01317.1—Human beta globin region on chromosome 11—LOCUS HUMHBB, 73308 bp ds-DNA) from base 60001 to base 66060 is presented below. The start of the gene coding sequence at position 62187-62189 is indicated by wave underlining. This portion of the GenBank sequence contains the native β globin gene sequence. In sickle cell hemoglobin the adenine base at position 62206 is mutated to a thymine. Other common point mutations occur in intron 2 (IVS2), which is highlighted in the sequence below by italics. Mutations include IVS2-1, IVS2-566, IVS2-654, IVS2-705, and IVS2-745, which are also shown in bold and heavy underlining; numbering relative to the start of intron 2.

Gene editing molecules can be designed based on the guidance provided herein and otherwise known in the art. Exemplary donor oligonucleotide sequences, are provided in, for example, WO 1996/040271, WO/2010/123983, and U.S. Pat. No. 8,658,608, and can be altered to include one or more of the modifications herein. Target regions can be reference based on the coding strand of genomic DNA, or the complementary non-coding sequence thereto (e.g., the Watson or Crick stand). Exemplary sites targeted by the donor oligonucleotide can be any region encompassing any disease-related mutation (shown below) in the beta globin gene.

(SEQ ID NO: 42)
AAAGCTCTTGCTTTGACAATTTTGGTCTTTCAGAATACTATAAATATAACCTATATTATA

ATTTCATAAAGTCTGTGCATTTTCTTTGACCCAGGATATTTGCAAAAGACATATTCAAAC

TTCCGCAGAACACTTTATTTCACATATACATGCCTCTTATATCAGGGATGTGAAACAGGG

TCTTGAAAACTGTCTAAATCTAAAACAATGCTAATGCAGGTTTAAATTTAATAAAATAAA

-continued

```
ATCCAAAATCTAACAGCCAAGTCAAATCTGTATGTTTTAACATTTAAAATATTTTAAAGA
CGTCTTTTCCCAGGATTCAACATGTGAAATCTTTTCTCAGGGATACACGTGTGCCTAGAT
CCTCATTGCTTTAGTTTTTTACAGAGGAATGAATATAAAAAGAAAATACTTAAATTTTAT
CCCTCTTACCTCTATAATCATACATAGGCATAATTTTTTAACCTAGGCTCCAGATAGCCA
TAGAAGAACCAAACACTTTCTGCGTGTGTGAGAATAATCAGAGTGAGATTTTTTCACAAG
TACCTGATGAGGGTTGAGACAGGTAGAAAAAGTGAGAGATCTCTATTTATTTAGCAATAA
TAGAGAAAGCATTTAAGAGAATAAAGCAATGGAAATAAGAAATTTGTAAATTTCCTTCTG
ATAACTAGAAATAGAGGATCCAGTTTCTTTTGGTTAACCTAAATTTTATTTCATTTTATT
GTTTTATTTTATTTTATTTTATTTTATTTTGTGTAATCGTAGTTTCAGAGTGTTAGAGCT
GAAAGGAAGAAGTAGGAGAAACATGCAAAGTAAAAGTATAACACTTTCCTTACTAAACCG
ACTGGGTTTCCAGGTAGGGGCAGGATTCAGGATGACTGACAGGGCCCTTAGGGAACACTG
AGACCCTACGCTGACCTCATAAATGCTTGCTACCTTTGCTGTTTTAATTACATCTTTTAA
TAGCAGGAAGCAGAACTCTGCACTTCAAAAGTTTTTCCTCACCTGAGGAGTTAATTTAGT
ACAAGGGGAAAAAGTACAGGGGGATGGGAGAAAGGCGATCACGTTGGGAAGCTATAGAGA
AAGAAGAGTAAATTTTAGTAAAGGAGGTTTAAACAAACAAAATATAAAGAGAAATAGGAA
CTTGAATCAAGGAAATGATTTTAAAACGCAGTATTCTTAGTGGACTAGAGGAAAAAAATA
ATCTGAGCCAAGTAGAAGACCTTTTCCCCTCCTACCCCTACTTTCTAAGTCACAGAGGCT
TTTTGTTCCCCCAGACACTCTTGCAGATTAGTCCAGGCAGAAACAGTTAGATGTCCCCAG
TTAACCTCCTATTTGACACCACTGATTACCCCATTGATAGTCACACTTTGGGTTGTAAGT
GACTTTTTATTTATTTGTATTTTTGACTGCATTAAGAGGTCTCTAGTTTTTTATCTCTTG
TTTCCCAAAACCTAATAAGTAACTAATGCACAGAGCACATTGATTTGTATTTATTCTATT
TTTAGACATAATTTATTAGCATGCATGAGCAAATTAAGAAAAACAACAACAAATGAATGC
ATATATATGTATATGTATGTGTATATATACACATATATATATATATTTTTTTTCTTTT
CTTACCAGAAGGTTTTAATCCAAATAAGGAGAAGATATGCTTAGAACTGAGGTAGAGTTT
TCATCCATTCTGTCCTGTAAGTATTTTGCATATTCTGGAGACGCAGGAAGAGATCCATCT
ACATATCCCAAAGCTGAATTATGGTAGACAAAGCTCTTCCACTTTTAGTGCATCAATTTC
TTATTTGTGTAATAAGAAAATTGGGAAAACGATCTTCAATATGCTTACCAAGCTGTGATT
CCAAATATTACGTAAATACACTTGCAAAGGAGGATGTTTTTAGTAGCAATTTGTACTGAT
GGTATGGGGCCAAGAGATATATCTTAGAGGGAGGGCTGAGGGTTTGAAGTCCAACTCCTA
AGCCAGTGCCAGAAGAGCCAAGGACAGGTACGGCTGTCATCACTTAGACCTCACCCTGTG
GAGCCACACCCTAGGGTTGGCCAATCTACTCCCAGGAGCAGGGAGGGCAGGAGCCAGGGC
TGGGCATAAAAGTCAGGGCAGAGCCATCTATTGCTTACATTTGCTTCTGACACAACTGTG
TTCACTAGCAACCTCAAACAGACAC
ᶜATGGTGCACCTGACTCCTGAGGAGAAGTCTGCCG
TTACTGCCCTGTGGGGCAAGGTGAACGTGGATGAAGTTGGTGGTGAGGCCCTGGGCAGGT
TGGTATCAAGGTTACAAGACAGGTTTAAGGAGACCAATAGAAACTGGGCATGTGGAGACA
GAGAAGACTCTTGGGTTTCTGATAGGCACTGACTCTCTCTGCCTATTGGTCTATTTTCCC
ACCCTTAGGCTGCTGGTGGTCTACCCTTGGACCCAGAGGTTCTTTGAGTCCTTTGGGGAT
CTGTCCACTCCTGATGCTGTTATGGGCAACCCTAAGGTGAAGGCTCATGGCAAGAAAGTG
CTCGGTGCCTTTAGTGATGGCCTGGCTCACCTGGACAACCTCAAGGGCACCTTTGCCACA
CTGAGTGAGCTGCACTGTGACAAGCTGCACGTGGATCCTGAGAACTTCAGGGTGAGTCTA
```

-continued

TGGGAGCCTTGATGTTTTCTTTCCCCTTCTTTTCTATGGTTAAGTTCATGTCATAGGAAG

GGGAGAAGTAACAGGGTACAGTTTAGAATGGGAAACAGACGAATGATTGCATCAGTGTGG

AAGTCTCAGGATCGTTTTAGTTTCTTTTATTTGCTGTTCATAACAATTGTTTTCTTTTGT

TTAATTCTTGCTTTCTTTTTTTTTCTTCTCCGCAATTTTTACTATTATACTTAATGCCTT

AACATTGTGTATAACAAAAGGAAATATCTCTGAGATACATTAAGTAACTTAAAAAAAAAC

TTTACACAGTCTGCCTAGTACATTACTATTTGGAATATATGTGTGCTTATTTGCATATTC

ATAATCTCCCTACTTTATTTTCTTTTATTTTTAATTGATACATAATCATTATACATATTT

ATGGGTTAAAGTGTAATGTTTTAATATGTGTACACATATTGACCAAATCAGGGTAATTTT

GCATTTGTAATTTTAAAAAATGCTTTCTTCTTTTAATATACTTTTTTGTTTATCTTATTT

CTAATACTTTCCCTAATCTCTTTCTTTCAGGGCAATAATGATACAATGTATCATGCCTCT

TTGCACCATTCTAAAGAATAACAGTGATAATTTCTGGGTTAAGGCAATAGCAATATTTCT

GCATATAAATATTTCTGCATATAAATTGTAACTGATGTAAGAGGTTTCATATTGCTAATA

GCAGCTACAATCCAGCTACCATTCTGCTTTTATTTTATGGTTGGGATAAGGCTGGATTAT

TCTGAGTCCAAGCTAGGCCCTTTTGCTAATCATGTTCATACCTCTTATCTTCCTCCCACA

GCTCCTGGGCAACGTGCTGGTCTGTGCTGGCCCATCACTTTGGCAAAGAATTCACCCC

ACCAGTGCAGGCTGCCTATCAGAAAGTGGTGGCTGGTGTGGCTAATGCCCTGGCCCACAA

GTATCACTAAGCTCGCTTTCTTGCTGTCCAATTTCTATTAAAGGTTCCTTTGTTCCCTAA

GTCCAACTACTAAACTGGGGGATATTATGAAGGGCCTTGAGCATCTGGATTCTGCCTAAT

AAAAAACATTTATTTTCATTGCAATGATGTATTTAAATTATTTCTGAATATTTTACTAAA

AAGGGAATGTGGGAGGTCAGTGCATTTAAAACATAAAGAAATGAAGAGCTAGTTCAAACC

TTGGGAAAATACACTATATCTTAAACTCCATGAAAGAAGGTGAGGCTGCAAACAGCTAAT

GCACATTGGCAACAGCCCTGATGCCTATGCCTTATTCATCCCTCAGAAAAGGATTCAAGT

AGAGGCTTGATTTGGAGGTTAAAGTTTTGCTATGCTGTATTTTACATTACTTATTGTTTT

AGCTGTCCTCATGAATGTCTTTTCACTACCCATTTGCTTATCCTGCATCTCTCAGCCTTG

ACTCCACTCAGTTCTCTTGCTTAGAGATACCACCTTTCCCCTGAAGTGTTCCTTCCATGT

TTTACGGCGAGATGGTTTCTCCTCGCCTGGCCACTCAGCCTTAGTTGTCTCTGTTGTCTT

ATAGAGGTCTACTTGAAGAAGGAAAAACAGGGGGCATGGTTTGACTGTCCTGTGAGCCCT

TCTTCCCTGCCTCCCCCACTCACAGTGACCCGGAATCTGCAGTGCTAGTCTCCCGGAACT

ATCACTCTTTCACAGTCTACTTTGGAAGGACTGGGCTTAGTATGAAAAGTTAGGACTGAG

AAGAATTTGAAAGGGGCTTTTTGTAGCTTGATATTCACTACTGTCTTATTACCCTATCA

TAGGCCCACCCCAAATGGAAGTCCCATTCTTCCTCAGGATGTTTAAGATTAGCATTCAGG

AAGAGATCAGAGGTCTGCTGGCTCCCTTATCATGTCCCTTATGGTGCTTCTGGCTCTGCA

GTTATTAGCATAGTGTTACCATCAACCACCTTAACTTCATTTTTCTTATTCAATACCTAG

GTAGGTAGATGCTAGATTCTGGAAATAAAATATGAGTCTCAAGTGGTCCTTGTCCTCTCT

CCCAGTCAAATTCTGAATCTAGTTGGCAAGATTCTGAAATCAAGGCATATAATCAGTAAT

AAGTGATGATAGAAGGGTATATAGAAGAATTTTATTATATGAGAGGGTGAAACCTAAAAT

GAAATGAAATCAGACCCTTGTCTTACACCATAAACAAAAATAAATTTGAATGGGTTAAAG

AATTAAACTAAGACCTAAAACCATAAAAATTTTTAAAGAAATCAAAAGAAGAAAATTCTA

ATATTCATGTTGCAGCCGTTTTTTGAATTTGATATGAGAAGCAAAGGCAACAAAAGGAAA

AATAAAGAAGTGAGGCTACATCAAACTAAAAAATTTCCACACAAAAAAGAAAACAATGAA

CAAATGAAAGGTGAACCATGAAATGGCATATTTGCAAACCAAATATTTCTTAAATATTTT

```
GGTTAATATCCAAAATATATAAGAAACACAGATGATTCAATAACAAACAAAAAATTAAAA

ATAGGAAAATAAAAAAATTAAAAAGAAGAAAATCCTGCCATTTATGCGAGAATTGATGAA

CCTGGAGGATGTAAAACTAAGAAAAATAAGCCTGACACAAAAAGACAAATACTACACAAC

CTTGCTCATATGTGAAACATAAAAAAGTCACTCTCATGGAAACAGACAGTAGAGGTATGG

TTTCCAGGGGTTGGGGGTGGGAGAATCAGGAAACTATTACTCAAAGGGTATAAAATTTCA

GTTATGTGGGATGAATAAATTCTAGATATCTAATGTACAGCATCGTGACTGTAGTTAATT

GTACTGTAAGTATATTTAAAATTTGCAAAGAGAGTAGATTTTTTTGTTTTTTTAGATGGA

GTTTTGCTCTTGTTGTCCAGGCTGGAGTGCAATGGCAAGATCTTGGCTCACTGCAACCTC

CGCCTCCTGGGTTCAAGCAAATCTCCTGCCTCAGCCTCCCGAGTAGCTGGGATTACAGGC

ATGCGACACCATGCCCAGCTAATTTTGTATTTTTAGTAGAGACGGGGTTTCTCCATGTTG

GTCAGGCTGATCCGCCTCCTCGGCCACCAAAGGGCTGGGATTACAGGCGTGACCACCGGG

CCTGGCCGAGAGTAGATCTTAAAAGCATTTACCACAAGAAAAAGGTAACTATGTGAGATA

ATGGGTATGTTAATTAGCTTGATTGTGGTAATCATTTCACAAGGTATACATATATTAAAA

CATCATGTTGTACACCTTAAATATATACAATTTTTATTTGTGAATGATACCTCAATAAAG

TTGAAGAATAATAAAAAAGAATAGACATCACATGAATTAAAAAACTAAAAAATAAAAAAA

TGCATCTTGATGATTAGAATTGCATTCTTGATTTTTCAGATACAAATATCCATTTGACTG.
```

Exemplary β-Globin Donors

In some embodiments, the a potentiating agent, such as a cell-penetrating antibody, are used in combination with a donor oligonucleotide for correction of IVS2-654 mutation that includes the sequence 5' AAAGAATAACAGTGATAATTTCTGGGT-TAAGGCAATAGCAATAT CTCTGCATATAAATAT 3' (SEQ ID NO:43) with the correcting IVS2-654 nucleotide underlined: or a functional fragment thereof that is suitable and sufficient to correct the IVS2-654 mutation.

Other exemplary donor sequences include, but are not limited to, DonorGFP-IVS2-1 (Sense)

```
                                            (SEQ ID NO: 44)
5' GTTCAGCGTGTCCGGCGAGGGCGAGGTGAGTCTATGGGACCCTTGAT

GTTT 3',
```

DonorGFP-IVS2-1 (Antisense)

5' AAACATCAAGGGTCCCATAGACT-CACCTCGCCCTCGCCGGACAC GCTGAAC 3' (SEQ ID NO:45), and, or a functional fragment thereof that is suitable and sufficient to correct a mutation.

In some embodiments, a Sickle Cells Disease mutation can be corrected using a donor having the sequence 5' CTTGCCCCACAGGGCAGTAACGGCAGAT-TTTTC TTC CGGCGTTA AATGCAC-CATGGTGTCTGTTTGAGGT 3' (SEQ ID NO:46), or a functional fragment thereof that is suitable and sufficient to correct a mutation, wherein the three boxed nucleotides represent the corrected codon 6 which reverts the mutant Valine (associated with human sickle cell disease) back to the wildtype Glutamic acid and nucleotides in bold font (without underlining) represent changes to the genomic DNA but not to the encoded amino acid; or 5' ACAGACACCATGGTGCACCTGACTCCTGAG-GAGAAGTCTGCCGT TACTGCC 3' (SEQ ID NO:47), or a functional fragment thereof that is suitable and sufficient to correct a mutation, wherein the bolded and underlined residue is the correction, or 5' T(s)T(s)G(s)CCCCACAGGGCAGTAACGGCA-GACTTCTCCTC AGGAGTCAGGTGCAC-CATGGTGTCTGT (s)T(s)T(s)G3' (SEQ ID NO:48), or a functional fragment thereof that is suitable and sufficient to correct a mutation, wherein the bolded and underlined residue is the correction and "(s)" indicates an optional phosphorothioate internucleoside linkage.

2. Cystic Fibrosis

The compositions and methods can be used to treat cystic fibrosis. Cystic fibrosis (CF) is a lethal autosomal recessive disease caused by defects in the cystic fibrosis transmembrane conductance regulator (CFTR), an ion channel that mediates Cl— transport. Lack of CFTR function results in chronic obstructive lung disease and premature death due to respiratory failure, intestinal obstruction syndromes, exocrine and endocrine pancreatic dysfunction, and infertility (Davis, et al., Pediatr Rev., 22(8):257-64 (2001)). The most common mutation in CF is a three base-pair deletion (F508del) resulting in the loss of a phenylalanine residue, causing intracellular degradation of the CFTR protein and lack of cell surface expression (Davis, et al., Am J Respir Crit Care Med., 173(5):475-82 (2006)). In addition to this common mutation there are many other mutations that occur and lead to disease including a class of mutations due to premature stop codons, nonsense mutations. In fact nonsense mutations account for approximately 10% of disease causing mutations. Of the nonsense mutations G542X and W1282X are the most common with frequencies of 2.6% and 1.6% respectfully.

Although CF is one of the most rigorously characterized genetic diseases, current treatment of patients with CF focuses on symptomatic management rather than primary correction of the genetic defect. Gene therapy has remained an elusive target in CF, because of challenges of in vivo delivery to the lung and other organ systems (Armstrong, et al., Archives of disease in childhood (2014) doi: 10.1136/archdischild-2012-302158. PubMed PMID: 24464978). In recent years, there have been many advances in gene therapy for treatment of diseases involving the hematolymphoid system, where harvest and ex vivo manipulation of cells for autologous transplantation is possible: some examples include the use of zinc finger nucleases targeting CCR5 to produce HIV-1 resistant cells (Holt, et al., *Nature biotechnology*, 28(8):839-47 (2010)) correction of the ABCD1 gene by lentiviral vectors for treatment of adrenoleukodystrophy (Cartier, et al., *Science*, 326(5954):818-23 (2009)) and correction of SCID due to ADA deficiency using retroviral gene transfer (Aiuti, et al., *The New England Journal Of Medicine*, 360(5):447-58 (2009).

Unfortunately, harvest and autologous transplant is not an option in CF, due to the involvement of the lung and other internal organs. As one approach, the UK Cystic Fibrosis Gene Therapy Consortium has tested liposomes to deliver plasmids containing cDNA encoding CFTR to the lung (Alton, et al., *Thorax*, 68(11):1075-7 (2013)), Alton, et al., *The Lancet Respiratory Medicine*, (2015). doi: 10.1016/S2213-2600(15)00245-3. PubMed PMID: 26149841.) other clinical trials have used viral vectors for delivery of the CFTR gene or CFTR expression plasmids that are compacted by polyethylene glycol-substituted lysine 30-mer peptides with limited success (Konstan, et al., *Human Gene Therapy*, 15(12):1255-69 (2004)). Delivery of plasmid DNA for gene addition without targeted insertion does not result in correction of the endogenous gene and is not subject to normal CFTR gene regulation, and virus-mediated integration of the CFTR cDNA could introduce the risk of non-specific integration into important genomic sites.

A potentiating agent, such as a cell-penetrating antibody, and donor DNA oligonucleotides can be used to correct mutations leading to cystic fibrosis. In preferred embodiments, the compositions are administered by intranasal or pulmonary delivery. In some embodiments, systemtic administration such as IV injection or infusion is utilized to treat CF, due to the need to correct the mutation in multiple tissues—e.g., gut. The compositions can be administered in an effective amount to induce or enhance gene correction in an amount effective to reduce one or more symptoms of cystic fibrosis. For example, in some embodiments, the gene correction occurs at an amount effective to improve impaired response to cyclic AMP stimulation, improve hyperpolarization in response to forskolin, reduction in the large lumen negative nasal potential, reduction in inflammatory cells in the bronchoalveolar lavage (BAL), improve lung histology, or a combination thereof. In some embodiments, the target cells are cells, particularly epithelial cells, that make up the sweat glands in the skin, that line passageways inside the lungs, liver, pancreas, or digestive or reproductive systems. In particular embodiments, the target cells are bronchial epithelial cells. While permanent genomic change using the gene-editing methods herein is less transient than plasmid-based approaches and the changes will be passed on to daughter cells, some modified cells may be lost over time with regular turnover of the respiratory epithelium. In some embodiments, the target cells are lung epithelial progenitor cells. Modification of lung epithelial progenitors can induce more long-term correction of phenotype.

Sequences for the human cystic fibrosis transmembrane conductance regulator (CFTR) are known in the art, see, for example, GenBank Accession number: AH006034.1, and compositions and methods of targeted correction of CFTR are described in McNeer, et al., *Nature Communications*, 6:6952, (DOI 10.1038/ncomms7952), 11 pages.

Exemplary CFTR Donors

In some embodiments, a donor that can be used for CFTR gene correction includes the sequence 5' TTCTGTATCTATATTCATCATAGGAAACAC-CAAAGATAATGTTC TCCTTAATGGTGCCAGG3' (SEQ ID NO:49), or a functional fragment thereof that is suitable and sufficient to correct the F508del mutation in the cystic fibrosis transmembrane conductance regulator (CFTR) gene. The complementary sequence matching the other strand of the CFTR gene at this location, or functional fragments thereof, is also suitable.

In some embodiments, a donor that can be used for CFTR gene correction includes the sequence T(s)C(s)T(s)TGGGATTCAATAACCTTGCA-GACAGTGGAGGAAGGCCTTTGGCGTGATAC-CACAG(s)G(s)T(s)G (SEQ ID NO:50) or a functional fragment thereof that is suitable and sufficient to correct a mutation in CFTR, wherein the bolded and underlined nucleotides are inserted mutations, and "(s)" indicates an optional phosphorothioate internucleoside linkage.

In some embodiments, a donor that can be used for CFTR gene correction includes the sequence T(s)C(s)C(s)AAGTTTGCAGAGAAAGA-TAATATAGTCCTTGGAG AAGGAGGAATCACCCT-GAGTGGA(s)G(s)G(s)T (SEQ ID NO:51), or a functional fragment thereof that is suitable and sufficient to correct a mutation in CFTR, wherein the bolded and underlined nucleotides are inserted mutations, and "(s)" indicates an optional phosphorothioate internucleoside linkage.

In some embodiments, in addition to containing sequence designed to correct a mutation in the CFTR gene, the donor oligonucleotides may also contain additional, synonymous (silent) mutations. The additional silent mutations can facilitate detection of the corrected target sequence using allele-specific PCR of genomic DNA isolated from treated cells.

3. Lysosomal Storage Diseases

The disclosed compositions and methods can also be used to treat lysosomal storage diseases. Lysosomal storage diseases (LSDs) are a group of more than 50 clinically-recognized, rare inherited metabolic disorders that result from defects in lysosomal function (Walkley, *J. Inherit. Metab. Dis.*, 32(2):181-9 (2009)). Lysosomal storage disorders are caused by dysfunction of the cell's lysosome oraganelle, which is part of the larger endosomal/lysosomal system. Together with the ubiquitin-proteosomal and autophagosomal systems, the lysosome is essential to substrate degradation and recycling, homeostatic control, and signaling within the cell. Lysosomal dysfunction is usually the result of a deficiency of a single enzyme necessary for the metabolism of lipids, glycoproteins (sugar containing proteins) or mucopolysaccharides (long unbranched polysaccharides consisting of a repeating disaccharide unit; also known as glycosaminoglycans, or GAGs) which are fated for breakdown or recycling. Enzyme deficiency reduces or prevents break down or recycling of the unwanted lipids, glycoproteins, and GAGs, and results in buildup or "storage" of these materials within the cell. Most lysosomal diseases show widespread tissue and organ involvement, with brain, viscera, bone and connective tissues often being affected. More than two-thirds of lysosomal diseases affect the brain. Neurons appear particularly vulnerable to lysosomal dysfunction, exhibiting a range of defects from specific axonal and dendritic abnormalities to neuron death.

Individually, LSDs occur with incidences of less than 1:100,000, however, as a group the incidence is as high as 1 in 1,500 to 7,000 live births (Staretz-Chacham, et al., *Pediatrics*, 123(4):1191-207 (2009)). LSDs are typically the result of inborn genetic errors. Most of these disorders are autosomal recessively inherited, however a few are X-linked recessively inherited, such as Fabry disease and Hunter syndrome (MPS II). Affected individuals generally appear normal at birth, however the diseases are progressive. Development of clinical disease may not occur until years or decades later, but is typically fatal. Lysosomal storage diseases affect mostly children and they often die at a young and unpredictable age, many within a few months or years of birth. Many other children die of this disease following years of suffering from various symptoms of their particular disorder. Clinical disease may be manifest as mental retardation and/or dementia, sensory loss including blindness or deafness, motor system dysfunction, seizures, sleep and behavioral disturbances, and so forth. Some people with Lysosomal storage disease have enlarged livers (hepatomegaly) and enlarged spleens (splenomegaly), pulmonary and cardiac problems, and bones that grow abnormally.

Treatment for many LSDs is enzyme replacement therapy (ERT) and/or substrate reduction therapy (SRT), as well as treatment or management of symptoms. The average annual cost of ERT in the United States ranges from $90,000 to $565,000. While ERT has significant systemic clinical efficacy for a variety of LSDs, little or no effects are seen on central nervous system (CNS) disease symptoms, because the recombinant proteins cannot penetrate the blood-brain barrier. Allogeneic hematopoietic stem cell transplantation (HSCT) represents a highly effective treatment for selected LSDs. It is currently the only means to prevent the progression of associated neurologic sequelae. However, HSCT is expensive, requires an HLA-matched donor and is associated with significant morbidity and mortality. Recent gene therapy studies suggest that LSDs are good targets for this type of treatment.

WO 2011/133802 provides examples of donor oligonucleotides that can be utilized in the compositions and methods.

For example, the compositions and methods can be employed to treat Gaucher's disease (GD). Gaucher's disease, also known as Gaucher syndrome, is the most common lysosomal storage disease. Gaucher's disease is an inherited genetic disease in which lipid accumulates in cells and certain organs due to deficiency of the enzyme glucocerebrosidase (also known as acid β-glucosidase) in lysosomes. Glucocerebrosidase enzyme contributes to the degradation of the fatty substance glucocerebroside (also known as glucosylceramide) by cleaving b-glycoside into b-glucose and ceramide subunits (Scriver C R, Beaudet A L, Valle D, Sly W S. *The metabolic and molecular basis of inherited disease*. 8th ed. New York: McGraw-Hill Pub, 2001: 3635-3668). When the enzyme is defective, the substance accumulates, particularly in cells of the mononuclear cell lineage, and organs and tissues including the spleen, liver, kidneys, lungs, brain and bone marrow.

There are two major forms: non-neuropathic (type 1, most commonly observed type in adulthood) and neuropathic (type 2 and 3). GBA (GBA glucosidase, beta, acid), the only known human gene responsible for glucosidase-mediated GD, is located on chromosome 1, location 1q21. More than 200 mutations have been defined within the known genomic sequence of this single gene (NCBI Reference Sequence: NG_009783.1). The most commonly observed mutations are N370S, L444P, RecNciI, 84GG, R463C, and recTL. 84 GG is a null mutation in which there is no capacity to synthesize enzyme. However, N370S mutation is almost always related with type 1 disease and milder forms of disease. Very rarely, deficiency of sphingolipid activator protein (Gaucher factor, SAP-2, saposin C) may result in GD. In some embodiments, donor oligonucleotides are designed and used to correct mutations in GBA.

In another embodiment, compositions and the methods are used to treat Fabry disease (also known as Fabry's disease, Anderson-Fabry disease, angiokeratoma *corporis diffusum* and alpha-galactosidase A deficiency), a rare X-linked recessive disordered, resulting from a deficiency of the enzyme alpha galactosidase A (a-GAL A, encoded by GLA). The human gene encoding GLA has a known genomic sequence (NCBI Reference Sequence: NG_007119.1) and is located at Xp22 of the X chromosome. Mutations in GLA result in accumulation of the glycolipid globotriaosylceramide (abbreviated as Gb3, GL-3, or ceramide trihexoside) within the blood vessels, other tissues, and organs, resulting in impairment of their proper function (Karen, et al., *Dermatol. Online J.*, 11 (4): 8 (2005)). The condition affects hemizygous males (i.e. all males), as well as homozygous, and potentially heterozygous (carrier), females. Males typically experience severe symptoms, while women can range from being asymptomatic to having severe symptoms. This variability is thought to be due to X-inactivation patterns during embryonic development of the female. In some embodiments, donor oligonucleotides are designed and used to correct mutations in GLA.

The compositions and methods can be used to treat Hurler syndrome (HS). Hurler syndrome, also known as mucopolysaccharidosis type I (MPS I), α-L-iduronidase deficiency, and Hurler's disease, is a genetic disorder that results in the buildup of mucopolysaccharides due to a deficiency of α-L iduronidase, an enzyme responsible for the degradation of mucopolysaccharides in lysosomes (Dib and Pastories, *Genet. Mol. Res.*, 6(3):667-74 (2007)). MPS I is divided into three subtypes based on severity of symptoms. All three types result from an absence of, or insufficient levels of, the enzyme α-L-iduronidase. MPS I H or Hurler syndrome is the most severe of the MPS I subtypes. The other two types are MPS I S or Scheie syndrome and MPS I H-S or Hurler-Scheie syndrome. Without α-L-iduronidase, heparan sulfate and dermatan sulfate, the main components of connective tissues, build-up in the body. Excessive amounts of glycosaminoglycans (GAGs) pass into the blood circulation and are stored throughout the body, with some excreted in the urine. Symptoms appear during childhood, and can include developmental delay as early as the first year of age. Patients usually reach a plateau in their development between the ages of two and four years, followed by progressive mental decline and loss of physical skills (Scott et al., *Hum. Mutat.* 6: 288-302 (1995)). Language may be limited due to hearing loss and an enlarged tongue, and eventually site impairment can result from clouding of cornea and retinal degeneration. Carpal tunnel syndrome (or similar compression of nerves elsewhere in the body) and restricted joint movement are also common.

Exemplary Donors

In some embodiments, the donor oligonucleotide with the sequence

5' AGGACGGTCCCGGCCTGCGACACTTCCGCC-CATAATTGTTCTTCA TCTGCGGGGCGGGGGGGGG3' (SEQ ID NO:52), or a functional fragment thereof that is suitable and sufficient to correct the W402X mutation (which is a common mutation for mucopolysaccharidosis type I associated with a severe Hurler syndrome) is administered with a potentiating agent, such as a cell-penetrating antibody, to correct the W402X mutation in cells.

An exemplary donor oligonucleotide can have the sequence

5' GGGACGGCGCCCACATAGGCCAAATTCAAT-TGCTGATCCAGCT TAA-GACGTACTGGTCAGCCTGGC 3' (SEQ ID NO:53), or a functional fragment thereof that is suitable to correct the Q70X mutation in the alpha-L-iduronidase gene associated with Hurler's syndrome is administered with a potentiating agent, such as a cell-penetrating antibody, to correct the of Q70X mutation in cells.

In some embodiments, in addition to containing sequence designed to correct the point mutation at Q70X or W402X mutation, the donor oligonucleotides may also contain 7 to 10 additional, synonymous (silent) mutations. The additional silent mutations can facilitate detection of the corrected target sequence using allele-specific PCR of genomic DNA isolated from treated cells.

D. Combination Therapies

Each of the different components for gene editing here can be administered alone or in any combination and further in combination with one or more additional active agents. In all cases, the combination of agents can be part of the same admixture, or administered as separate compositions. In some embodiments, the separate compositions are administered through the same route of administration. In other embodiments, the separate compositions are administered through different routes of administration.

Examples of preferred additional active agents include other conventional therapies known in the art for treating the desired disease or condition. For example, in the treatment of sickle cell disease, the additional therapy may be hydroxyurea.

In the treatment of cystic fibrosis, the additional therapy may include mucolytics, antibiotics, nutritional agents, etc. Specific drugs are outlined in the Cystic Fibrosis Foundation drug pipeline and include, but are not limited to, CFTR modulators such as KALYDECO® (ivacaftor), ORKAMBI™ (lumacaftor+ivacaftor), ataluren (PTC124), VX-661+invacaftor, riociguat, QBW251, N91115, and QR-010; agents that improve airway surface liquid such as hypertonic saline, bronchitol, and P-1037; mucus alteration agents such as PULMOZYME® (dornase alfa); anti-inflammatories such as ibuprofen, alpha 1 anti-trypsin, CTX-4430, and JBT-101; anti-infective such as inhaled tobramycin, azithromycin, CAYSTON® (aztreonam for inhalation solution), TOBI inhaled powder, levofloxacin, ARIKACE® (nebulized liposomal amikacin), AEROVANC® (vancomycin hydrochloride inhalation powder), and gallium; and nutritional supplements such as aquADEKs, pancrelipase enzyme products, liprotamase, and burlulipase.

In the treatment of HIV, the additional therapy maybe an antiretroviral agents including, but not limited to, a non-nucleoside reverse transcriptase inhibitor (NNRTIs), a nucleoside reverse transcriptase inhibitor (NRTIs), a protease inhibitors (PIs), a fusion inhibitors, a CCR5 antagonists (CCR5s) (also called entry inhibitors), an integrase strand transfer inhibitors (INSTIs), or a combination thereof.

In the treatment of lysosomal storage disease, the additional therapy could include, for example, enzyme replacement therapy, bone marrow transplantation, or a combination thereof.

E. Determining Gene Modification

Sequencing and allele-specific PCR are preferred methods for determining if gene modification has occurred. PCR primers are designed to distinguish between the original allele, and the new predicted sequence following recombination. Other methods of determining if a recombination event has occurred are known in the art and may be selected based on the type of modification made. Methods include, but are not limited to, analysis of genomic DNA, for example by sequencing, allele-specific PCR, droplet digital PCR, or restriction endonuclease selective PCR (REMS-PCR); analysis of mRNA transcribed from the target gene for example by Northern blot, in situ hybridization, real-time or quantitative reverse transcriptase (RT) PCT; and analysis of the polypeptide encoded by the target gene, for example, by immunostaining, ELISA, or FACS. In some cases, modified cells will be compared to parental controls. Other methods may include testing for changes in the function of the RNA transcribed by, or the polypeptide encoded by the target gene. For example, if the target gene encodes an enzyme, an assay designed to test enzyme function may be used.

The present invention will be further understood by reference to the following non-limiting examples.

EXAMPLES

Example 1: 3E10 Enhances Gene Editing by NPs Containing Only Donor DNA

Materials and Methods

Donor DNA and Nanoparticle Synthesis

The single-stranded donor DNA oligomer was prepared by standard DNA synthesis and 5' and 3'-end protected by inclusion of three phosphorothioate internucleoside linkages at each end. The sequence of the donor DNA matches positions 624 to 684 in β-globin intron 2 and is as follows, with the correcting IVS2-654 nucleotide underlined:

(SEQ ID NO: 43)
5'AAAGAATAACAGTGATAATTTCTGGGTTAAGG<u>C</u>AATAGCAATATCTCT

GCATATAAATAT3'.

Nanoparticles containing donor DNAs or donor DNAs and PNAs were synthesized by a double-emulsion solvent evaporation protocol as previously described (Bahal, et al., Nat. Commun., 7:13304 (2016)). Briefly, poly(lactic-co-glycolic) acid (PLGA) was dissolved in dichloromethane at a concentration of 40 mg/ml. Prior to encapsulation, PNA and donor DNA were mixed at a 2:1 molar ratio and added dropwise to the PLGA solution under vortex. For NPs containing donor DNA alone, DNA was added dropwise at a molar ratio of 2 nmoles/mg of polymer. The resulting mixture was sonicated three times for 10 seconds using an amplitude of 38%. The water-in-oil emulsion was subsequently added dropwise to a surfactant solution containing polyvinyl alcohol (5% w/v). Following the second emulsion, the sonication step was repeated as described. The resulting nanoparticle solution was added to 25 ml of a 0.3% PVA solution and allowed to stir for 3 hours at room temperature. After stirring and particle 'hardening,' the nanoparticles were washed 3 times via centrifugation (16,100 g, 15 min, 4° C.) before being flash frozen and lyophilized in cryoprotectant (trehalose, mg:mg). Dry nanoparticles were stored at −20° C. until later use.

Cell Isolation, Culture and Treatment

Mouse embryonic fibroblasts (MEFs) were isolated from a transgenic mouse model carrying a β-globin/GFP fusion transgene consisting of human β-globin intron 2 with a thalassemia-associated IVS2-654 (C→T) mutation inserted within the GFP coding sequence (Sazani, et al., Nat. Biotechnol., 20:1228-1233 (2002); Bahal, et al., Nat. Commun., 7:13304 (2016)). This results in incorrect splicing of β-globin/GFP mRNA and lack of GFP expression.

By simple addition to the cell culture, MEFs were treated with 2 mg of nanoparticles containing donor DNA alone or PNA in combination with donor DNA, at a seeding density of 5,000 cells/well in DMEM media, containing 10% FBS.

In some samples, prior to treatment with donor DNA containing nanoparticles, MEFs were treated with 3E10 WT (containing wild type 3E10 heavy and light chain sequences) at a final concentration of 7.5 µM. 3E10 WT was prepared as a full-length recombinant antibody by expression from a recombinant expression construct in 293 cells based on the publicly available sequence and purified by standard techniques. The cells were analyzed for gene editing 72 h later by fluorescence via flow cytometry.

Results

As shown in FIG. 1, treatment with donor DNA NPs alone resulted in some detectable editing slightly above background (untreated control). The addition of 3E10 significantly increased this editing (FIG. 1). Treatment with donor DNA NPs+3E10 achieved higher percentage editing compared to cells treated with NPs containing donor DNA/PNAs (an approach that has previously been established for gene editing (Bahal, et al., *Nat. Commun.*, 7:13304 (2016))).

Example 2: 3E11) Enhances Editing of the Beta Globin Gene by Naked Donor DNA k Bone Marrow Cells Ex Vivo Materials and Methods Donor DNA The single-stranded donor DNA oligomer was prepared by standard DNA synthesis and 5' and 3'-end protected by inclusion of three phosphorothioate internucleoside linkages at each end. The donor DNA sequence is a 60-nucleotide single stranded DNA matching the wild type human beta globin sequence centered on codon 6, the position of the sickle cell mutation. The sequence of the donor DNA is as follows:

(SEQ ID NO: 48)
5'TTGCCCCACAGGGCAGTAACGGCAGACTTCTCCTCAGGAGTCAGGTGC
ACCATGGTGTCTGTTTG3'.

Mouse Model for Sickle Cells Disease

In sickle cell disease (SCD), the mutation (GAG→GTG) at codon 6 results in glutamic acid changed to valine. For correction (editing) of this SCD mutation site, studies were performed in the Townes mouse model.

The Townes mouse model was developed by Ryan T M, Ciavatta D J, Townes T M., "Knockout-transgenic mouse model of sickle cell disease." *Science*. 1997 Oct. 31; 278 (5339):873-6. PMID: 9346487.

Townes mice exclusively express human sickle hemoglobin (HbS). They were produced by generating transgenic mice expressing human α-, γ-, and β$^s$-globin that were then bred with knockout mice that had deletions of the murine α- and β-globin genes. Thus, the resulting progeny no longer express mouse α- and β-globin. Instead, they express exclusively human α- and β$^s$-globin. Hence, the mice express human sickle hemoglobin and possess many of the major hematologic and histopathologic features of individuals with SCD.

Cell Isolation, Culture and Treatment

To further evaluate the effects of 3E10 on donor DNA directed gene editing, a transgenic mouse model of sickle cell disease, designed with human hemoglobin alpha (hα) and human sickle hemoglobin beta (β$^s$), as described above, was used (Townes model, Jackson Laboratory). Bone marrow cells were harvested from these mice and cultured in 12-well plates at a density of 200,000 cells per well in RPMI with 20% FBS and 1% pen-strep.

Prior to treatment, 3E10 D31N (containing 3E10 D31N heavy chain and wild type light chain sequences) was co-incubated with naked donor DNA for 5 minutes (to allow non-covalent antibody-DNA complexes to form) in sodium acetate buffer at room temperature. Bone marrow cells were then treated with the antibody-DNA mixture at a final concentration of 7.5 µM 3E10 and 0.5 µg/µl of donor DNA.

After 72 hours, the cells were washed 3 times prior to genomic DNA (gDNA) isolation (SV Wizard, Promega). Freshly isolated gDNA was analyzed by droplet digital PCR (ddPCR) for quantitative determination of gene editing frequencies.

Results

Experiments were designed to determine if 3E10's ability to bind to DNA and to penetrate cells could obviate the need for nanoparticle delivery (Weisbart et al., Sci. Rep., 5:12022 (2015)). Therefore, rather than encapsulate donor DNA into nanoparticles (as described in Example 1), the ability of 3E10 in combination with naked donor DNA to mediate gene editing in bone marrow cells from a transgenic model of sickle cell disease was evaluated.

Figure 2:
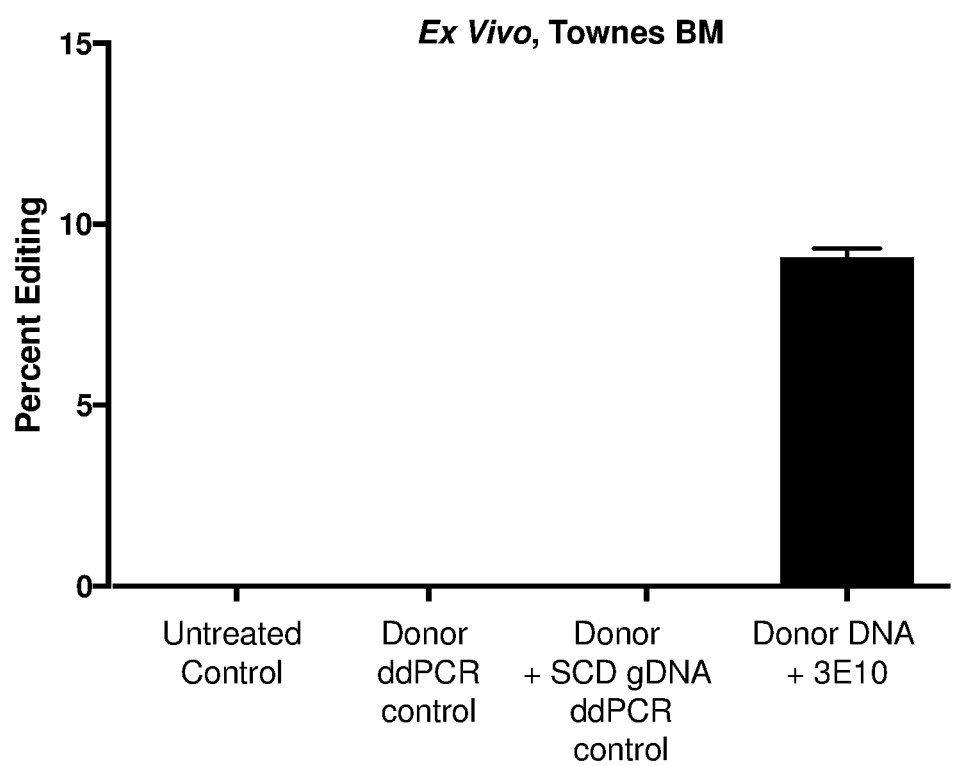
FIG. 2 is a bar graph showing the percentage of gene editing in the beta globin gene following ex vivo treatment of bone marrow cells from Townes mice with eMab (3E10) and donor DNA. Gene editing frequencies were determined by droplet digital PCR (ddPCR) analysis of genomic DNA.

As shown in FIG. 2, substantial gene editing frequencies in the range of 8% were observed when cells were treated with pre-incubated mixture of 3E10 and donor DNA. To ensure that editing was not an artifact, ddPCR controls consisting of donor alone and donor spiked into genomic DNA from untreated cells were included as samples. No background signal was detected in the controls, ruling out artefacts (FIG. 2).

Example 3: 3E10 Enhances Editing of the Beta Globin Gene by Naked Donor DNA in MEFs Materials and Methods Mouse embryonic fibroblasts (MEFs) were isolated from Townes mouse embryos (the same sickle cell transgenic mouse model used in Example 2). MEFs were subsequently seeded in a 12-well plate at a seeding density of 200,000 cells per well in DMEM media containing 20% FBS and 1% pen-strep.

Prior to treatment, 3E10 D31N (containing 3E10 D31N heavy chain and wild type light chain sequences) and donor DNA were incubated for 5 minutes. MEFs were subsequently treated at a final concentration of 7.5 µM 3E10 and 0.5 µg/µl of donor DNA.

After 72 hours, the cells were washed 3 times prior to gDNA isolation (SV Wizard, Promega). Freshly isolated genomic DNA was analyzed by digital droplet PCR (ddPCR) for editing frequencies.

Results

Figure 3:
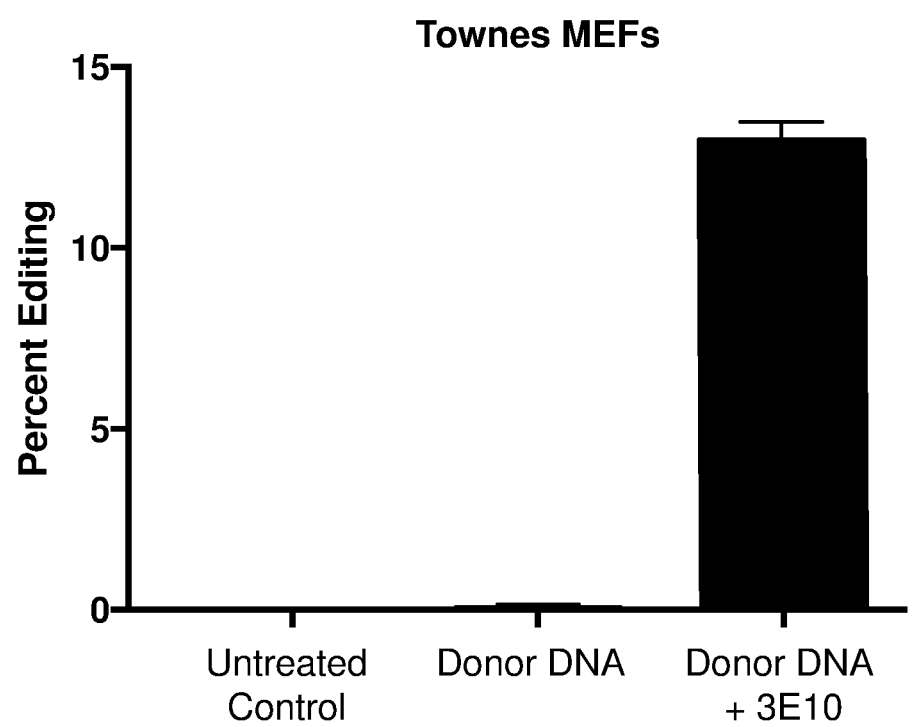
FIG. 3 is a bar graph showing the percentage of gene editing in the beta globin gene following in vitro treatment of MEFs from Townes mice with eMab (3E10) and donor DNA. Gene editing frequencies were determined by droplet digital PCR (ddPCR) analysis of genomic DNA. Editing in MEFs treated with 3E10/donor DNA was significantly higher than MEFs treated with donor DNA alone.

To extend the findings with 3E10 plus donor DNA in treated bone marrow cells (described above in Example 2) to another cell type, the efficiency of gene editing in MEFs by 3E10 in combination with naked donor DNA was evaluated. Compared to the very low levels of gene editing observed in MEFs treated with donor DNA alone, the combination of 3E10 and donor DNA achieved high levels of gene editing in the range of 13% (FIG. 3).

Example 4: 3E10 and Donor DNA Alone Achieves In Vivo Editing in Townes Mice

Materials and Methods

Figure 4:
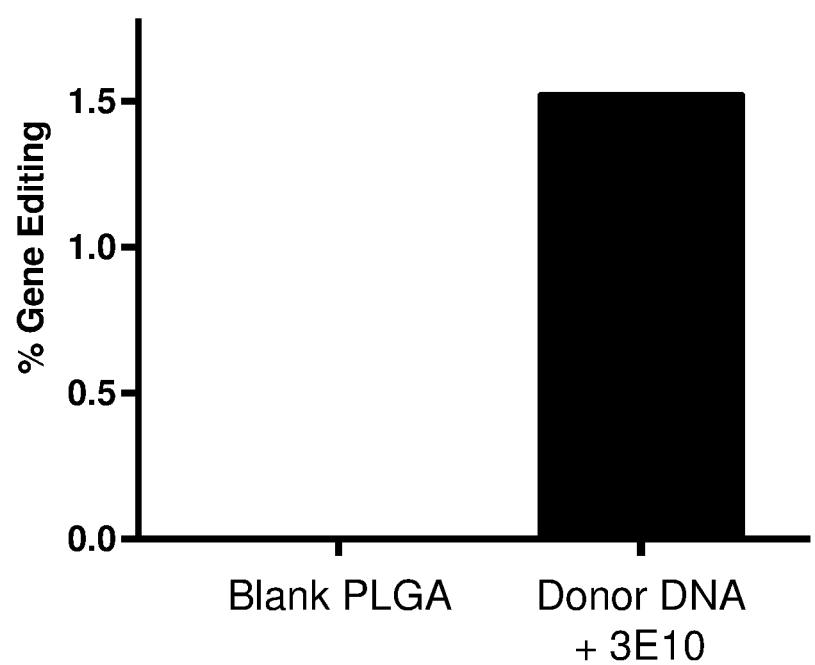
FIG. 4 is a bar graph showing the percentage of gene editing in the beta globin gene following in vivo treatment of Townes mice with 3E10 and donor DNA delivered by intraperitoneal injection. Gene editing was assessed in bone marrow cells 2 months post injection. As compared to blank PLGA nanoparticles, mice treated with 3E10/donor DNA demonstrated significantly higher levels of gene editing.

To test whether 3E10 could promote donor DNA directed gene editing in vivo in a living animal, the Townes model (the same sickle cell transgenic mouse model used in Examples 2 and 3) was used. Prior to treatment of mice, 1 mg of 3E10 D31N (containing 3E10 D31N heavy chain and wild type light chain sequences) was mixed with 330 μg of donor DNA for 5 minutes in sodium acetate buffer at room temperature. Two mice per experimental condition were subsequently injected intraperitoneally (i.p.) with a total of 4 doses of 3E10/donor DNA given at 2 day intervals. Each dose consisted of 1 mg of 3E10 and 330 ug of donor DNA. After 2 months, bone marrow cells were harvested and analyzed via digital droplet PCR (ddPCR) for gene editing in the beta globin gene at the sickle cell mutation Results Compared to control mice treated with blank PLGA nanoparticles, mice treated with 3E10 plus donor DNA demonstrated significantly higher levels of gene editing, with a frequency of 1.5% (FIG. 4).

Unless defined otherwise, all technical and scientific terms used herein have the same meanings as commonly understood by one of skill in the art to which the invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

We claim:

1. A method of modifying the genome of a cell comprising contacting the cell with an effective amount of a composition comprising a non-covalent complex comprising:
   (i) a donor oligonucleotide comprising a sequence that can correct at least one mutation in the cell's genome; and
   (ii) an antibody or an antigen-binding fragment thereof, wherein the antibody or antigen-binding fragment thereof comprises:
      (a) a heavy chain variable region (VH) complementarity determining region (CDR) 1 comprising the amino acid sequence of SEQ ID NO: 16,
      (b) a VH CDR2 comprising the amino acid sequence of SEQ ID NO: 17,
      (c) a VH CDR3 comprising the amino acid sequence of SEQ ID NO: 18,
      (d) a light chain variable region (VL) CDR1 comprising the amino acid sequence of SEQ ID NO: 24,
      (e) a VL CDR2 comprising the amino acid sequence of SEQ ID NO: 25, and
      (f) a VL CDR3 comprising the amino acid sequence of SEQ ID NO: 26;
   and wherein the composition does not comprise a nuclease, a triplex-forming peptide nucleic acid oligomer, or nanoparticles.

2. The method of claim 1, wherein the method is conducted in vivo in a subject.

3. The method of claim 1, wherein the method is conducted ex vivo.

4. The method of claim 1, wherein the cell is a hematopoietic stem cell.

5. The method of claim 1, wherein the donor oligonucleotide comprises single stranded or double stranded DNA.

6. The method of claim 1, wherein the donor oligonucleotide comprises one or more inserted, substituted, or deleted nucleotides relative to a target gene in the cell's genome.

7. A method to treat a disease or disorder comprising administering a therapeutically effective amount of a modified cell obtained according to the method of claim 1 to a subject in need thereof.

8. The method of claim 7, wherein the disease or disorder is selected from the group consisting of hemophilia, muscular dystrophy, globinopathies, cystic fibrosis, xeroderma pigmentosum, lysosomal storage diseases, immune deficiency syndromes, tyrosinemia, Fanconi anemia, spherocytosis, alpha-1-anti-trypsin deficiency, Wilson's disease, Leber's hereditary optic neuropathy, and chronic granulomatous disorder.

9. The method of claim 8, wherein the immune deficiency syndromes is X-linked severe combined immunodeficiency or ADA deficiency.

10. The method of claim 1, wherein the at least one mutation is in a gene encoding coagulation factor VIII, a gene encoding coagulation factor IX, a gene encoding dystrophin, a gene encoding beta-globin, a CFTR gene, an XPC gene, an XPD gene, a gene encoding DNA polymerase eta, a FANCA gene, a FANCB gene, a FANCC gene, a FANCD1 gene, a FANCD2 gene, a FANCE gene, a FANCF gene, a FANCG gene, a FANCI gene, a FANCJ gene, a FANCL gene, a SPTA1 gene or other spectrin genes, an ANK1 gene, a SERPINA1 gene, an ATP7B gene, an IL2RG gene, an ADA gene, an FAH gene, a CYBA gene, a CYBB gene, an NCF1 gene, an NCF2 gene, or an NCF4 gene.

11. The method of claim 1, wherein the cell's genome has a mutation underlying a disease or disorder selected from the group consisting of hemophilia, muscular dystrophy, globinopathies, cystic fibrosis, xeroderma pigmentosum, lysosomal storage diseases, immune deficiency syndromes, tyrosinemia, Fanconi anemia, spherocytosis, alpha-1-anti-trypsin deficiency, Wilson's disease, Leber's hereditary optic neuropathy, and chronic granulomatous disorder.

12. The method of claim 11, wherein the immune deficiency syndromes is X-linked severe combined immunodeficiency or ADA deficiency.

13. The method of claim 1, wherein the antibody or antigen-binding fragment thereof is a monovalent, divalent, or multivalent single chain variable fragment (scFv) or a diabody.

14. The method of claim 1, wherein the donor oligonucleotide is single stranded or double stranded RNA.

15. The method of claim 1, wherein the oligonucleotide sequence corresponds to a portion of the wild-type sequence of the gene.

16. The method of claim 1, wherein the method does not comprise contacting the cell with a PNA.

17. The method of claim 1, wherein the donor oligonucleotide is single stranded DNA.

18. The method of claim 1, wherein the donor oligonucleotide comprises a modification to a nucleobase, a sugar moiety, or a linkage.

19. The method of claim 1, wherein the method is conducted in vitro.

* * * * *

```
                         SEQUENCE LISTING

<160> NUMBER OF SEQ ID NOS: 53

<210> SEQ ID NO 1
<211> LENGTH: 116
<212> TYPE: PRT
<213> ORGANISM: Artificial Sequence
<220> FEATURE:
<223> OTHER INFORMATION: synthetic polypeptide

<400> SEQUENCE: 1

Glu Val Gln Leu Val Glu Ser Gly Gly Gly Leu Val Lys Pro Gly Gly
1               5                   10                  15

Ser Arg Lys Leu Ser Cys Ala Ala Ser Gly Phe Thr Phe Ser Asp Tyr
            20                  25                  30

Gly Met His Trp Val Arg Gln Ala Pro Glu Lys Gly Leu Glu Trp Val
        35                  40                  45

Ala Tyr Ile Ser Ser Gly Ser Ser Thr Ile Tyr Tyr Ala Asp Thr Val
    50                  55                  60

Lys Gly Arg Phe Thr Ile Ser Arg Asp Asn Ala Lys Asn Thr Leu Phe
65                  70                  75                  80

Leu Gln Met Thr Ser Leu Arg Ser Glu Asp Thr Ala Met Tyr Tyr Cys
                85                  90                  95

Ala Arg Arg Gly Leu Leu Leu Asp Tyr Trp Gly Gln Gly Thr Thr Leu
            100                 105                 110

Thr Val Ser Ser
        115

<210> SEQ ID NO 2
<211> LENGTH: 116
<212> TYPE: PRT
<213> ORGANISM: Artificial Sequence
<220> FEATURE:
<223> OTHER INFORMATION: synthetic polypeptide

<400> SEQUENCE: 2

Glu Val Gln Leu Val Glu Ser Gly Gly Gly Leu Val Lys Pro Gly Gly
1               5                   10                  15

Ser Arg Lys Leu Ser Cys Ala Ala Ser Gly Phe Thr Phe Ser Asn Tyr
            20                  25                  30

Gly Met His Trp Val Arg Gln Ala Pro Glu Lys Gly Leu Glu Trp Val
        35                  40                  45

Ala Tyr Ile Ser Ser Gly Ser Ser Thr Ile Tyr Tyr Ala Asp Thr Val
    50                  55                  60

Lys Gly Arg Phe Thr Ile Ser Arg Asp Asn Ala Lys Asn Thr Leu Phe
```

```
                65                  70                  75                  80
Leu Gln Met Thr Ser Leu Arg Ser Glu Asp Thr Ala Met Tyr Tyr Cys
                    85                  90                  95

Ala Arg Arg Gly Leu Leu Leu Asp Tyr Trp Gly Gln Gly Thr Thr Leu
                100                 105                 110

Thr Val Ser Ser
        115

<210> SEQ ID NO 3
<211> LENGTH: 116
<212> TYPE: PRT
<213> ORGANISM: Artificial Sequence
<220> FEATURE:
<223> OTHER INFORMATION: synthetic polypeptide

<400> SEQUENCE: 3

Glu Val Gln Leu Val Gln Ser Gly Gly Gly Leu Ile Gln Pro Gly Gly
1               5                   10                  15

Ser Leu Arg Leu Ser Cys Ala Ala Ser Gly Phe Thr Phe Ser Asn Tyr
                20                  25                  30

Gly Met His Trp Val Arg Gln Ala Pro Gly Lys Gly Leu Glu Trp Val
            35                  40                  45

Ser Tyr Ile Ser Ser Gly Ser Ser Thr Ile Tyr Tyr Ala Asp Ser Val
        50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                    85                  90                  95

Ala Arg Arg Gly Leu Leu Leu Asp Tyr Trp Gly Gln Gly Thr Thr Val
                100                 105                 110

Thr Val Ser Ser
        115

<210> SEQ ID NO 4
<211> LENGTH: 116
<212> TYPE: PRT
<213> ORGANISM: Artificial Sequence
<220> FEATURE:
<223> OTHER INFORMATION: synthetic polypeptide

<400> SEQUENCE: 4

Glu Val Gln Leu Val Glu Ser Gly Gly Gly Leu Ile Gln Pro Gly Gly
1               5                   10                  15

Ser Leu Arg Leu Ser Cys Ala Ala Ser Gly Phe Thr Phe Ser Asn Tyr
                20                  25                  30

Gly Met His Trp Val Arg Gln Ala Pro Gly Lys Gly Leu Glu Trp Val
            35                  40                  45

Ser Tyr Ile Ser Ser Gly Ser Ser Thr Ile Tyr Tyr Ala Asp Ser Val
        50                  55                  60

Lys Gly Arg Phe Thr Ile Ser Arg Asp Asn Ser Lys Asn Thr Leu Tyr
65                  70                  75                  80

Leu Gln Met Thr Ser Leu Arg Ala Glu Asp Thr Ala Val Tyr Tyr Cys
                    85                  90                  95

Ala Arg Arg Gly Leu Leu Leu Asp Tyr Trp Gly Gln Gly Thr Thr Leu
                100                 105                 110

Thr Val Ser Ser
        115
```

<210> SEQ ID NO 5
<211> LENGTH: 116
<212> TYPE: PRT
<213> ORGANISM: Artificial Sequence
<220> FEATURE:
<223> OTHER INFORMATION: synthetic polypeptide

<400> SEQUENCE: 5

```
Glu Val Gln Leu Gln Glu Ser Gly Gly Gly Val Val Gln Pro Gly Gly
1               5                   10                  15
Ser Leu Arg Leu Ser Cys Ala Ala Ser Gly Phe Thr Phe Ser Asn Tyr
            20                  25                  30
Gly Met His Trp Ile Arg Gln Ala Pro Gly Lys Gly Leu Glu Trp Val
        35                  40                  45
Ser Tyr Ile Ser Ser Gly Ser Ser Thr Ile Tyr Tyr Ala Asp Ser Val
    50                  55                  60
Lys Gly Arg Phe Thr Ile Ser Arg Asp Asn Ser Lys Asn Thr Leu Tyr
65                  70                  75                  80
Leu Gln Met Asn Ser Leu Arg Ser Glu Asp Thr Ala Val Tyr Tyr Cys
                85                  90                  95
Ala Arg Arg Gly Leu Leu Leu Asp Tyr Trp Gly Gln Gly Thr Leu Val
            100                 105                 110
Thr Val Ser Ser
        115
```

<210> SEQ ID NO 6
<211> LENGTH: 116
<212> TYPE: PRT
<213> ORGANISM: Artificial Sequence
<220> FEATURE:
<223> OTHER INFORMATION: synthetic polypeptide

<400> SEQUENCE: 6

```
Glu Val Gln Leu Val Glu Ser Gly Gly Gly Leu Val Gln Pro Gly Gly
1               5                   10                  15
Ser Leu Arg Leu Ser Cys Ser Ala Ser Gly Phe Thr Phe Ser Asn Tyr
            20                  25                  30
Gly Met His Trp Val Arg Gln Ala Pro Gly Lys Gly Leu Glu Tyr Val
        35                  40                  45
Ser Tyr Ile Ser Ser Gly Ser Ser Thr Ile Tyr Tyr Ala Asp Thr Val
    50                  55                  60
Lys Gly Arg Phe Thr Ile Ser Arg Asp Asn Ser Lys Asn Thr Leu Tyr
65                  70                  75                  80
Leu Gln Met Ser Ser Leu Arg Ala Glu Asp Thr Ala Val Tyr Tyr Cys
                85                  90                  95
Val Lys Arg Gly Leu Leu Leu Asp Tyr Trp Gly Gln Gly Thr Leu Val
            100                 105                 110
Thr Val Ser Ser
        115
```

<210> SEQ ID NO 7
<211> LENGTH: 111
<212> TYPE: PRT
<213> ORGANISM: Artificial Sequence
<220> FEATURE:
<223> OTHER INFORMATION: synthetic polypeptide

<400> SEQUENCE: 7

```
Asp Ile Val Leu Thr Gln Ser Pro Ala Ser Leu Ala Val Ser Leu Gly
```

```
 1               5                  10                  15
Gln Arg Ala Thr Ile Ser Cys Arg Ala Ser Lys Ser Val Ser Thr Ser
                20                  25                  30

Ser Tyr Ser Tyr Met His Trp Tyr Gln Gln Lys Pro Gly Gln Pro Pro
            35                  40                  45

Lys Leu Leu Ile Lys Tyr Ala Ser Tyr Leu Glu Ser Gly Val Pro Ala
        50                  55                  60

Arg Phe Ser Gly Ser Gly Ser Gly Thr Asp Phe Thr Leu Asn Ile His
65                  70                  75                  80

Pro Val Glu Glu Glu Asp Ala Ala Thr Tyr Tyr Cys Gln His Ser Arg
                85                  90                  95

Glu Phe Pro Trp Thr Phe Gly Gly Gly Thr Lys Leu Glu Ile Lys
            100                 105                 110

<210> SEQ ID NO 8
<211> LENGTH: 111
<212> TYPE: PRT
<213> ORGANISM: Artificial Sequence
<220> FEATURE:
<223> OTHER INFORMATION: synthetic polypeptide

<400> SEQUENCE: 8

Asp Ile Val Leu Thr Gln Ser Pro Ala Ser Leu Ala Val Ser Leu Gly
1               5                   10                  15

Gln Arg Ala Thr Ile Ser Cys Arg Ala Ser Lys Ser Val Ser Thr Ser
                20                  25                  30

Ser Tyr Ser Tyr Met His Trp Tyr Gln Gln Lys Pro Gly Gln Pro Pro
            35                  40                  45

Lys Leu Leu Ile Lys Tyr Ala Ser Tyr Leu Glu Ser Gly Val Pro Ala
        50                  55                  60

Arg Phe Ser Gly Ser Gly Ser Gly Thr Asp Phe His Leu Asn Ile His
65                  70                  75                  80

Pro Val Glu Glu Glu Asp Ala Ala Thr Tyr Tyr Cys Gln His Ser Arg
                85                  90                  95

Glu Phe Pro Trp Thr Phe Gly Gly Gly Thr Lys Leu Glu Leu Lys
            100                 105                 110

<210> SEQ ID NO 9
<211> LENGTH: 111
<212> TYPE: PRT
<213> ORGANISM: Artificial Sequence
<220> FEATURE:
<223> OTHER INFORMATION: synthetic polypeptide

<400> SEQUENCE: 9

Asp Ile Gln Met Thr Gln Ser Pro Ser Ser Leu Ser Ala Ser Val Gly
1               5                   10                  15

Asp Arg Val Thr Ile Thr Cys Arg Ala Ser Lys Ser Val Ser Thr Ser
                20                  25                  30

Ser Tyr Ser Tyr Leu Ala Trp Tyr Gln Gln Lys Pro Glu Lys Ala Pro
            35                  40                  45

Lys Leu Leu Ile Lys Tyr Ala Ser Tyr Leu Gln Ser Gly Val Pro Ser
        50                  55                  60

Arg Phe Ser Gly Ser Gly Ser Gly Thr Asp Phe Thr Leu Thr Ile Ser
65                  70                  75                  80

Ser Leu Gln Pro Glu Asp Phe Ala Thr Tyr Tyr Cys Gln His Ser Arg
                85                  90                  95
```

```
Glu Phe Pro Trp Thr Phe Gly Ala Gly Thr Lys Leu Glu Leu Lys
            100                 105                 110
```

<210> SEQ ID NO 10
<211> LENGTH: 111
<212> TYPE: PRT
<213> ORGANISM: Artificial Sequence
<220> FEATURE:
<223> OTHER INFORMATION: synthetic polypeptide

<400> SEQUENCE: 10

```
Asp Ile Gln Met Thr Gln Ser Pro Ser Ser Leu Ser Ala Ser Val Gly
1               5                   10                  15

Asp Arg Val Thr Ile Ser Cys Arg Ala Ser Lys Ser Val Ser Thr Ser
            20                  25                  30

Ser Tyr Ser Tyr Met His Trp Tyr Gln Gln Lys Pro Glu Lys Ala Pro
        35                  40                  45

Lys Leu Leu Ile Lys Tyr Ala Ser Tyr Leu Gln Ser Gly Val Pro Ser
    50                  55                  60

Arg Phe Ser Gly Ser Gly Ser Gly Thr Asp Phe Thr Leu Thr Ile Ser
65                  70                  75                  80

Ser Leu Gln Pro Glu Asp Val Ala Thr Tyr Tyr Cys Gln His Ser Arg
                85                  90                  95

Glu Phe Pro Trp Thr Phe Gly Ala Gly Thr Lys Leu Glu Leu Lys
            100                 105                 110
```

<210> SEQ ID NO 11
<211> LENGTH: 111
<212> TYPE: PRT
<213> ORGANISM: Artificial Sequence
<220> FEATURE:
<223> OTHER INFORMATION: synthetic polypeptide

<400> SEQUENCE: 11

```
Asp Ile Val Leu Thr Gln Ser Pro Ala Ser Leu Ala Val Ser Pro Gly
1               5                   10                  15

Gln Arg Ala Thr Ile Thr Cys Arg Ala Ser Lys Ser Val Ser Thr Ser
            20                  25                  30

Ser Tyr Ser Tyr Met His Trp Tyr Gln Gln Lys Pro Gly Gln Pro Pro
        35                  40                  45

Lys Leu Leu Ile Tyr Tyr Ala Ser Tyr Leu Glu Ser Gly Val Pro Ala
    50                  55                  60

Arg Phe Ser Gly Ser Gly Ser Gly Thr Asp Phe Thr Leu Thr Ile Asn
65                  70                  75                  80

Pro Val Glu Ala Asn Asp Thr Ala Asn Tyr Tyr Cys Gln His Ser Arg
                85                  90                  95

Glu Phe Pro Trp Thr Phe Gly Gln Gly Thr Lys Val Glu Ile Lys
            100                 105                 110
```

<210> SEQ ID NO 12
<211> LENGTH: 465
<212> TYPE: PRT
<213> ORGANISM: Artificial Sequence
<220> FEATURE:
<223> OTHER INFORMATION: synthetic polypeptide

<400> SEQUENCE: 12

```
Met Gly Trp Ser Cys Ile Ile Leu Phe Leu Val Ala Thr Ala Thr Gly
1               5                   10                  15

Val His Ser Glu Val Gln Leu Val Glu Ser Gly Gly Gly Leu Val Lys
```

-continued

```
                20                  25                  30
Pro Gly Gly Ser Arg Lys Leu Ser Cys Ala Ala Ser Gly Phe Thr Phe
            35                  40                  45
Ser Asp Tyr Gly Met His Trp Val Arg Gln Ala Pro Glu Lys Gly Leu
 50                  55                  60
Glu Trp Val Ala Tyr Ile Ser Ser Gly Ser Ser Thr Ile Tyr Tyr Ala
 65                  70                  75                  80
Asp Thr Val Lys Gly Arg Phe Thr Ile Ser Arg Asp Asn Ala Lys Asn
                85                  90                  95
Thr Leu Phe Leu Gln Met Thr Ser Leu Arg Ser Glu Asp Thr Ala Met
            100                 105                 110
Tyr Tyr Cys Ala Arg Arg Gly Leu Leu Leu Asp Tyr Trp Gly Gln Gly
            115                 120                 125
Thr Thr Leu Thr Val Ser Ala Ala Ser Thr Lys Gly Pro Ser Val Phe
            130                 135                 140
Pro Leu Ala Pro Ser Ser Lys Ser Thr Ser Gly Gly Thr Ala Ala Leu
145                 150                 155                 160
Gly Cys Leu Val Lys Asp Tyr Phe Pro Glu Pro Val Thr Val Ser Trp
                165                 170                 175
Asn Ser Gly Ala Leu Thr Ser Gly Val His Thr Phe Pro Ala Val Leu
            180                 185                 190
Gln Ser Ser Gly Leu Tyr Ser Leu Ser Ser Val Val Thr Val Pro Ser
            195                 200                 205
Ser Ser Leu Gly Thr Gln Thr Tyr Ile Cys Asn Val Asn His Lys Pro
            210                 215                 220
Ser Asn Thr Lys Val Asp Lys Lys Val Glu Pro Lys Ser Cys Asp Lys
225                 230                 235                 240
Thr His Thr Cys Pro Pro Cys Pro Ala Pro Glu Leu Leu Gly Gly Pro
                245                 250                 255
Ser Val Phe Leu Phe Pro Pro Lys Pro Lys Asp Thr Leu Met Ile Ser
            260                 265                 270
Arg Thr Pro Glu Val Thr Cys Val Val Val Asp Val Ser His Glu Asp
            275                 280                 285
Pro Glu Val Lys Phe Asn Trp Tyr Val Asp Gly Val Glu Val His Asn
        290                 295                 300
Ala Lys Thr Lys Pro Arg Glu Glu Gln Tyr Asn Ser Thr Tyr Arg Val
305                 310                 315                 320
Val Ser Val Leu Thr Val Leu His Gln Asp Trp Leu Asn Gly Lys Glu
                325                 330                 335
Tyr Lys Cys Lys Val Ser Asn Lys Ala Leu Pro Ala Pro Ile Glu Lys
            340                 345                 350
Thr Ile Ser Lys Ala Lys Gly Gln Pro Arg Glu Pro Gln Val Tyr Thr
            355                 360                 365
Leu Pro Pro Ser Arg Asp Glu Leu Thr Lys Asn Gln Val Ser Leu Thr
        370                 375                 380
Cys Leu Val Lys Gly Phe Tyr Pro Ser Asp Ile Ala Val Glu Trp Glu
385                 390                 395                 400
Ser Asn Gly Gln Pro Glu Asn Asn Tyr Lys Thr Thr Pro Pro Val Leu
                405                 410                 415
Asp Ser Asp Gly Ser Phe Phe Leu Tyr Ser Lys Leu Thr Val Asp Lys
            420                 425                 430
Ser Arg Trp Gln Gln Gly Asn Val Phe Ser Cys Ser Val Met His Glu
            435                 440                 445
```

```
Ala Leu His Asn His Tyr Thr Gln Lys Ser Leu Ser Leu Ser Pro Gly
    450                 455                 460

Lys
465

<210> SEQ ID NO 13
<211> LENGTH: 465
<212> TYPE: PRT
<213> ORGANISM: Artificial Sequence
<220> FEATURE:
<223> OTHER INFORMATION: synthetic polypeptide

<400> SEQUENCE: 13

Met Gly Trp Ser Cys Ile Ile Leu Phe Leu Val Ala Thr Ala Thr Gly
1               5                   10                  15

Val His Ser Glu Val Gln Leu Val Glu Ser Gly Gly Gly Leu Val Lys
            20                  25                  30

Pro Gly Gly Ser Arg Lys Leu Ser Cys Ala Ala Ser Gly Phe Thr Phe
        35                  40                  45

Ser Asn Tyr Gly Met His Trp Val Arg Gln Ala Pro Glu Lys Gly Leu
    50                  55                  60

Glu Trp Val Ala Tyr Ile Ser Ser Gly Ser Ser Thr Ile Tyr Tyr Ala
65                  70                  75                  80

Asp Thr Val Lys Gly Arg Phe Thr Ile Ser Arg Asp Asn Ala Lys Asn
                85                  90                  95

Thr Leu Phe Leu Gln Met Thr Ser Leu Arg Ser Glu Asp Thr Ala Met
            100                 105                 110

Tyr Tyr Cys Ala Arg Arg Gly Leu Leu Leu Asp Tyr Trp Gly Gln Gly
        115                 120                 125

Thr Thr Leu Thr Val Ser Ala Ala Ser Thr Lys Gly Pro Ser Val Phe
    130                 135                 140

Pro Leu Ala Pro Ser Ser Lys Ser Thr Ser Gly Gly Thr Ala Ala Leu
145                 150                 155                 160

Gly Cys Leu Val Lys Asp Tyr Phe Pro Glu Pro Val Thr Val Ser Trp
                165                 170                 175

Asn Ser Gly Ala Leu Thr Ser Gly Val His Thr Phe Pro Ala Val Leu
            180                 185                 190

Gln Ser Ser Gly Leu Tyr Ser Leu Ser Ser Val Val Thr Val Pro Ser
        195                 200                 205

Ser Ser Leu Gly Thr Gln Thr Tyr Ile Cys Asn Val Asn His Lys Pro
    210                 215                 220

Ser Asn Thr Lys Val Asp Lys Lys Val Glu Pro Lys Ser Cys Asp Lys
225                 230                 235                 240

Thr His Thr Cys Pro Pro Cys Pro Ala Pro Glu Leu Leu Gly Gly Pro
                245                 250                 255

Ser Val Phe Leu Phe Pro Pro Lys Pro Lys Asp Thr Leu Met Ile Ser
            260                 265                 270

Arg Thr Pro Glu Val Thr Cys Val Val Val Asp Val Ser His Glu Asp
        275                 280                 285

Pro Glu Val Lys Phe Asn Trp Tyr Val Asp Gly Val Glu Val His Asn
    290                 295                 300

Ala Lys Thr Lys Pro Arg Glu Glu Gln Tyr Asn Ser Thr Tyr Arg Val
305                 310                 315                 320

Val Ser Val Leu Thr Val Leu His Gln Asp Trp Leu Asn Gly Lys Glu
                325                 330                 335
```

```
Tyr Lys Cys Lys Val Ser Asn Lys Ala Leu Pro Ala Pro Ile Glu Lys
                340                 345                 350

Thr Ile Ser Lys Ala Lys Gly Gln Pro Arg Glu Pro Gln Val Tyr Thr
            355                 360                 365

Leu Pro Pro Ser Arg Asp Glu Leu Thr Lys Asn Gln Val Ser Leu Thr
        370                 375                 380

Cys Leu Val Lys Gly Phe Tyr Pro Ser Asp Ile Ala Val Glu Trp Glu
385                 390                 395                 400

Ser Asn Gly Gln Pro Glu Asn Asn Tyr Lys Thr Thr Pro Pro Val Leu
                405                 410                 415

Asp Ser Asp Gly Ser Phe Phe Leu Tyr Ser Lys Leu Thr Val Asp Lys
            420                 425                 430

Ser Arg Trp Gln Gln Gly Asn Val Phe Ser Cys Ser Val Met His Glu
        435                 440                 445

Ala Leu His Asn His Tyr Thr Gln Lys Ser Leu Ser Leu Ser Pro Gly
    450                 455                 460

Lys
465

<210> SEQ ID NO 14
<211> LENGTH: 237
<212> TYPE: PRT
<213> ORGANISM: Artificial Sequence
<220> FEATURE:
<223> OTHER INFORMATION: synthetic polypeptide

<400> SEQUENCE: 14

Met Gly Trp Ser Cys Ile Ile Leu Phe Leu Val Ala Thr Ala Thr Gly
1               5                   10                  15

Val His Ser Asp Ile Val Leu Thr Gln Ser Pro Ala Ser Leu Ala Val
            20                  25                  30

Ser Leu Gly Gln Arg Ala Thr Ile Ser Cys Arg Ala Ser Lys Ser Val
        35                  40                  45

Ser Thr Ser Ser Tyr Ser Tyr Met His Trp Tyr Gln Gln Lys Pro Gly
    50                  55                  60

Gln Pro Pro Lys Leu Leu Ile Lys Tyr Ala Ser Tyr Leu Glu Ser Gly
65                  70                  75                  80

Val Pro Ala Arg Phe Ser Gly Ser Gly Ser Gly Thr Asp Phe Thr Leu
                85                  90                  95

Asn Ile His Pro Val Glu Glu Glu Asp Ala Ala Thr Tyr Tyr Cys Gln
            100                 105                 110

His Ser Arg Glu Phe Pro Trp Thr Phe Gly Gly Gly Thr Lys Leu Glu
        115                 120                 125

Ile Lys Arg Thr Val Ala Ala Pro Ser Val Phe Ile Phe Pro Pro Ser
    130                 135                 140

Asp Glu Gln Leu Lys Ser Gly Thr Ala Ser Val Val Cys Leu Leu Asn
145                 150                 155                 160

Asn Phe Tyr Pro Arg Glu Ala Lys Val Gln Trp Lys Val Asp Asn Ala
                165                 170                 175

Leu Gln Ser Gly Asn Ser Gln Glu Ser Val Thr Glu Gln Asp Ser Lys
            180                 185                 190

Asp Ser Thr Tyr Ser Leu Ser Ser Thr Leu Thr Leu Ser Lys Ala Asp
        195                 200                 205

Tyr Glu Lys His Lys Val Tyr Ala Cys Glu Val Thr His Gln Gly Leu
    210                 215                 220
```

Ser Ser Pro Val Thr Lys Ser Phe Asn Arg Gly Glu Cys
225                 230                 235

<210> SEQ ID NO 15
<211> LENGTH: 5
<212> TYPE: PRT
<213> ORGANISM: Artificial Sequence
<220> FEATURE:
<223> OTHER INFORMATION: synthetic polypeptide

<400> SEQUENCE: 15

Asp Tyr Gly Met His
1               5

<210> SEQ ID NO 16
<211> LENGTH: 5
<212> TYPE: PRT
<213> ORGANISM: Artificial Sequence
<220> FEATURE:
<223> OTHER INFORMATION: synthetic polypeptide

<400> SEQUENCE: 16

Asn Tyr Gly Met His
1               5

<210> SEQ ID NO 17
<211> LENGTH: 17
<212> TYPE: PRT
<213> ORGANISM: Artificial Sequence
<220> FEATURE:
<223> OTHER INFORMATION: synthetic polypeptide

<400> SEQUENCE: 17

Tyr Ile Ser Ser Gly Ser Ser Thr Ile Tyr Tyr Ala Asp Thr Val Lys
1               5                   10                  15

Gly

<210> SEQ ID NO 18
<211> LENGTH: 7
<212> TYPE: PRT
<213> ORGANISM: Artificial Sequence
<220> FEATURE:
<223> OTHER INFORMATION: synthetic polypeptide

<400> SEQUENCE: 18

Arg Gly Leu Leu Leu Asp Tyr
1               5

<210> SEQ ID NO 19
<211> LENGTH: 17
<212> TYPE: PRT
<213> ORGANISM: Artificial Sequence
<220> FEATURE:
<223> OTHER INFORMATION: synthetic polypeptide

<400> SEQUENCE: 19

Tyr Ile Ser Ser Gly Ser Ser Thr Ile Tyr Tyr Ala Asp Ser Val Lys
1               5                   10                  15

Gly

<210> SEQ ID NO 20
<211> LENGTH: 8
<212> TYPE: PRT
<213> ORGANISM: Artificial Sequence
<220> FEATURE:

```
<223> OTHER INFORMATION: synthetic polypeptide

<400> SEQUENCE: 20

Gly Phe Thr Phe Ser Asp Tyr Gly
1               5

<210> SEQ ID NO 21
<211> LENGTH: 8
<212> TYPE: PRT
<213> ORGANISM: Artificial Sequence
<220> FEATURE:
<223> OTHER INFORMATION: synthetic polypeptide

<400> SEQUENCE: 21

Gly Phe Thr Phe Ser Asn Tyr Gly
1               5

<210> SEQ ID NO 22
<211> LENGTH: 8
<212> TYPE: PRT
<213> ORGANISM: Artificial Sequence
<220> FEATURE:
<223> OTHER INFORMATION: synthetic polypeptide

<400> SEQUENCE: 22

Ile Ser Ser Gly Ser Ser Thr Ile
1               5

<210> SEQ ID NO 23
<211> LENGTH: 9
<212> TYPE: PRT
<213> ORGANISM: Artificial Sequence
<220> FEATURE:
<223> OTHER INFORMATION: synthetic polypeptide

<400> SEQUENCE: 23

Ala Arg Arg Gly Leu Leu Leu Asp Tyr
1               5

<210> SEQ ID NO 24
<211> LENGTH: 15
<212> TYPE: PRT
<213> ORGANISM: Artificial Sequence
<220> FEATURE:
<223> OTHER INFORMATION: synthetic polypeptide

<400> SEQUENCE: 24

Arg Ala Ser Lys Ser Val Ser Thr Ser Ser Tyr Ser Tyr Met His
1               5                   10                  15

<210> SEQ ID NO 25
<211> LENGTH: 7
<212> TYPE: PRT
<213> ORGANISM: Artificial Sequence
<220> FEATURE:
<223> OTHER INFORMATION: synthetic polypeptide

<400> SEQUENCE: 25

Tyr Ala Ser Tyr Leu Glu Ser
1               5

<210> SEQ ID NO 26
<211> LENGTH: 9
<212> TYPE: PRT
<213> ORGANISM: Artificial Sequence
<220> FEATURE:
<223> OTHER INFORMATION: synthetic polypeptide
```

<400> SEQUENCE: 26

Gln His Ser Arg Glu Phe Pro Trp Thr
1               5

<210> SEQ ID NO 27
<211> LENGTH: 15
<212> TYPE: PRT
<213> ORGANISM: Artificial Sequence
<220> FEATURE:
<223> OTHER INFORMATION: synthetic polypeptide

<400> SEQUENCE: 27

Arg Ala Ser Lys Ser Val Ser Thr Ser Ser Tyr Ser Tyr Leu Ala
1               5                   10                  15

<210> SEQ ID NO 28
<211> LENGTH: 7
<212> TYPE: PRT
<213> ORGANISM: Artificial Sequence
<220> FEATURE:
<223> OTHER INFORMATION: synthetic polypeptide

<400> SEQUENCE: 28

Tyr Ala Ser Tyr Leu Gln Ser
1               5

<210> SEQ ID NO 29
<211> LENGTH: 10
<212> TYPE: PRT
<213> ORGANISM: Artificial Sequence
<220> FEATURE:
<223> OTHER INFORMATION: synthetic polypeptide

<400> SEQUENCE: 29

Lys Ser Val Ser Thr Ser Ser Tyr Ser Tyr
1               5                   10

<210> SEQ ID NO 30
<211> LENGTH: 3
<212> TYPE: PRT
<213> ORGANISM: Artificial Sequence
<220> FEATURE:
<223> OTHER INFORMATION: synthetic polypeptide

<400> SEQUENCE: 30

Tyr Ala Ser
1

<210> SEQ ID NO 31
<211> LENGTH: 7
<212> TYPE: PRT
<213> ORGANISM: Artificial Sequence
<220> FEATURE:
<223> OTHER INFORMATION: synthetic polypeptide

<400> SEQUENCE: 31

Gly Gln Ser Ser Arg Ser Ser
1               5

<210> SEQ ID NO 32
<211> LENGTH: 18
<212> TYPE: PRT
<213> ORGANISM: Artificial Sequence
<220> FEATURE:
<223> OTHER INFORMATION: synthetic polypeptide

```
<400> SEQUENCE: 32

Gly Gln Ser Ser Arg Ser Ser Gly Gly Ser Ser Gly Gly Gly
1               5                   10                  15

Gly Ser

<210> SEQ ID NO 33
<211> LENGTH: 4
<212> TYPE: PRT
<213> ORGANISM: Artificial Sequence
<220> FEATURE:
<223> OTHER INFORMATION: synthetic polypeptide

<400> SEQUENCE: 33

Gly Ser Gly Ser
1

<210> SEQ ID NO 34
<211> LENGTH: 4
<212> TYPE: PRT
<213> ORGANISM: Artificial Sequence
<220> FEATURE:
<223> OTHER INFORMATION: synthetic polypeptide

<400> SEQUENCE: 34

Gly Gly Gly Ser
1

<210> SEQ ID NO 35
<211> LENGTH: 10
<212> TYPE: PRT
<213> ORGANISM: Artificial Sequence
<220> FEATURE:
<223> OTHER INFORMATION: synthetic polypeptide

<400> SEQUENCE: 35

Gly Gly Gly Gly Ser Gly Gly Gly Gly Ser
1               5                   10

<210> SEQ ID NO 36
<211> LENGTH: 20
<212> TYPE: PRT
<213> ORGANISM: Artificial Sequence
<220> FEATURE:
<223> OTHER INFORMATION: synthetic polypeptide

<400> SEQUENCE: 36

Gly Gly Gly Gly Ser Gly Gly Gly Gly Ser Gly Gly Gly Gly Ser Gly
1               5                   10                  15

Gly Gly Gly Ser
            20

<210> SEQ ID NO 37
<211> LENGTH: 15
<212> TYPE: PRT
<213> ORGANISM: Artificial Sequence
<220> FEATURE:
<223> OTHER INFORMATION: synthetic polypeptide

<400> SEQUENCE: 37

Gly Gly Gly Gly Ser Gly Gly Gly Gly Ser Gly Gly Gly Gly Ser
1               5                   10                  15

<210> SEQ ID NO 38
<211> LENGTH: 274
<212> TYPE: PRT
```

```
<213> ORGANISM: Artificial Sequence
<220> FEATURE:
<223> OTHER INFORMATION: synthetic polypeptide

<400> SEQUENCE: 38

Ala Gly Ile His Asp Ile Val Leu Thr Gln Ser Pro Ala Ser Leu Ala
1               5                   10                  15

Val Ser Leu Gly Gln Arg Ala Thr Ile Ser Cys Arg Ala Ser Lys Ser
            20                  25                  30

Val Ser Thr Ser Ser Tyr Ser Tyr Met His Trp Tyr Gln Gln Lys Pro
        35                  40                  45

Gly Gln Pro Pro Lys Leu Leu Ile Lys Tyr Ala Ser Tyr Leu Glu Ser
    50                  55                  60

Gly Val Pro Ala Arg Phe Ser Gly Ser Gly Thr Asp Phe Thr
65                  70                  75                  80

Leu Asn Ile His Pro Val Glu Glu Asp Ala Ala Thr Tyr Tyr Cys
                85                  90                  95

Gln His Ser Arg Glu Phe Pro Trp Thr Phe Gly Gly Gly Thr Lys Leu
            100                 105                 110

Glu Ile Lys Arg Ala Asp Ala Ala Pro Gly Gly Gly Ser Gly Gly
        115                 120                 125

Gly Gly Ser Gly Gly Gly Ser Glu Val Gln Leu Val Glu Ser Gly
    130                 135                 140

Gly Gly Leu Val Lys Pro Gly Gly Ser Arg Lys Leu Ser Cys Ala Ala
145                 150                 155                 160

Ser Gly Phe Thr Phe Ser Asn Tyr Gly Met His Trp Val Arg Gln Ala
                165                 170                 175

Pro Glu Lys Gly Leu Glu Trp Val Ala Tyr Ile Ser Ser Gly Ser Ser
            180                 185                 190

Thr Ile Tyr Tyr Ala Asp Thr Val Lys Gly Arg Phe Thr Ile Ser Arg
        195                 200                 205

Asp Asn Ala Lys Asn Thr Leu Phe Leu Gln Met Thr Ser Leu Arg Ser
    210                 215                 220

Glu Asp Thr Ala Met Tyr Tyr Cys Ala Arg Arg Gly Leu Leu Leu Asp
225                 230                 235                 240

Tyr Trp Gly Gln Gly Thr Thr Leu Thr Val Ser Ser Leu Glu Gln Lys
                245                 250                 255

Leu Ile Ser Glu Glu Asp Leu Asn Ser Ala Val Asp His His His
            260                 265                 270

His His

<210> SEQ ID NO 39
<211> LENGTH: 541
<212> TYPE: PRT
<213> ORGANISM: Artificial Sequence
<220> FEATURE:
<223> OTHER INFORMATION: synthetic polypeptide

<400> SEQUENCE: 39

Ala Gly Ile His Asp Ile Val Leu Thr Gln Ser Pro Ala Ser Leu Ala
1               5                   10                  15

Val Ser Leu Gly Gln Arg Ala Thr Ile Ser Cys Arg Ala Ser Lys Ser
            20                  25                  30

Val Ser Thr Ser Ser Tyr Ser Tyr Met His Trp Tyr Gln Gln Lys Pro
        35                  40                  45

Gly Gln Pro Pro Lys Leu Leu Ile Lys Tyr Ala Ser Tyr Leu Glu Ser
```

```
                50                  55                  60
Gly Val Pro Ala Arg Phe Ser Gly Ser Gly Thr Asp Phe Thr
65                  70                  75                  80

Leu Asn Ile His Pro Val Glu Glu Asp Ala Ala Thr Tyr Tyr Cys
                85                  90                  95

Gln His Ser Arg Glu Phe Pro Trp Thr Phe Gly Gly Gly Thr Lys Leu
            100                 105                 110

Glu Ile Lys Arg Ala Asp Ala Ala Pro Gly Gly Gly Ser Gly Gly
            115                 120                 125

Gly Gly Ser Gly Gly Gly Ser Glu Val Gln Leu Val Glu Ser Gly
            130                 135                 140

Gly Gly Leu Val Lys Pro Gly Gly Ser Arg Lys Leu Ser Cys Ala Ala
145                 150                 155                 160

Ser Gly Phe Thr Phe Ser Asn Tyr Gly Met His Trp Val Arg Gln Ala
                165                 170                 175

Pro Glu Lys Gly Leu Glu Trp Val Ala Tyr Ile Ser Ser Gly Ser Ser
            180                 185                 190

Thr Ile Tyr Tyr Ala Asp Thr Val Lys Gly Arg Phe Thr Ile Ser Arg
            195                 200                 205

Asp Asn Ala Lys Asn Thr Leu Phe Leu Gln Met Thr Ser Leu Arg Ser
210                 215                 220

Glu Asp Thr Ala Met Tyr Tyr Cys Ala Arg Arg Gly Leu Leu Leu Asp
225                 230                 235                 240

Tyr Trp Gly Gln Gly Thr Thr Leu Thr Val Ser Ser Ala Ser Thr Lys
                245                 250                 255

Gly Pro Ser Val Phe Pro Leu Ala Pro Leu Glu Ser Ser Gly Ser Asp
            260                 265                 270

Ile Val Leu Thr Gln Ser Pro Ala Ser Leu Ala Val Ser Leu Gly Gln
            275                 280                 285

Arg Ala Thr Ile Ser Cys Arg Ala Ser Lys Ser Val Ser Thr Ser Ser
290                 295                 300

Tyr Ser Tyr Met His Trp Tyr Gln Gln Lys Pro Gly Gln Pro Pro Lys
305                 310                 315                 320

Leu Leu Ile Lys Tyr Ala Ser Tyr Leu Glu Ser Gly Val Pro Ala Arg
                325                 330                 335

Phe Ser Gly Ser Gly Ser Gly Thr Asp Phe Thr Leu Asn Ile His Pro
            340                 345                 350

Val Glu Glu Asp Ala Ala Thr Tyr Tyr Cys Gln His Ser Arg Glu
            355                 360                 365

Phe Pro Trp Thr Phe Gly Gly Gly Thr Lys Leu Glu Ile Lys Arg Ala
370                 375                 380

Asp Ala Ala Pro Gly Gly Gly Ser Gly Gly Gly Gly Ser Gly Gly
385                 390                 395                 400

Gly Gly Ser Glu Val Gln Leu Val Glu Ser Gly Gly Gly Leu Val Lys
                405                 410                 415

Pro Gly Gly Ser Arg Lys Leu Ser Cys Ala Ala Ser Gly Phe Thr Phe
            420                 425                 430

Ser Asn Tyr Gly Met His Trp Val Arg Gln Ala Pro Glu Lys Gly Leu
            435                 440                 445

Glu Trp Val Ala Tyr Ile Ser Ser Gly Ser Ser Thr Ile Tyr Tyr Ala
            450                 455                 460

Asp Thr Val Lys Gly Arg Phe Thr Ile Ser Arg Asp Asn Ala Lys Asn
465                 470                 475                 480
```

```
Thr Leu Phe Leu Gln Met Thr Ser Leu Arg Ser Glu Asp Thr Ala Met
                485                 490                 495
Tyr Tyr Cys Ala Arg Arg Gly Leu Leu Leu Asp Tyr Trp Gly Gln Gly
            500                 505                 510
Thr Thr Leu Thr Val Ser Ser Leu Glu Gln Lys Leu Ile Ser Glu Glu
        515                 520                 525
Asp Leu Asn Ser Ala Val Asp His His His His His His
    530                 535                 540

<210> SEQ ID NO 40
<211> LENGTH: 808
<212> TYPE: PRT
<213> ORGANISM: Artificial Sequence
<220> FEATURE:
<223> OTHER INFORMATION: synthetic polypeptide

<400> SEQUENCE: 40

Ala Gly Ile His Asp Ile Val Leu Thr Gln Ser Pro Ala Ser Leu Ala
1               5                   10                  15
Val Ser Leu Gly Gln Arg Ala Thr Ile Ser Cys Arg Ala Ser Lys Ser
            20                  25                  30
Val Ser Thr Ser Ser Tyr Ser Tyr Met His Trp Tyr Gln Gln Lys Pro
        35                  40                  45
Gly Gln Pro Pro Lys Leu Leu Ile Lys Tyr Ala Ser Tyr Leu Glu Ser
    50                  55                  60
Gly Val Pro Ala Arg Phe Ser Gly Ser Gly Ser Gly Thr Asp Phe Thr
65                  70                  75                  80
Leu Asn Ile His Pro Val Glu Glu Asp Ala Ala Thr Tyr Tyr Cys
            85                  90                  95
Gln His Ser Arg Glu Phe Pro Trp Thr Phe Gly Gly Gly Thr Lys Leu
            100                 105                 110
Glu Ile Lys Arg Ala Asp Ala Ala Pro Gly Gly Gly Gly Ser Gly Gly
            115                 120                 125
Gly Gly Ser Gly Gly Gly Gly Ser Glu Val Gln Leu Val Glu Ser Gly
        130                 135                 140
Gly Gly Leu Val Lys Pro Gly Gly Ser Arg Lys Leu Ser Cys Ala Ala
145                 150                 155                 160
Ser Gly Phe Thr Phe Ser Asn Tyr Gly Met His Trp Val Arg Gln Ala
                165                 170                 175
Pro Glu Lys Gly Leu Glu Trp Val Ala Tyr Ile Ser Ser Gly Ser Ser
            180                 185                 190
Thr Ile Tyr Tyr Ala Asp Thr Val Lys Gly Arg Phe Thr Ile Ser Arg
        195                 200                 205
Asp Asn Ala Lys Asn Thr Leu Phe Leu Gln Met Thr Ser Leu Arg Ser
    210                 215                 220
Glu Asp Thr Ala Met Tyr Tyr Cys Ala Arg Arg Gly Leu Leu Leu Asp
225                 230                 235                 240
Tyr Trp Gly Gln Gly Thr Thr Leu Thr Val Ser Ser Ala Ser Thr Lys
                245                 250                 255
Gly Pro Ser Val Phe Pro Leu Ala Pro Leu Glu Ser Ser Gly Ser Asp
            260                 265                 270
Ile Val Leu Thr Gln Ser Pro Ala Ser Leu Ala Val Ser Leu Gly Gln
        275                 280                 285
Arg Ala Thr Ile Ser Cys Arg Ala Ser Lys Ser Val Ser Thr Ser Ser
    290                 295                 300
```

```
Tyr Ser Tyr Met His Trp Gln Gln Lys Pro Gly Gln Pro Pro Lys
305                 310                 315                 320

Leu Leu Ile Lys Tyr Ala Ser Tyr Leu Glu Ser Gly Val Pro Ala Arg
            325                 330                 335

Phe Ser Gly Ser Gly Ser Gly Thr Asp Phe Thr Leu Asn Ile His Pro
        340                 345                 350

Val Glu Glu Asp Ala Ala Thr Tyr Tyr Cys Gln His Ser Arg Glu
        355                 360                 365

Phe Pro Trp Thr Phe Gly Gly Gly Thr Lys Leu Glu Ile Lys Arg Ala
    370                 375                 380

Asp Ala Ala Pro Gly Gly Gly Gly Ser Gly Gly Gly Ser Gly
385                 390                 395                 400

Gly Gly Ser Glu Val Gln Leu Val Glu Ser Gly Gly Gly Leu Val Lys
            405                 410                 415

Pro Gly Gly Ser Arg Lys Leu Ser Cys Ala Ala Ser Gly Phe Thr Phe
        420                 425                 430

Ser Asn Tyr Gly Met His Trp Val Arg Gln Ala Pro Glu Lys Gly Leu
            435                 440                 445

Glu Trp Val Ala Tyr Ile Ser Ser Gly Ser Ser Thr Ile Tyr Tyr Ala
    450                 455                 460

Asp Thr Val Lys Gly Arg Phe Thr Ile Ser Arg Asp Asn Ala Lys Asn
465                 470                 475                 480

Thr Leu Phe Leu Gln Met Thr Ser Leu Arg Ser Glu Asp Thr Ala Met
            485                 490                 495

Tyr Tyr Cys Ala Arg Arg Gly Leu Leu Leu Asp Tyr Trp Gly Gln Gly
        500                 505                 510

Thr Thr Leu Thr Val Ser Ser Ala Ser Thr Lys Gly Pro Ser Val Phe
    515                 520                 525

Pro Leu Ala Pro Leu Glu Ser Ser Gly Ser Asp Ile Val Leu Thr Gln
    530                 535                 540

Ser Pro Ala Ser Leu Ala Val Ser Leu Gly Gln Arg Ala Thr Ile Ser
545                 550                 555                 560

Cys Arg Ala Ser Lys Ser Val Ser Thr Ser Ser Tyr Ser Tyr Met His
            565                 570                 575

Trp Tyr Gln Gln Lys Pro Gly Gln Pro Pro Lys Leu Leu Ile Lys Tyr
            580                 585                 590

Ala Ser Tyr Leu Glu Ser Gly Val Pro Ala Arg Phe Ser Gly Ser Gly
        595                 600                 605

Ser Gly Thr Asp Phe Thr Leu Asn Ile His Pro Val Glu Glu Glu Asp
        610                 615                 620

Ala Ala Thr Tyr Tyr Cys Gln His Ser Arg Glu Phe Pro Trp Thr Phe
625                 630                 635                 640

Gly Gly Gly Thr Lys Leu Glu Ile Lys Arg Ala Asp Ala Ala Pro Gly
            645                 650                 655

Gly Gly Gly Ser Gly Gly Gly Ser Gly Gly Gly Gly Ser Glu Val
            660                 665                 670

Gln Leu Val Glu Ser Gly Gly Gly Leu Val Lys Pro Gly Gly Ser Arg
        675                 680                 685

Lys Leu Ser Cys Ala Ala Ser Gly Phe Thr Phe Ser Asn Tyr Gly Met
        690                 695                 700

His Trp Val Arg Gln Ala Pro Glu Lys Gly Leu Glu Trp Val Ala Tyr
705                 710                 715                 720
```

```
Ile Ser Ser Gly Ser Ser Thr Ile Tyr Tyr Ala Asp Thr Val Lys Gly
            725                 730                 735

Arg Phe Thr Ile Ser Arg Asp Asn Ala Lys Asn Thr Leu Phe Leu Gln
        740                 745                 750

Met Thr Ser Leu Arg Ser Glu Asp Thr Ala Met Tyr Tyr Cys Ala Arg
        755                 760                 765

Arg Gly Leu Leu Leu Asp Tyr Trp Gly Gln Gly Thr Thr Leu Thr Val
        770                 775                 780

Ser Ser Leu Glu Gln Lys Leu Ile Ser Glu Glu Asp Leu Asn Ser Ala
785                 790                 795                 800

Val Asp His His His His His His
            805

<210> SEQ ID NO 41
<211> LENGTH: 242
<212> TYPE: PRT
<213> ORGANISM: Artificial Sequence
<220> FEATURE:
<223> OTHER INFORMATION: synthetic polypeptide

<400> SEQUENCE: 41

Asp Ile Val Leu Thr Gln Ser Pro Ala Ser Leu Ala Val Ser Pro Gly
1               5                   10                  15

Gln Arg Ala Thr Ile Thr Cys Arg Ala Ser Lys Ser Val Ser Thr Ser
            20                  25                  30

Ser Tyr Ser Tyr Met His Trp Tyr Gln Gln Lys Pro Gly Gln Pro Pro
        35                  40                  45

Lys Leu Leu Ile Tyr Tyr Ala Ser Tyr Leu Glu Ser Gly Val Pro Ala
50                  55                  60

Arg Phe Ser Gly Ser Gly Ser Gly Thr Asp Phe Thr Leu Thr Ile Asn
65                  70                  75                  80

Pro Val Glu Ala Asn Asp Thr Ala Asn Tyr Tyr Cys Gln His Ser Arg
            85                  90                  95

Glu Phe Pro Trp Thr Phe Gly Gln Gly Thr Lys Val Glu Ile Lys Gly
        100                 105                 110

Gly Gly Gly Ser Gly Gly Gly Ser Gly Gly Gly Ser Glu Val
        115                 120                 125

Gln Leu Val Glu Ser Gly Gly Gly Leu Val Gln Pro Gly Gly Ser Leu
130                 135                 140

Arg Leu Ser Cys Ser Ala Ser Gly Phe Thr Phe Ser Asn Tyr Gly Met
145                 150                 155                 160

His Trp Val Arg Gln Ala Pro Gly Lys Gly Leu Glu Tyr Val Ser Tyr
            165                 170                 175

Ile Ser Ser Gly Ser Ser Thr Ile Tyr Tyr Ala Asp Thr Val Lys Gly
        180                 185                 190

Arg Phe Thr Ile Ser Arg Asp Asn Ser Lys Asn Thr Leu Tyr Leu Gln
        195                 200                 205

Met Ser Ser Leu Arg Ala Glu Asp Thr Ala Val Tyr Tyr Cys Val Lys
210                 215                 220

Arg Gly Leu Leu Leu Asp Tyr Trp Gly Gln Gly Thr Leu Val Thr Val
225                 230                 235                 240

Ser Ser

<210> SEQ ID NO 42
<211> LENGTH: 6060
<212> TYPE: DNA
```

<213> ORGANISM: Artificial Sequence
<220> FEATURE:
<223> OTHER INFORMATION: synthetic polynucleotide

<400> SEQUENCE: 42

```
aaagctcttg ctttgacaat tttggtcttt cagaatacta taaatataac ctatattata      60
atttcataaa gtctgtgcat tttctttgac ccaggatatt tgcaaaagac atattcaaac     120
ttccgcagaa cactttattt cacatataca tgcctcttat atcagggatg tgaaacaggg     180
tcttgaaaac tgtctaaatc taaaacaatg ctaatgcagg tttaaattta ataaaataaa     240
atccaaaatc taacagccaa gtcaaatctg tatgttttaa catttaaaat attttaaaga     300
cgtcttttcc caggattcaa catgtgaaat cttttctcag ggatacacgt gtgcctagat     360
cctcattgct ttagtttttt acagaggaat gaatataaaa agaaaatact taaattttat     420
ccctcttacc tctataatca tacataggca taatttttta acctaggctc cagatagcca     480
tagaagaacc aaaacactttc tgcgtgtgtg agaataatca gagtgagatt ttttcacaag     540
tacctgatga gggttgagac aggtagaaaa agtgagagat ctctatttat ttagcaataa     600
tagaaaagc atttaagaga ataaagcaat ggaaataaga aatttgtaaa tttccttctg     660
ataactagaa atagaggatc cagtttcttt tggttaacct aaattttatt tcattttatt     720
gtttatttt attttatttt attttatttt gtgtaatcgt agtttcagag tgttagagct     780
gaaaggaaga agtaggagaa acatgcaaag taaaagtata acactttcct tactaaaccg     840
actgggtttc caggtagggg caggattcag gatgactgac agggccctta gggaacactg     900
agaccctacg ctgacctcat aaatgcttgc tacctttgct gttttaatta catcttttaa     960
tagcaggaag cagaactctg cacttcaaaa gttttcctc acctgaggag ttaatttagt    1020
acaagggaaa aaagtacagg gggatgggag aaaggcgatc acgttgggaa gctatagaga    1080
aagaagagta aattttagta aaggaggttt aaacaaacaa aatataaaga gaaataggaa    1140
cttgaatcaa ggaaatgatt ttaaaacgca gtattcttag tggactagag gaaaaaaata    1200
atctgagcca agtagaagac cttttcccct cctaccccta ctttctaagt cacagaggct    1260
ttttgttccc ccagacactc ttgcagatta gtccaggcag aaacagttag atgtccccag    1320
ttaacctcct atttgacacc actgattacc ccattgatag tcacactttg ggttgtaagt    1380
gacttttat ttatttgtat ttttgactgc attaagaggt ctctagtttt ttatctcttg    1440
tttcccaaaa cctaataagt aactaatgca cagagcacat tgatttgtat ttattctatt    1500
tttagacata atttattagc atgcatgagc aaattaagaa aaacaacaac aaatgaatgc    1560
atatatatgt atatgtatgt gtgtatatat acacatatat atatatattt tttttctttt    1620
cttaccagaa ggttttaatc caaataagga gaagatatgc ttagaactga ggtagagttt    1680
tcatccattc tgtcctgtaa gtattttgca tattctggag acgcaggaag agatccatct    1740
acatatccca aagctgaatt atggtagaca aagctcttcc acttttagtg catcaatttc    1800
ttatttgtgt aataagaaaa ttgggaaaac gatcttcaat atgcttacca agctgtgatt    1860
ccaaatatta cgtaaataca cttgcaaagg aggatgtttt tagtagcaat ttgtactgat    1920
ggtatgggc caagagatat atcttagagg gagggctgag ggtttgaagt ccaactccta    1980
agccagtgcc agaagagcca aggacaggta cggctgtcat cacttagacc tcaccctgtg    2040
gagccacacc ctagggttgg ccaatctact cccaggagca gggagggcag gagccagggc    2100
tgggcataaa agtcagggca gagccatcta ttgcttacat ttgcttctga cacaactgtg    2160
ttcactagca acctcaaaca gacaccatgg tgcacctgac tcctgaggag aagtctgccg    2220
```

```
ttactgccct gtggggcaag gtgaacgtgg atgaagttgg tggtgaggcc ctgggcaggt      2280
tggtatcaag gttacaagac aggtttaagg agaccaatag aaactgggca tgtggagaca      2340
gagaagactc ttgggtttct gataggcact gactctctct gcctattggt ctattttccc      2400
acccttaggc tgctggtggt ctaccttgg acccagaggt tctttgagtc ctttggggat       2460
ctgtccactc ctgatgctgt tatgggcaac cctaaggtga aggctcatgg caagaaagtg      2520
ctcggtgcct ttagtgatgg cctggctcac ctggacaacc tcaagggcac ctttgccaca      2580
ctgagtgagc tgcactgtga caagctgcac gtggatcctg agaacttcag ggtgagtcta      2640
tgggacccct tgatgttttct ttcccctct tttctatggt taagttcatg tcataggaag      2700
gggagaagta acagggtaca gtttagaatg ggaaacagac gaatgattgc atcagtgtgg      2760
aagtctcagg atcgttttag tttcttttat ttgctgttca taacaattgt tttctttgt       2820 ttaattcttg ctttctttt ttttcttctc cgcaattttt actattatac ttaatgcctt       2880
aacattgtgt ataacaaaag gaaatatctc tgagatacat taagtaactt aaaaaaaaac      2940
tttacacagt ctgcctagta cattactatt tggaatatat gtgtgcttat ttgcatattc      3000
ataatctccc tactttatt tcttttattt ttaattgata cataatcatt atacatattt       3060
atgggttaaa gtgtaatgtt ttaatatgtg tacacatatt gaccaaatca gggtaatttt      3120
gcatttgtaa ttttaaaaaa tgctttcttc ttttaatata ctttttttgtt tatcttattt    3180 ctaatacttt ccctaatctc tttctttcag ggcaataatg atacaatgta tcatgcctct     3240
ttgcaccatt ctaaagaata acagtgataa tttctgggtt aaggcaatag caatatttct      3300
gcatataaat atttctgcat ataaattgta actgatgtaa gaggtttcat attgctaata      3360
gcagctacaa tccagctacc attctgcttt tattttatgg ttgggataag ctggattat       3420 tctgagtcca agctaggccc ttttgctaat catgttcata cctcttatct tcctcccaca      3480
gctcctgggc aacgtgctgg tctgtgtgct ggcccatcac tttggcaaag aattcacccc      3540
accagtgcag gctgcctatc agaaagtggt ggctggtgtg ctaatgccc tggcccacaa      3600 gtatcactaa gctcgctttc ttgctgtcca atttctatta aaggttcctt tgttccctaa      3660
gtccaactac taaactgggg gatattatga agggccttga gcatctggat tctgcctaat      3720
aaaaaacatt tattttcatt gcaatgatgt atttaaatta tttctgaata ttttactaaa     3780
aagggaatgt gggaggtcag tgcatttaaa acataaagaa atgaagagct agttcaaacc     3840
ttgggaaaat acactatatc ttaaactcca tgaagaagg tgaggctgca aacagctaat      3900
gcacattggc aacagccctg atgcctatgc cttattcatc cctcagaaaa ggattcaagt      3960
agaggcttga tttggaggtt aaagttttgc tatgctgtat tttacattac ttattgtttt     4020
agctgtcctc atgaatgtct tttcactacc catttgctta tcctgcatct ctcagccttg      4080
actccactca gttctcttgc ttagagatac cacctttccc ctgaagtgtt ccttccatgt      4140
tttacggcga gatggtttct cctcgcctgg ccactcagcc ttagttgtct ctgttgtctt      4200
atagaggtct acttgaagaa ggaaaaacag ggggcatggt ttgactgtcc tgtgagccct      4260
tcttccctgc ctccccact cacagtgacc cggaatctgc agtgctagtc tcccggaact      4320
atcactcttt cacagtctgc tttggaagga ctgggcttag tatgaaaagt taggactgag      4380
aagaatttga aaggggggctt tttgtagctt gatattcact actgtcttat taccctatca    4440
taggcccacc ccaaatggaa gtcccattct tcctcaggat gtttaagatt agcattcagg      4500
aagagatcag aggtctgctg gctcccttat catgtccctt atggtgcttc tggctctgca     4560
```

```
gttattagca tagtgttacc atcaaccacc ttaacttcat ttttcttatt caatacctag    4620
gtaggtagat gctagattct ggaaataaaa tatgagtctc aagtggtcct tgtcctctct    4680
cccagtcaaa ttctgaatct agttggcaag attctgaaat caaggcatat aatcagtaat    4740
aagtgatgat agaagggtat atagaagaat tttattatat gagagggtga aacctaaaat    4800
gaaatgaaat cagacccttg tcttacacca taaacaaaaa taaatttgaa tgggttaaag    4860
aattaaacta agacctaaaa ccataaaaat ttttaaagaa atcaaaagaa gaaaattcta    4920
atattcatgt tgcagccgtt ttttgaattt gatatgagaa gcaaaggcaa caaaaggaaa    4980
aataaagaag tgaggctaca tcaaactaaa aaatttccac acaaaaaga aaacaatgaa    5040 caaatgaaag gtgaaccatg aaatggcata tttgcaaacc aaatatttct taaatatttt    5100
ggttaatatc caaatatat aagaaacaca gatgattcaa taacaaacaa aaaattaaaa    5160
ataggaaaat aaaaaaatta aaagaagaa atcctgcca tttatgcgag aattgatgaa    5220
cctggaggat gtaaaactaa gaaaataag cctgacacaa aaagacaaat actacacaac    5280
cttgctcata tgtgaaacat aaaaaagtca ctctcatgga aacagacagt agaggtatgg    5340
tttccagggg ttgggggtgg gagaatcagg aaactattac tcaagggta taaaatttca    5400 gttatgtggg atgaataaat tctagatatc taatgtacag catcgtgact gtagttaatt    5460
gtactgtaag tatatttaaa atttgcaaag agagtagatt ttttttgtttt tttagatgga    5520 gttttgctct tgttgtccag gctggagtgc aatggcaaga tcttggctca ctgcaacctc    5580
cgcctcctgg gttcaagcaa atctcctgcc tcagcctccc gagtagctgg gattacaggc    5640
atgcgacacc atgcccagct aatttttgtat ttttagtaga gacggggttt ctccatgttg    5700
gtcaggctga tccgcctcct cggccaccaa agggctggga ttacaggcgt gaccaccggg    5760
cctggccgag agtagatctt aaaagcattt accacaagaa aaaggtaact atgtgagata    5820
atgggtatgt taattagctt gattgtggta atcatttcac aaggtataca tatattaaaa    5880
catcatgttg tacaccttaa atatatacaa tttttatttg tgaatgatac ctcaataaag    5940
ttgaagaata ataaaaaaga atagacatca catgaattaa aaaactaaaa aataaaaaaa    6000
tgcatcttga tgattagaat tgcattcttg attttttcaga tacaaatatc catttgactg    6060
```

<210> SEQ ID NO 43
<211> LENGTH: 60
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (1)..(2)
<223> OTHER INFORMATION: optional phosphorothioate internucleoside
      linkage
<220> FEATURE:
<221> NAME/KEY: misc_feature
<222> LOCATION: (2)..(3)
<223> OTHER INFORMATION: optional phosphorothioate internucleoside
      linkage
<220> FEATURE:
<221> NAME/KEY: misc_feature
<222> LOCATION: (3)..(4)
<223> OTHER INFORMATION: optional phosphorothioate internucleoside
      linkage
<220> FEATURE:
<221> NAME/KEY: misc_feature
<222> LOCATION: (57)..(58)
<223> OTHER INFORMATION: optional phosphorothioate internucleoside
      linkage
<220> FEATURE:
<221> NAME/KEY: misc_feature

```
<222> LOCATION: (58)..(59)
<223> OTHER INFORMATION: optional phosphorothioate internucleoside
      linkage
<220> FEATURE:
<221> NAME/KEY: misc_feature
<222> LOCATION: (59)..(60)
<223> OTHER INFORMATION: optional phosphorothioate internucleoside
      linkage

<400> SEQUENCE: 43
aaagaataac agtgataatt tctgggttaa ggcaatagca atatctctgc atataaatat      60

<210> SEQ ID NO 44
<211> LENGTH: 51
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (1)..(2)
<223> OTHER INFORMATION: optional phosphorothioate internucleoside
      linkage
<220> FEATURE:
<221> NAME/KEY: misc_feature
<222> LOCATION: (2)..(3)
<223> OTHER INFORMATION: optional phosphorothioate internucleoside
      linkage
<220> FEATURE:
<221> NAME/KEY: misc_feature
<222> LOCATION: (3)..(4)
<223> OTHER INFORMATION: optional phosphorothioate internucleoside
      linkage
<220> FEATURE:
<221> NAME/KEY: misc_feature
<222> LOCATION: (48)..(49)
<223> OTHER INFORMATION: optional phosphorothioate internucleoside
      linkage
<220> FEATURE:
<221> NAME/KEY: misc_feature
<222> LOCATION: (49)..(50)
<223> OTHER INFORMATION: optional phosphorothioate internucleoside
      linkage
<220> FEATURE:
<221> NAME/KEY: misc_feature
<222> LOCATION: (50)..(51)
<223> OTHER INFORMATION: optional phosphorothioate internucleoside
      linkage

<400> SEQUENCE: 44
gttcagcgtg tccggcgagg gcgaggtgag tctatgggac ccttgatgtt t      51

<210> SEQ ID NO 45
<211> LENGTH: 51
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (1)..(2)
<223> OTHER INFORMATION: optional phosphorothioate internucleoside
      linkage
<220> FEATURE:
<221> NAME/KEY: misc_feature
<222> LOCATION: (2)..(3)
<223> OTHER INFORMATION: optional phosphorothioate internucleoside
      linkage
<220> FEATURE:
<221> NAME/KEY: misc_feature
<222> LOCATION: (3)..(4)
<223> OTHER INFORMATION: optional phosphorothioate internucleoside
      linkage
<220> FEATURE:
<221> NAME/KEY: misc_feature
```

```
<222> LOCATION: (48)..(49)
<223> OTHER INFORMATION: optional phosphorothioate internucleoside
      linkage
<220> FEATURE:
<221> NAME/KEY: misc_feature
<222> LOCATION: (49)..(50)
<223> OTHER INFORMATION: optional phosphorothioate internucleoside
      linkage
<220> FEATURE:
<221> NAME/KEY: misc_feature
<222> LOCATION: (50)..(51)
<223> OTHER INFORMATION: optional phosphorothioate internucleoside
      linkage

<400> SEQUENCE: 45
aaacatcaag ggtcccatag actcacctcg ccctcgccgg acacgctgaa c           51

<210> SEQ ID NO 46
<211> LENGTH: 70
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (1)..(2)
<223> OTHER INFORMATION: optional phosphorothioate internucleoside
      linkage
<220> FEATURE:
<221> NAME/KEY: misc_feature
<222> LOCATION: (2)..(3)
<223> OTHER INFORMATION: optional phosphorothioate internucleoside
      linkage
<220> FEATURE:
<221> NAME/KEY: misc_feature
<222> LOCATION: (3)..(4)
<223> OTHER INFORMATION: optional phosphorothioate internucleoside
      linkage
<220> FEATURE:
<221> NAME/KEY: misc_feature
<222> LOCATION: (67)..(68)
<223> OTHER INFORMATION: optional phosphorothioate internucleoside
      linkage
<220> FEATURE:
<221> NAME/KEY: misc_feature
<222> LOCATION: (68)..(69)
<223> OTHER INFORMATION: optional phosphorothioate internucleoside
      linkage
<220> FEATURE:
<221> NAME/KEY: misc_feature
<222> LOCATION: (69)..(70)
<223> OTHER INFORMATION: optional phosphorothioate internucleoside
      linkage

<400> SEQUENCE: 46
cttgccccac agggcagtaa cggcagattt ttcttccggc gttaaatgca ccatggtgtc    60
tgtttgaggt                                                          70

<210> SEQ ID NO 47
<211> LENGTH: 51
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (1)..(2)
<223> OTHER INFORMATION: optional phosphorothioate internucleoside
      linkage
<220> FEATURE:
<221> NAME/KEY: misc_feature
<222> LOCATION: (2)..(3)
<223> OTHER INFORMATION: optional phosphorothioate internucleoside
      linkage
```

```
<220> FEATURE:
<221> NAME/KEY: misc_feature
<222> LOCATION: (3)..(4)
<223> OTHER INFORMATION: optional phosphorothioate internucleoside
      linkage
<220> FEATURE:
<221> NAME/KEY: misc_feature
<222> LOCATION: (48)..(49)
<223> OTHER INFORMATION: optional phosphorothioate internucleoside
      linkage
<220> FEATURE:
<221> NAME/KEY: misc_feature
<222> LOCATION: (49)..(50)
<223> OTHER INFORMATION: optional phosphorothioate internucleoside
      linkage
<220> FEATURE:
<221> NAME/KEY: misc_feature
<222> LOCATION: (50)..(51)
<223> OTHER INFORMATION: optional phosphorothioate internucleoside
      linkage

<400> SEQUENCE: 47
acagacacca tggtgcacct gactcctgag gagaagtctg ccgttactgc c        51

<210> SEQ ID NO 48
<211> LENGTH: 65
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (1)..(2)
<223> OTHER INFORMATION: optional phosphorothioate internucleoside
      linkage
<220> FEATURE:
<221> NAME/KEY: misc_feature
<222> LOCATION: (2)..(3)
<223> OTHER INFORMATION: optional phosphorothioate internucleoside
      linkage
<220> FEATURE:
<221> NAME/KEY: misc_feature
<222> LOCATION: (3)..(4)
<223> OTHER INFORMATION: optional phosphorothioate internucleoside
      linkage
<220> FEATURE:
<221> NAME/KEY: misc_feature
<222> LOCATION: (62)..(63)
<223> OTHER INFORMATION: optional phosphorothioate internucleoside
      linkage
<220> FEATURE:
<221> NAME/KEY: misc_feature
<222> LOCATION: (63)..(64)
<223> OTHER INFORMATION: optional phosphorothioate internucleoside
      linkage
<220> FEATURE:
<221> NAME/KEY: misc_feature
<222> LOCATION: (64)..(65)
<223> OTHER INFORMATION: optional phosphorothioate internucleoside
      linkage

<400> SEQUENCE: 48
ttgccccaca gggcagtaac ggcagacttc tcctcaggag tcaggtgcac catggtgtct    60
gtttg                                                                65

<210> SEQ ID NO 49
<211> LENGTH: 61
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (1)..(2)
```

```
<223> OTHER INFORMATION: optional phosphorothioate internucleoside
      linkage
<220> FEATURE:
<221> NAME/KEY: misc_feature
<222> LOCATION: (2)..(3)
<223> OTHER INFORMATION: optional phosphorothioate internucleoside
      linkage
<220> FEATURE:
<221> NAME/KEY: misc_feature
<222> LOCATION: (3)..(4)
<223> OTHER INFORMATION: optional phosphorothioate internucleoside
      linkage
<220> FEATURE:
<221> NAME/KEY: misc_feature
<222> LOCATION: (58)..(59)
<223> OTHER INFORMATION: optional phosphorothioate internucleoside
      linkage
<220> FEATURE:
<221> NAME/KEY: misc_feature
<222> LOCATION: (59)..(60)
<223> OTHER INFORMATION: optional phosphorothioate internucleoside
      linkage
<220> FEATURE:
<221> NAME/KEY: misc_feature
<222> LOCATION: (60)..(61)
<223> OTHER INFORMATION: optional phosphorothioate internucleoside
      linkage

<400> SEQUENCE: 49
ttctgtatct atattcatca taggaaacac caaagataat gttctcctta atggtgccag      60
g                                                                     61

<210> SEQ ID NO 50
<211> LENGTH: 61
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (1)..(2)
<223> OTHER INFORMATION: optional phosphorothioate internucleoside
      linkage
<220> FEATURE:
<221> NAME/KEY: misc_feature
<222> LOCATION: (2)..(3)
<223> OTHER INFORMATION: optional phosphorothioate internucleoside
      linkage
<220> FEATURE:
<221> NAME/KEY: misc_feature
<222> LOCATION: (3)..(4)
<223> OTHER INFORMATION: optional phosphorothioate internucleoside
      linkage
<220> FEATURE:
<221> NAME/KEY: misc_feature
<222> LOCATION: (58)..(59)
<223> OTHER INFORMATION: optional phosphorothioate internucleoside
      linkage
<220> FEATURE:
<221> NAME/KEY: misc_feature
<222> LOCATION: (59)..(60)
<223> OTHER INFORMATION: optional phosphorothioate internucleoside
      linkage
<220> FEATURE:
<221> NAME/KEY: misc_feature
<222> LOCATION: (60)..(61)
<223> OTHER INFORMATION: optional phosphorothioate internucleoside
      linkage

<400> SEQUENCE: 50
tcttgggatt caataacctt gcagacagtg gaggaaggcc tttggcgtga taccacaggt      60
g                                                                     61
```

<210> SEQ ID NO 51
<211> LENGTH: 63
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (1)..(2)
<223> OTHER INFORMATION: optional phosphorothioate internucleoside
      linkage
<220> FEATURE:
<221> NAME/KEY: misc_feature
<222> LOCATION: (2)..(3)
<223> OTHER INFORMATION: optional phosphorothioate internucleoside
      linkage
<220> FEATURE:
<221> NAME/KEY: misc_feature
<222> LOCATION: (3)..(4)
<223> OTHER INFORMATION: optional phosphorothioate internucleoside
      linkage
<220> FEATURE:
<221> NAME/KEY: misc_feature
<222> LOCATION: (60)..(61)
<223> OTHER INFORMATION: optional phosphorothioate internucleoside
      linkage
<220> FEATURE:
<221> NAME/KEY: misc_feature
<222> LOCATION: (61)..(62)
<223> OTHER INFORMATION: optional phosphorothioate internucleoside
      linkage
<220> FEATURE:
<221> NAME/KEY: misc_feature
<222> LOCATION: (62)..(63)
<223> OTHER INFORMATION: optional phosphorothioate internucleoside
      linkage

<400> SEQUENCE: 51
tccaagtttg cagagaaaga taatatagtc cttggagaag gaggaatcac cctgagtgga    60
ggt    63

<210> SEQ ID NO 52
<211> LENGTH: 64
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (1)..(2)
<223> OTHER INFORMATION: optional phosphorothioate internucleoside
      linkage
<220> FEATURE:
<221> NAME/KEY: misc_feature
<222> LOCATION: (2)..(3)
<223> OTHER INFORMATION: optional phosphorothioate internucleoside
      linkage
<220> FEATURE:
<221> NAME/KEY: misc_feature
<222> LOCATION: (3)..(4)
<223> OTHER INFORMATION: optional phosphorothioate internucleoside
      linkage
<220> FEATURE:
<221> NAME/KEY: misc_feature
<222> LOCATION: (61)..(62)
<223> OTHER INFORMATION: optional phosphorothioate internucleoside
      linkage
<220> FEATURE:
<221> NAME/KEY: misc_feature
<222> LOCATION: (62)..(63)
<223> OTHER INFORMATION: optional phosphorothioate internucleoside
      linkage
<220> FEATURE:
<221> NAME/KEY: misc_feature
<222> LOCATION: (63)..(64)
<223> OTHER INFORMATION: optional phosphorothioate internucleoside

```
          linkage

<400> SEQUENCE: 52
aggacggtcc cggcctgcga cacttccgcc cataattgtt cttcatctgc ggggcggggg    60
gggg                                                                 64

<210> SEQ ID NO 53
<211> LENGTH: 67
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (1)..(2)
<223> OTHER INFORMATION: optional phosphorothioate internucleoside
      linkage
<220> FEATURE:
<221> NAME/KEY: misc_feature
<222> LOCATION: (2)..(3)
<223> OTHER INFORMATION: optional phosphorothioate internucleoside
      linkage
<220> FEATURE:
<221> NAME/KEY: misc_feature
<222> LOCATION: (3)..(4)
<223> OTHER INFORMATION: optional phosphorothioate internucleoside
      linkage
<220> FEATURE:
<221> NAME/KEY: misc_feature
<222> LOCATION: (64)..(65)
<223> OTHER INFORMATION: optional phosphorothioate internucleoside
      linkage
<220> FEATURE:
<221> NAME/KEY: misc_feature
<222> LOCATION: (65)..(66)
<223> OTHER INFORMATION: optional phosphorothioate internucleoside
      linkage
<220> FEATURE:
<221> NAME/KEY: misc_feature
<222> LOCATION: (66)..(67)
<223> OTHER INFORMATION: optional phosphorothioate internucleoside
      linkage

<400> SEQUENCE: 53
gggacggcgc ccacataggc caaattcaat tgctgatccc agcttaagac gtactggtca    60
gcctggc                                                              67
```